June 3, 1952 H. D. CAHILL ET AL 2,599,358

CALL DATA RECORDING AUTOMATIC TELEPHONE SYSTEM

Filed Oct. 29, 1948 68 Sheets-Sheet 1

INVENTORS H. D. CAHILL
W. W. CARPENTER
T. L. DIMOND

BY [signature]
ATTORNEY

CALL DATA RECORDING AUTOMATIC TELEPHONE SYSTEM

Filed Oct. 29, 1948 68 Sheets-Sheet 2

INVENTORS H. D. CAHILL
W. W. CARPENTER
T. L. DIMOND
BY [signature]
ATTORNEY

CALL DATA RECORDING AUTOMATIC TELEPHONE SYSTEM

Filed Oct. 29, 1948

68 Sheets-Sheet 3

INVENTORS H.D. CAHILL
W.W. CARPENTER
T.L. DIMOND

BY [signature]

ATTORNEY

CALL DATA RECORDING AUTOMATIC TELEPHONE SYSTEM

Filed Oct. 29, 1948 68 Sheets-Sheet 4

INVENTORS H. D. CAHILL
W. W. CARPENTER
T. L. DIMOND
BY [signature]
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 5

INVENTORS H.D. CAHILL
W.W. CARPENTER
T.L. DIMOND

BY [signature]
ATTORNEY

CALL DATA RECORDING AUTOMATIC TELEPHONE SYSTEM

Filed Oct. 29, 1948 68 Sheets-Sheet 6

INVENTORS H. D. CAHILL
W. W. CARPENTER
T. L. DIMOND
BY [signature]
ATTORNEY

CALL DATA RECORDING AUTOMATIC TELEPHONE SYSTEM

Filed Oct. 29, 1948 68 Sheets-Sheet 7

INVENTORS H. D. CAHILL
W. W. CARPENTER
T. L. DIMOND
BY [signature]
ATTORNEY

CALL DATA RECORDING AUTOMATIC TELEPHONE SYSTEM

INVENTORS H. D. CAHILL
W. W. CARPENTER
T. L. DIMOND
BY [signature]
ATTORNEY

CALL DATA RECORDING AUTOMATIC TELEPHONE SYSTEM

Filed Oct. 29, 1948 68 Sheets-Sheet 9

INVENTORS H.D. CAHILL
W.W. CARPENTER
T.L. DIMOND
BY [signature]
ATTORNEY

CALL DATA RECORDING AUTOMATIC TELEPHONE SYSTEM

Filed Oct. 29, 1948 68 Sheets-Sheet 10

INVENTORS H. D. CAHILL
W. W. CARPENTER
T. L. DIMOND
BY [signature]
ATTORNEY

CALL DATA RECORDING AUTOMATIC TELEPHONE SYSTEM

Filed Oct. 29, 1948 68 Sheets-Sheet 11

INVENTORS H. D. CAHILL
W. W. CARPENTER
T. L. DIMOND
BY
ATTORNEY

CALL DATA RECORDING AUTOMATIC TELEPHONE SYSTEM

Filed Oct. 29, 1948 68 Sheets-Sheet 12

INVENTORS H.D. CAHILL
W.W. CARPENTER
T.L. DIMOND
BY
ATTORNEY

INVENTORS H.D. CAHILL
W.W. CARPENTER
T.L. DIMOND
BY [signature]
ATTORNEY

CALL DATA RECORDING AUTOMATIC TELEPHONE SYSTEM

Filed Oct. 29, 1948 68 Sheets-Sheet 14

INVENTORS H. D. CAHILL
W. W. CARPENTER
T. L. DIMOND
BY [signature]
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 15

INVENTORS H.D. CAHILL
W.W. CARPENTER
T.L. DIMOND

BY [signature]

ATTORNEY

CALL DATA RECORDING AUTOMATIC TELEPHONE SYSTEM

Filed Oct. 29, 1948 68 Sheets-Sheet 16

INVENTORS H. D. CAHILL
W. W. CARPENTER
T. L. DIMOND
BY [signature]
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 17

INVENTORS H.D. CAHILL
W.W. CARPENTER
T.L. DIMOND

BY [signature]
ATTORNEY

CALL DATA RECORDING AUTOMATIC TELEPHONE SYSTEM

Filed Oct. 29, 1948 68 Sheets-Sheet 18

INVENTORS H.D. CAHILL
W.W. CARPENTER
T.L. DIMOND
BY [signature]
ATTORNEY

CALL DATA RECORDING AUTOMATIC TELEPHONE SYSTEM

INVENTORS H. D. CAHILL
W. W. CARPENTER
T. L. DIMOND
BY [signature]
ATTORNEY

INVENTORS H.D. CAHILL
W.W. CARPENTER
T.L. DIMOND
BY [signature]
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 21

INVENTORS H.D. CAHILL
W.W. CARPENTER
T.L. DIMOND
BY [signature]
ATTORNEY

INVENTORS H.D. CAHILL
W.W. CARPENTER
T.L. DIMOND
BY [signature]
ATTORNEY

CALL DATA RECORDING AUTOMATIC TELEPHONE SYSTEM

Filed Oct. 29, 1948 68 Sheets-Sheet 23

INVENTORS H.D. CAHILL
W.W. CARPENTER
T.L. DIMOND
BY [signature]
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 24

INVENTORS H. D. CAHILL
W. W. CARPENTER
T. L. DIMOND
BY [signature]
ATTORNEY

INVENTORS H.D. CAHILL
W.W. CARPENTER
T.L. DIMOND
BY
ATTORNEY

CALL DATA RECORDING AUTOMATIC TELEPHONE SYSTEM

Filed Oct. 29, 1948 68 Sheets-Sheet 26

INVENTORS H.D. CAHILL
W.W. CARPENTER
T.L. DIMOND
BY
ATTORNEY

CALL DATA RECORDING AUTOMATIC TELEPHONE SYSTEM

Filed Oct. 29, 1948 68 Sheets-Sheet 27

INVENTORS H.D. CAHILL
W.W. CARPENTER
T.L. DIMOND
BY [signature]
ATTORNEY

INVENTORS H.D. CAHILL
W.W. CARPENTER
T.L. DIMOND
BY [signature]
ATTORNEY

INVENTORS H.D. CAHILL
W.W. CARPENTER
T.L. DIMOND
BY
ATTORNEY

CALL DATA RECORDING AUTOMATIC TELEPHONE SYSTEM

INVENTORS H. D. CAHILL
W. W. CARPENTER
T. L. DIMOND
BY [signature]
ATTORNEY

INVENTORS H.D. CAHILL
W.W. CARPENTER
T.L. DIMOND
BY [signature]
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 32

INVENTORS H. D. CAHILL
W. W. CARPENTER
T. L. DIMOND

BY R. Marino

ATTORNEY

INVENTORS H. D. CAHILL
W. W. CARPENTER
T. L. DIMOND
BY [signature]
ATTORNEY

INVENTORS H.D. CAHILL
W.W. CARPENTER
T.L. DIMOND
BY [signature]
ATTORNEY

CALL DATA RECORDING AUTOMATIC TELEPHONE SYSTEM

INVENTORS H.D. CAHILL
W.W. CARPENTER
T.L. DIMOND
BY
ATTORNEY

CALL DATA RECORDING AUTOMATIC TELEPHONE SYSTEM

INVENTORS H. D. CAHILL
W. W. CARPENTER
T. L. DIMOND

BY [signature]
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 37

INVENTORS H.D. CAHILL
W.W. CARPENTER
T.L. DIMOND
BY [signature]
ATTORNEY

CALL DATA RECORDING AUTOMATIC TELEPHONE SYSTEM

Filed Oct. 29, 1948 68 Sheets-Sheet 38

INVENTORS H.D. CAHILL
W.W. CARPENTER
T.L. DIMOND
BY
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 39

INVENTORS H. D. CAHILL
W. W. CARPENTER
T. L. DIMOND
BY
ATTORNEY

INVENTORS H. D. CAHILL
W. W. CARPENTER
T. L. DIMOND
BY [signature]
ATTORNEY

CALL DATA RECORDING AUTOMATIC TELEPHONE SYSTEM

Filed Oct. 29, 1948 68 Sheets-Sheet 41

INVENTORS H. D. CAHILL
W. W. CARPENTER
T. L. DIMOND
BY [signature]
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 42

INVENTORS H. D. CAHILL
W. W. CARPENTER
T. L. DIMOND
BY
ATTORNEY

INVENTORS H.D. CAHILL
W.W. CARPENTER
T.L. DIMOND
BY [signature]
ATTORNEY

CALL DATA RECORDING AUTOMATIC TELEPHONE SYSTEM

Filed Oct. 29, 1948 68 Sheets-Sheet 44

INVENTORS H.D. CAHILL
W.W. CARPENTER
T.L. DIMOND
BY [signature]
ATTORNEY

INVENTORS H.D. CAHILL
W.W. CARPENTER
T.L. DIMOND
BY [signature]
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 46

INVENTORS H.D. CAHILL
W.W. CARPENTER
T.L. DIMOND

BY [signature]

ATTORNEY

INVENTORS H.D. CAHILL
W.W. CARPENTER
T.L. DIMOND
BY [signature]
ATTORNEY

INVENTORS H.D. CAHILL
W.W. CARPENTER
T.L. DIMOND
BY [signature]
ATTORNEY

CALL DATA RECORDING AUTOMATIC TELEPHONE SYSTEM

INVENTORS H.D. CAHILL
W.W. CARPENTER
T.L. DIMOND
BY
ATTORNEY

INVENTORS H.D. CAHILL
W.W. CARPENTER
T.L. DIMOND
BY
ATTORNEY

CALL DATA RECORDING AUTOMATIC TELEPHONE SYSTEM

Filed Oct. 29, 1948 68 Sheets-Sheet 51

INVENTORS H. D. CAHILL
W. W. CARPENTER
T. L. DIMOND
BY [signature]
ATTORNEY

INVENTORS H. D. CAHILL
W. W. CARPENTER
T. L. DIMOND
BY
ATTORNEY

INVENTORS H.D. CAHILL
W.W. CARPENTER
T.L. DIMOND
BY [signature]
ATTORNEY

INVENTORS H. D. CAHILL
W. W. CARPENTER
T. L. DIMOND
BY [signature]
ATTORNEY

CALL DATA RECORDING AUTOMATIC TELEPHONE SYSTEM

Filed Oct. 29, 1948 68 Sheets-Sheet 55

INVENTORS H. D. CAHILL
W. W. CARPENTER
T. L. DIMOND
BY [signature]
ATTORNEY

CALL DATA RECORDING AUTOMATIC TELEPHONE SYSTEM

INVENTORS H. D. CAHILL
W. W. CARPENTER
T. L. DIMOND
BY [signature]
ATTORNEY

CALL DATA RECORDING AUTOMATIC TELEPHONE SYSTEM

INVENTORS H. D. CAHILL
W. W. CARPENTER
T. L. DIMOND
BY [signature]
ATTORNEY

INVENTORS H.D. CAHILL
W.W. CARPENTER
T.L. DIMOND
BY
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 59

INVENTORS H.D. CAHILL
W.W. CARPENTER
T.L. DIMOND

BY [signature]

ATTORNEY

INVENTORS H.D. CAHILL
W.W. CARPENTER
T.L. DIMOND
BY [signature]
ATTORNEY

INVENTORS H. D. CAHILL
W. W. CARPENTER
T. L. DIMOND
BY [signature]
ATTORNEY

CALL DATA RECORDING AUTOMATIC TELEPHONE SYSTEM

INVENTORS H. D. CAHILL
W. W. CARPENTER
T. L. DIMOND
BY [signature]
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 63

INVENTORS H. D. CAHILL
W. W. CARPENTER
T. L. DIMOND

BY [signature]

ATTORNEY

CALL DATA RECORDING AUTOMATIC TELEPHONE SYSTEM

INVENTORS H. D. CAHILL
W. W. CARPENTER
T. L. DIMOND
BY
ATTORNEY

INVENTORS H.D. CAHILL
W.W. CARPENTER
T.L. DIMOND
BY [signature]
ATTORNEY

CALL DATA RECORDING AUTOMATIC TELEPHONE SYSTEM

Filed Oct. 29, 1948 68 Sheets-Sheet 66

INVENTORS H. D. CAHILL
W. W. CARPENTER
T. L. DIMOND
BY
ATTORNEY

INVENTORS H. D. CAHILL
W. W. CARPENTER
T. L. DIMOND
BY [signature]
ATTORNEY

June 3, 1952 H. D. CAHILL ET AL 2,599,358

CALL DATA RECORDING AUTOMATIC TELEPHONE SYSTEM

Filed Oct. 29, 1948 68 Sheets-Sheet 68

INVENTORS H. D. CAHILL
W. W. CARPENTER
T. L. DIMOND

BY [signature]

ATTORNEY

Patented June 3, 1952

2,599,358

UNITED STATES PATENT OFFICE 2,599,358

CALL DATA RECORDING AUTOMATIC TELEPHONE SYSTEM

Harold D. Cahill, Scarsdale, and Warren W. Carpenter, Garden City, N. Y., and Thomas L. Dimond, Rutherford, N. J., assignors to Bell Telephone Laboratories, Incorporated, New York, N. Y., a corporation of New York Application October 29, 1948, Serial No. 57,388

19 Claims. (Cl. 179—8.5)

This invention relates to call data recording telephone systems and more particularly to systems in which pertinent information relating to telephone calls for which subscribers are to be charged is recorded for the purpose of computing the charges to be billed to the subscribers.

The copending application of W. W. Carpenter and R. E. Collis, Serial No. 759,402, filed July 7, 1947, discloses a call data recording telephone system employing switching apparatus of the cross bar type. The present invention is an improvement on the system of said application. In that system, a calling line is identified by its location on the line-link frame to which it is connected and digits indicative of said location are recorded in connection with other data relating to a call made by said line. For billing purposes, it is necessary to determine the directory number of the station making the call in order that the charges for the call may be billed to the proper subscriber.

The present invention discloses a novel means for translating the indication of the equipment location of a calling line into the digits of the directory number of said line, or of a calling station on said line, and for recording said directory number.

A feature of the invention is a means whereby the energization of one wire indicates all the digits of a directory number. Another feature of the invention is a translating means comprising a plurality of toroidal coils through a suitable combination of which one wire is threaded for each directory number to be indicated. Still another feature of the invention is electronic devices responsive to the potentials induced in said coils by the energization of a wire threaded through them.

These and other features of the invention will be more apparent from the description which follows, the appended claims, and the drawings, in which:

Figure 1:
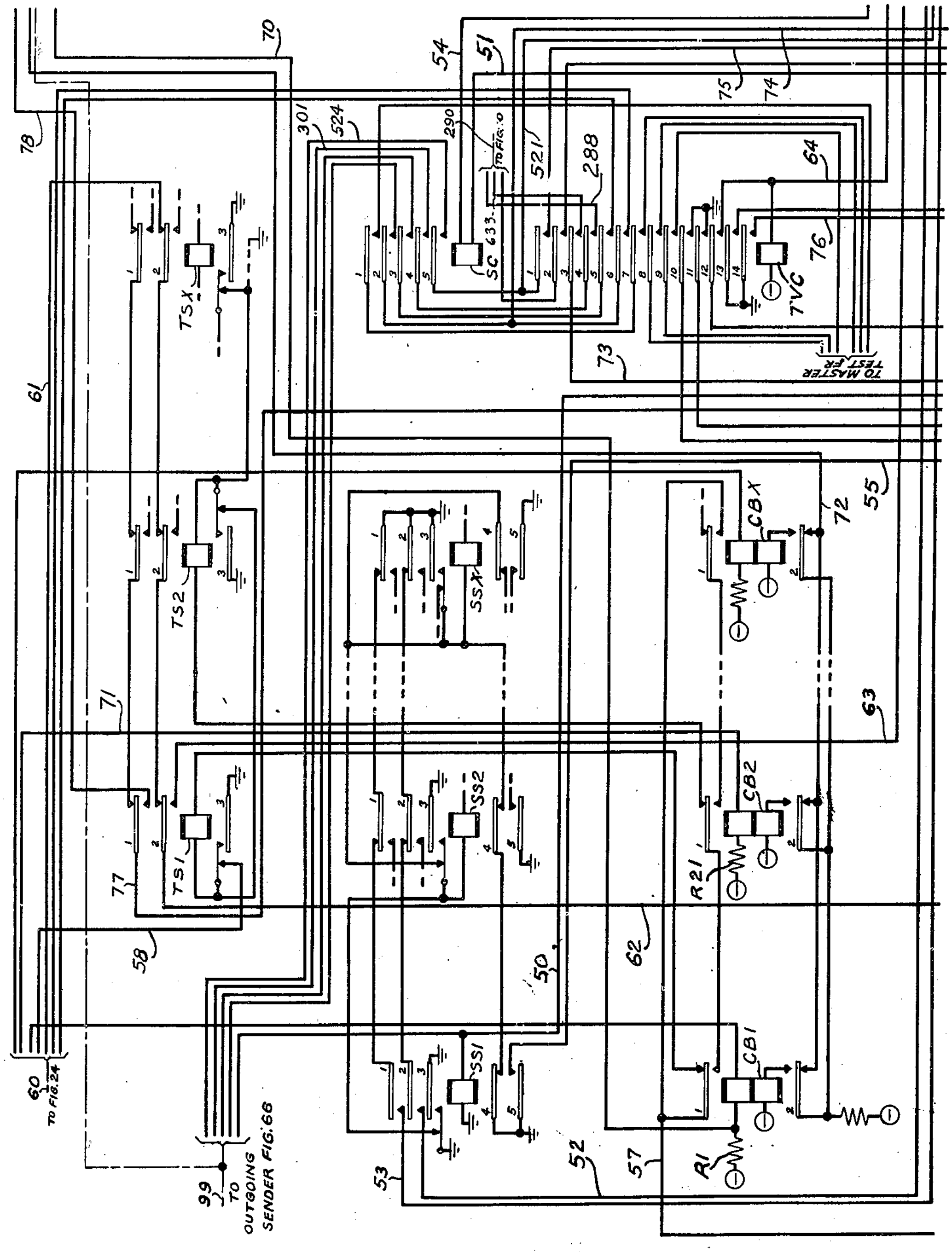
Figs. 1–4 show a transverter connector circuit.
Figure 2:
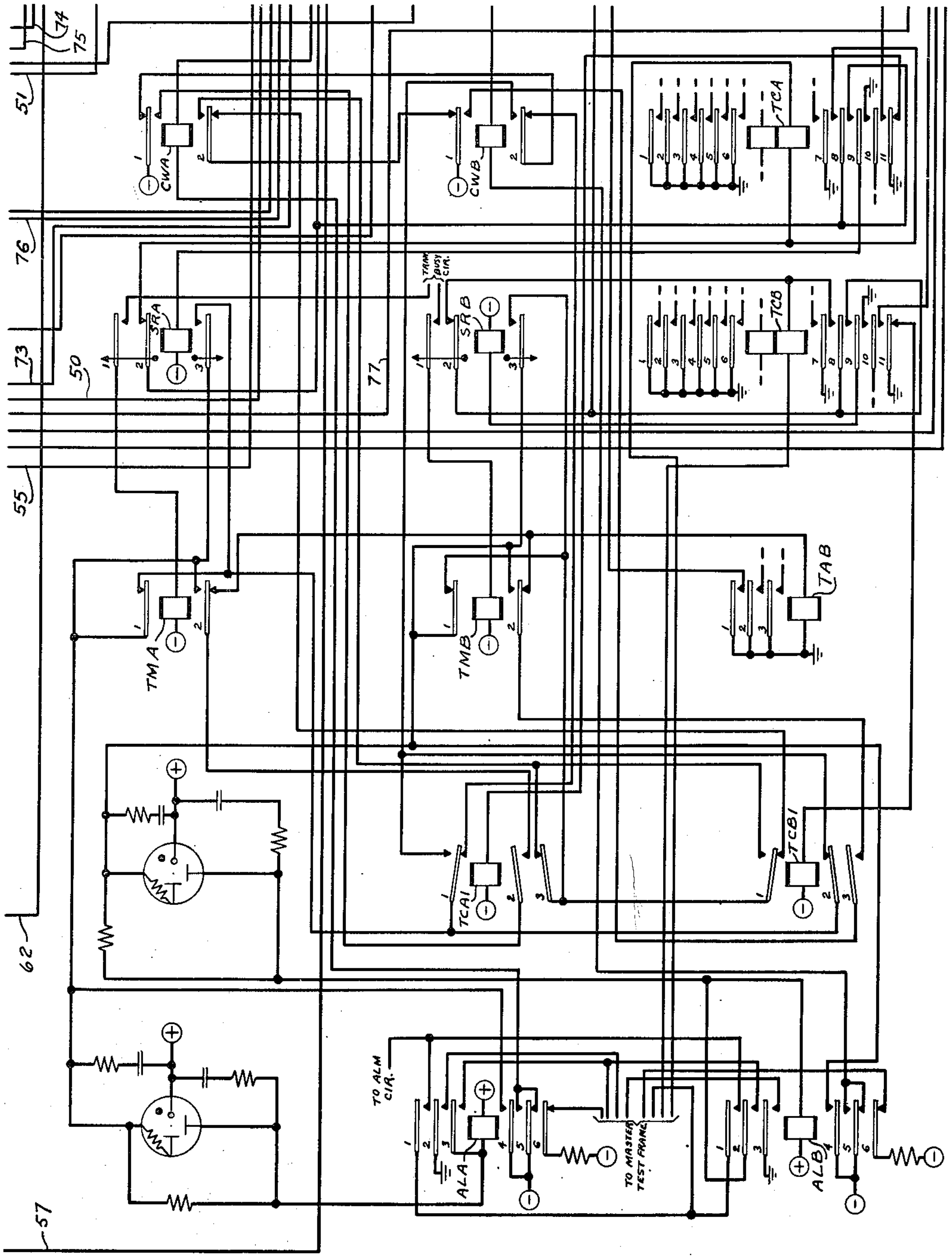
Figure 3:
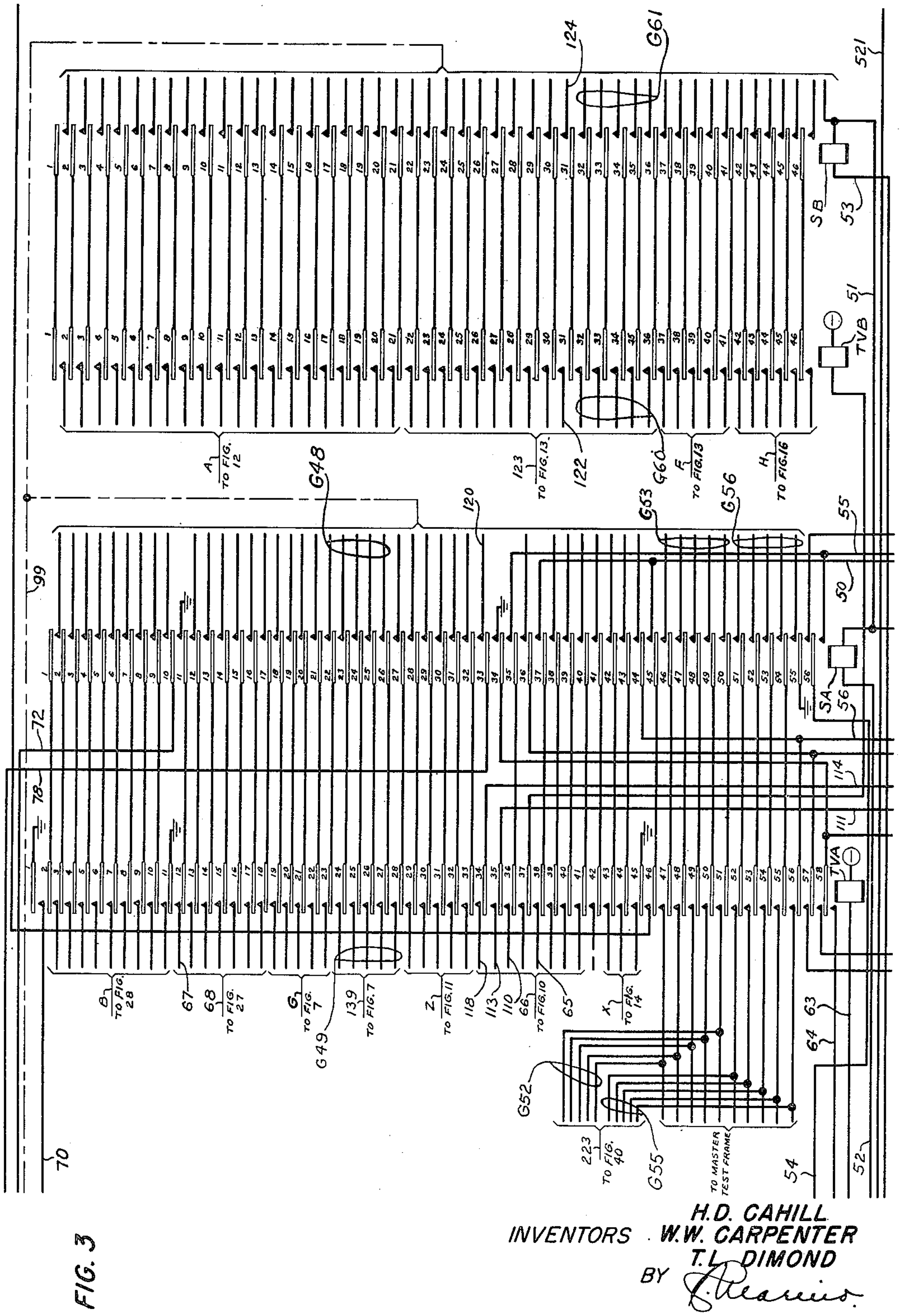
Figure 4:
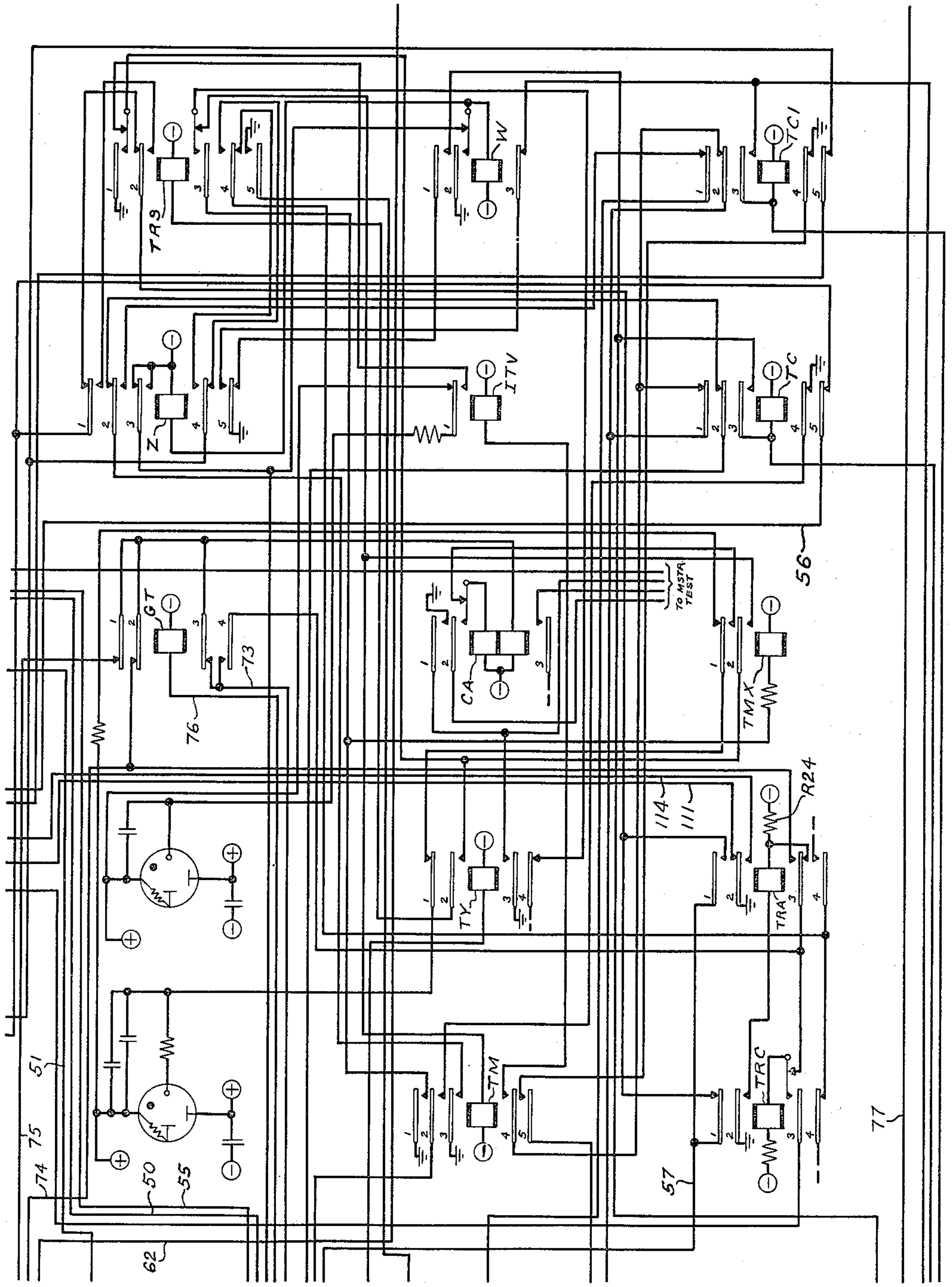
Figure 5:
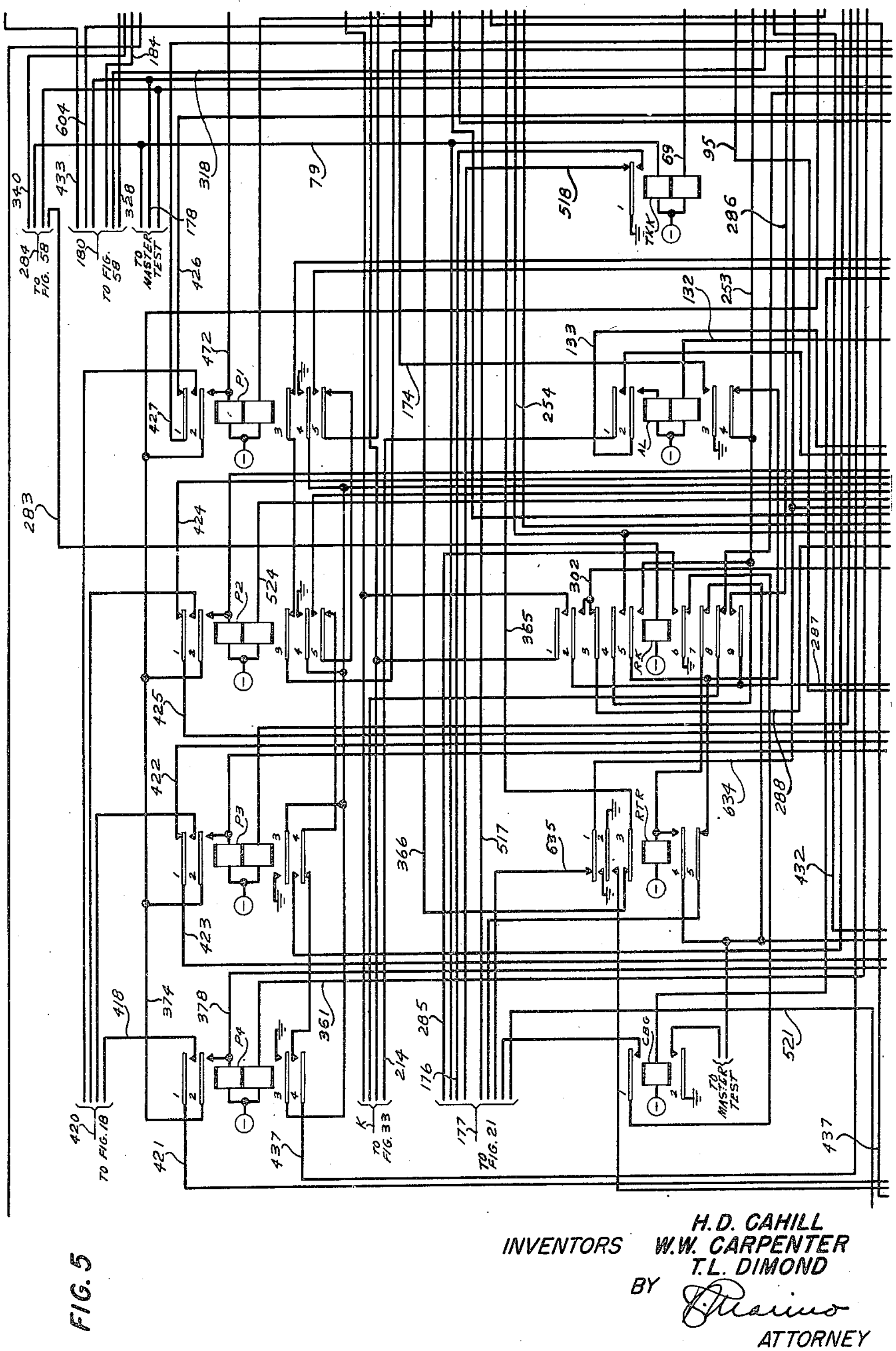
Figs. 5–33 show a transverter circuit.
Figure 6:
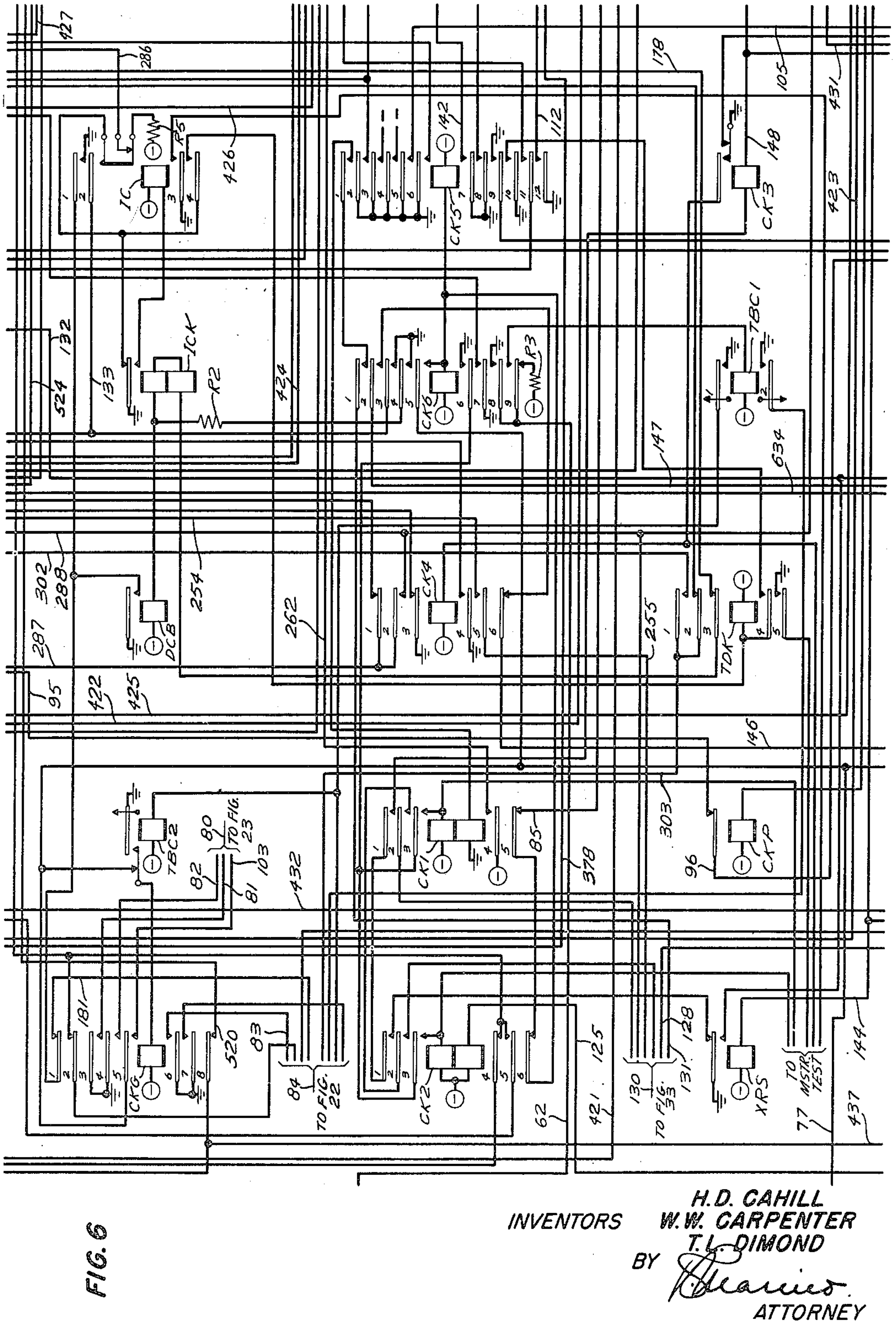
Figure 44:
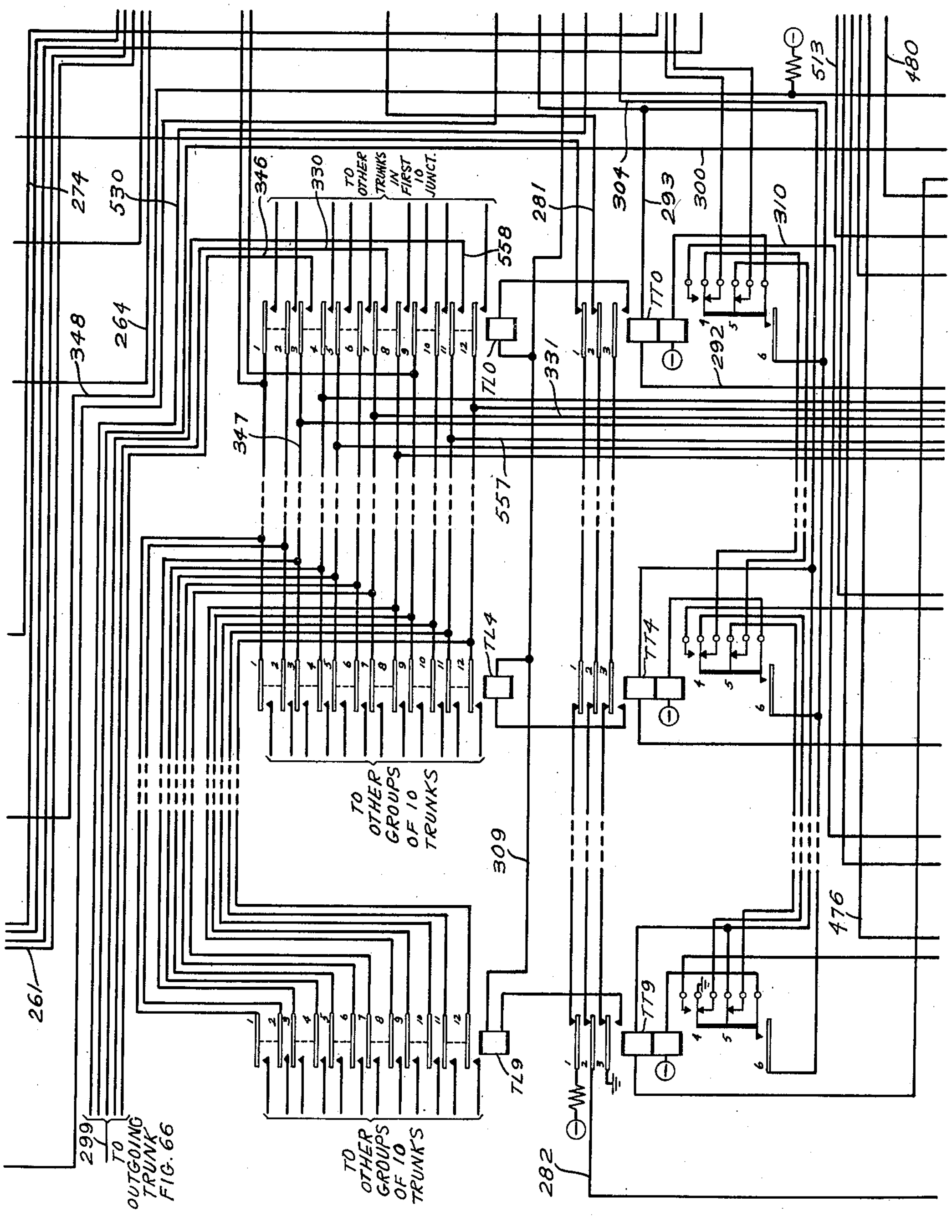
Figure 45:
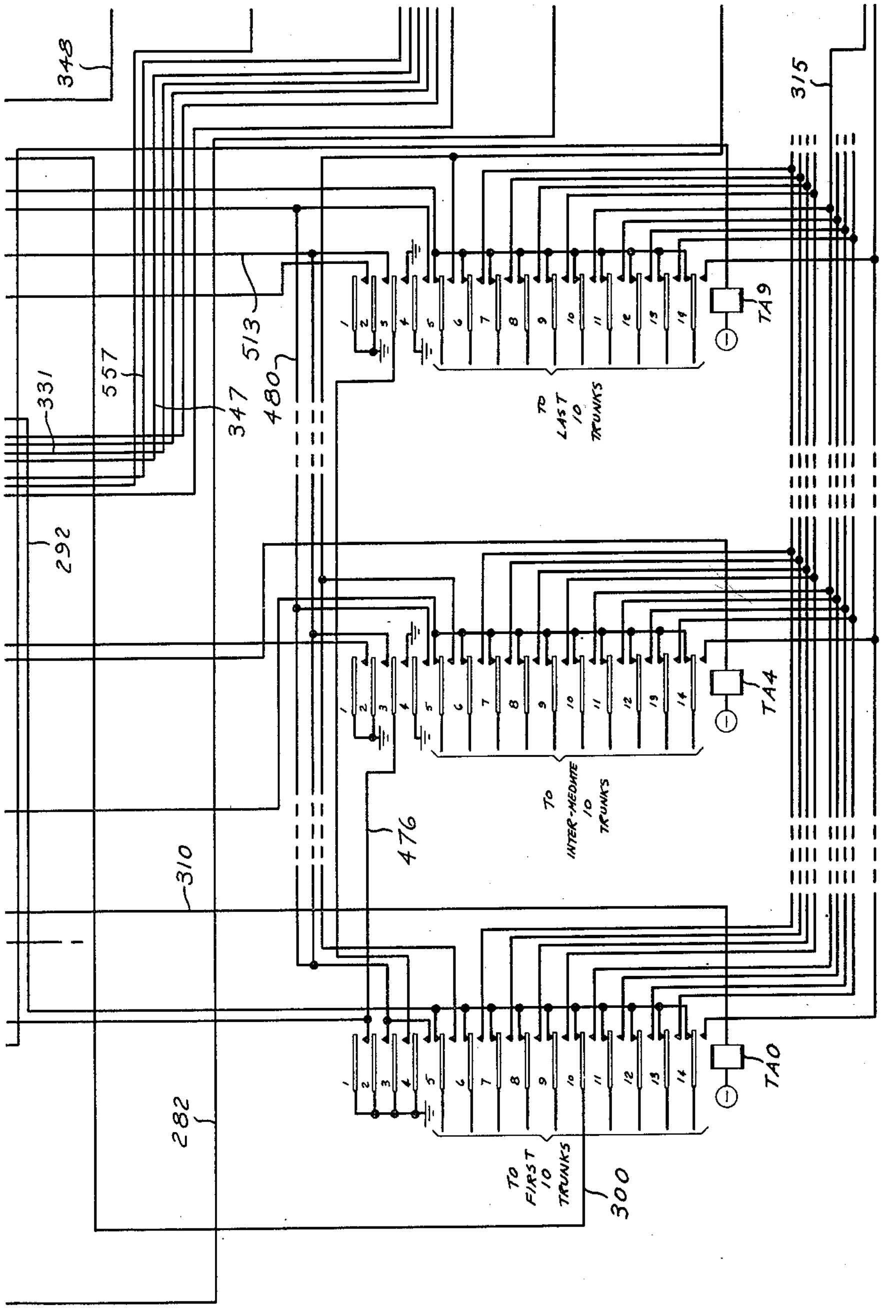
Figure 46:
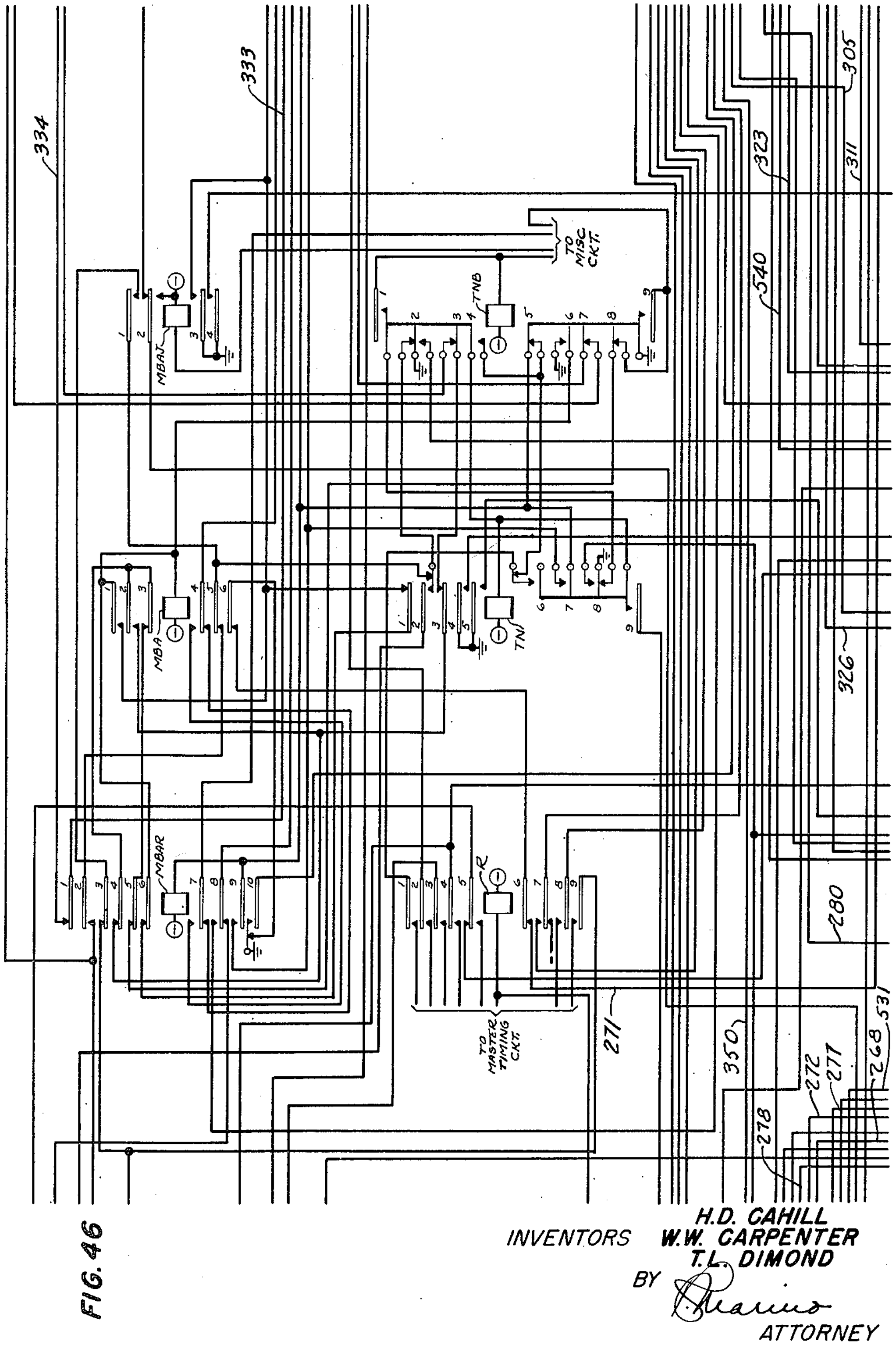
Figure 47:
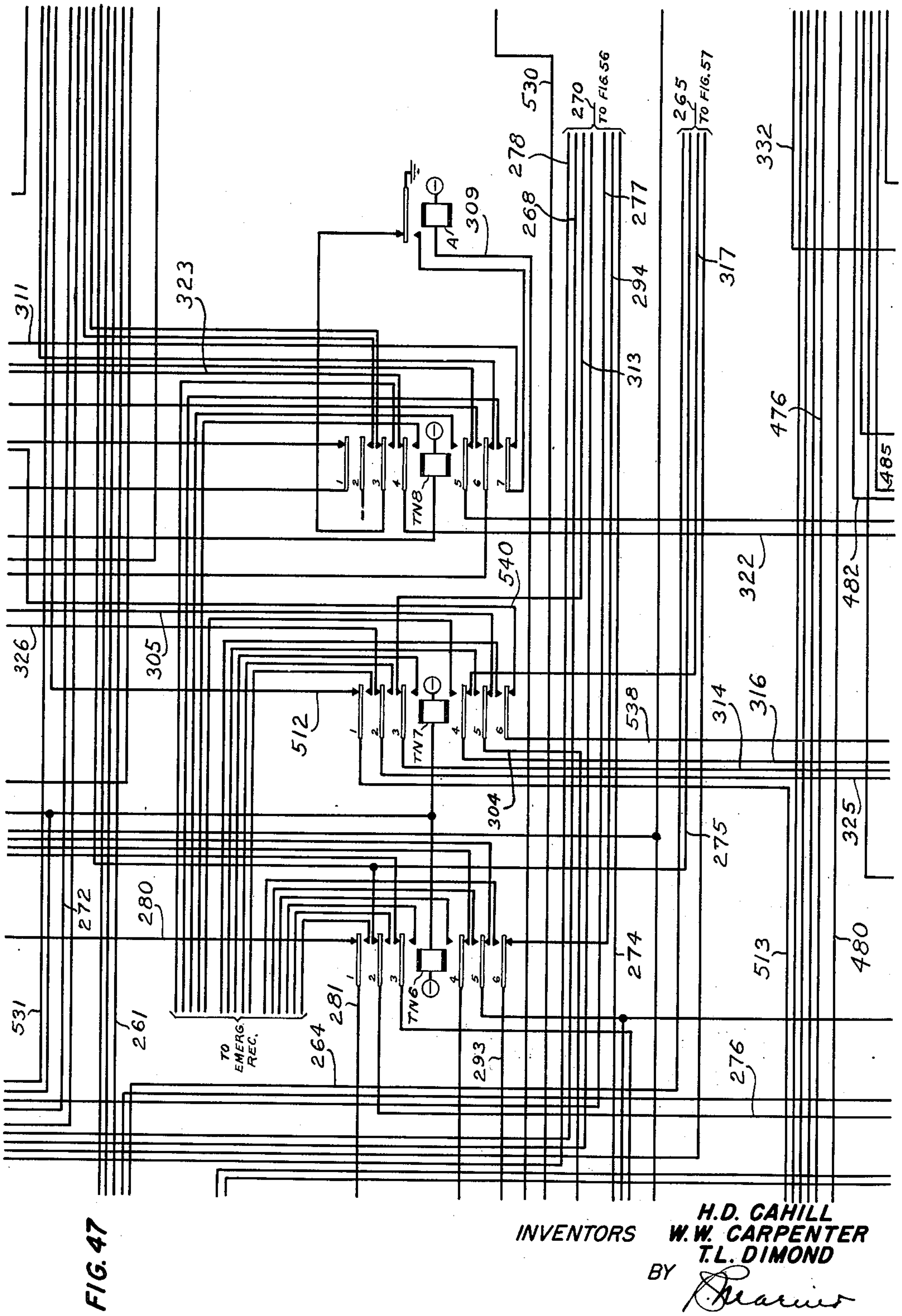
Figure 48:
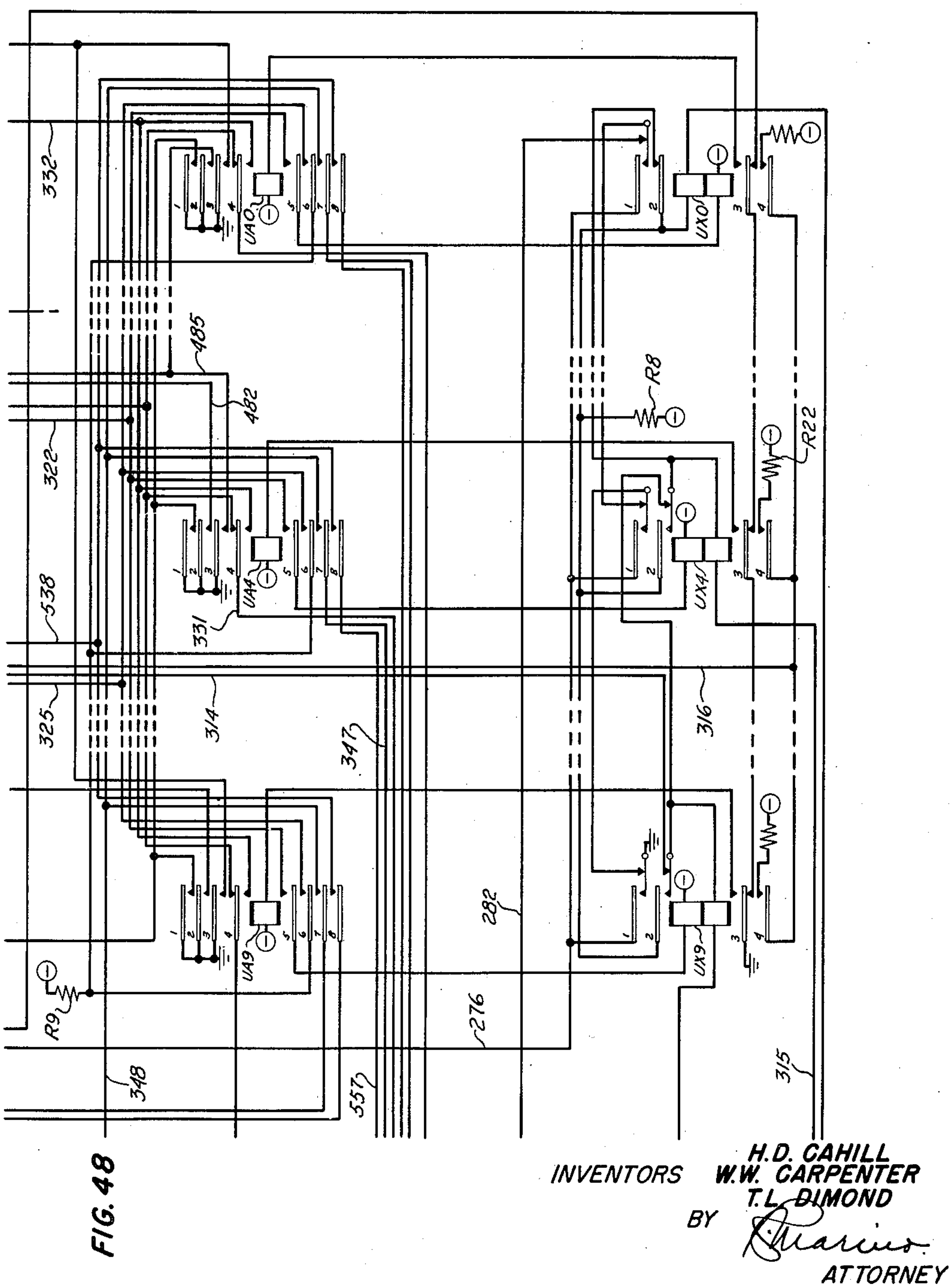
Figure 49:
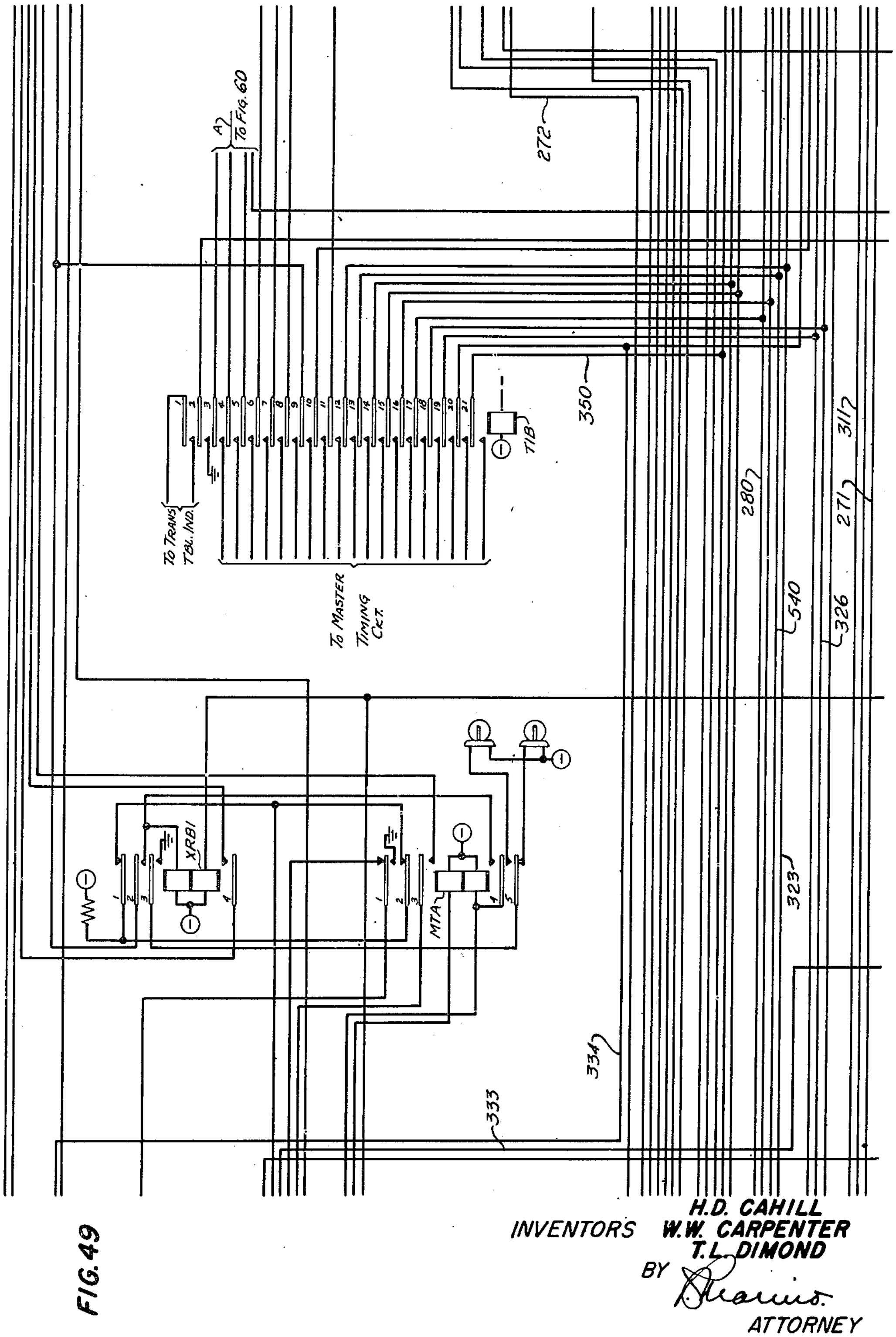
Figure 50:
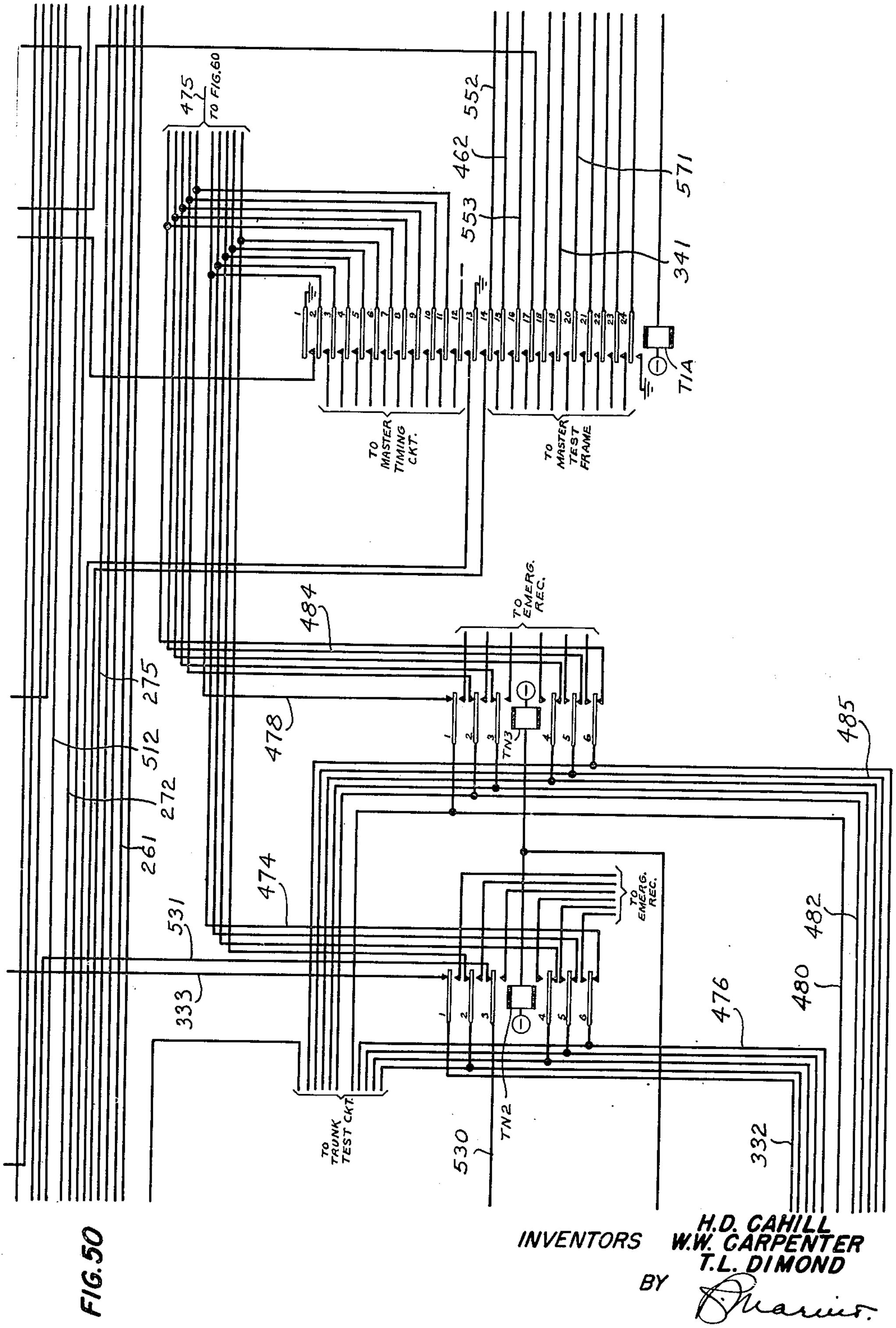
Figure 51:
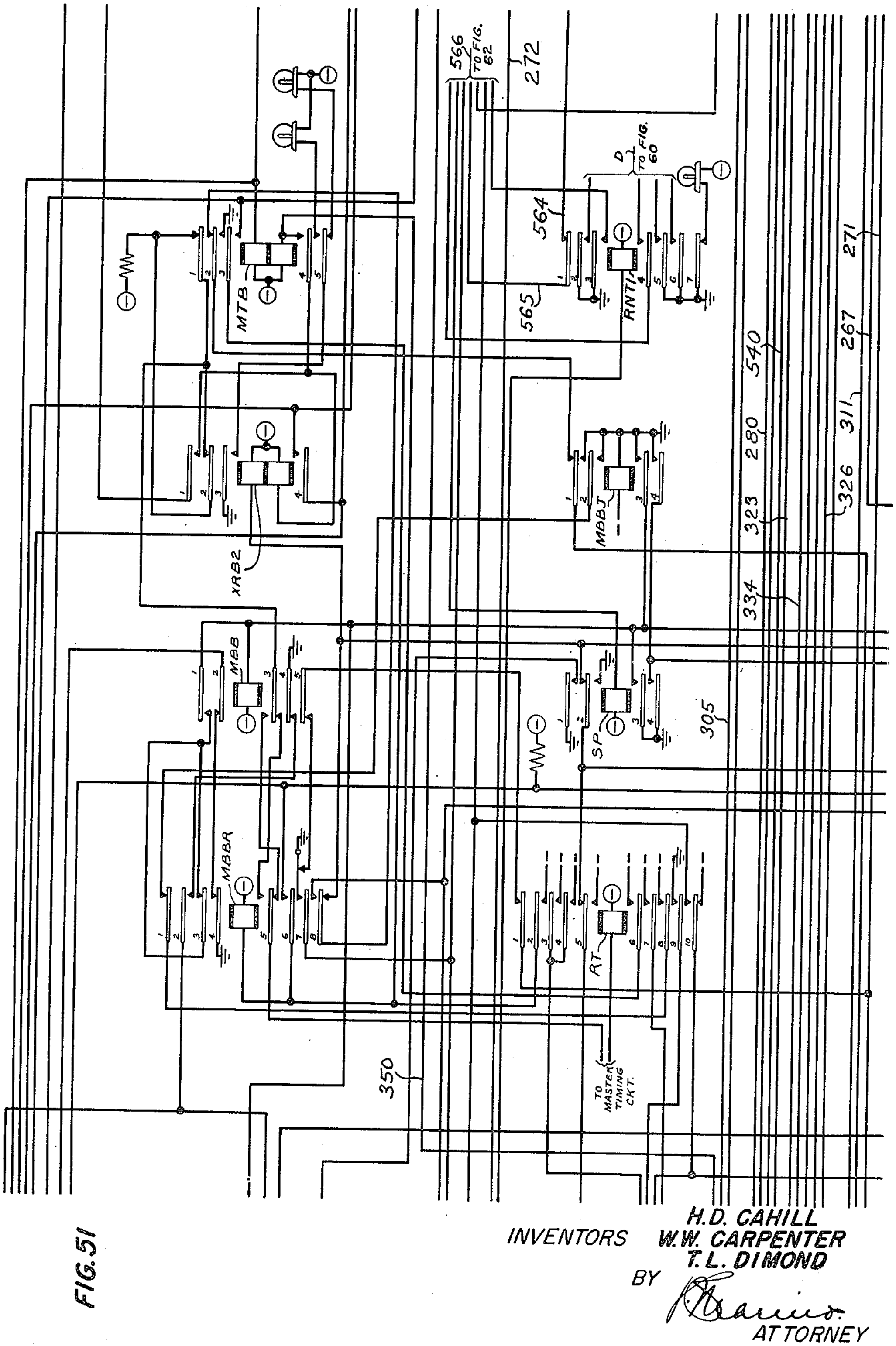
Figure 52:
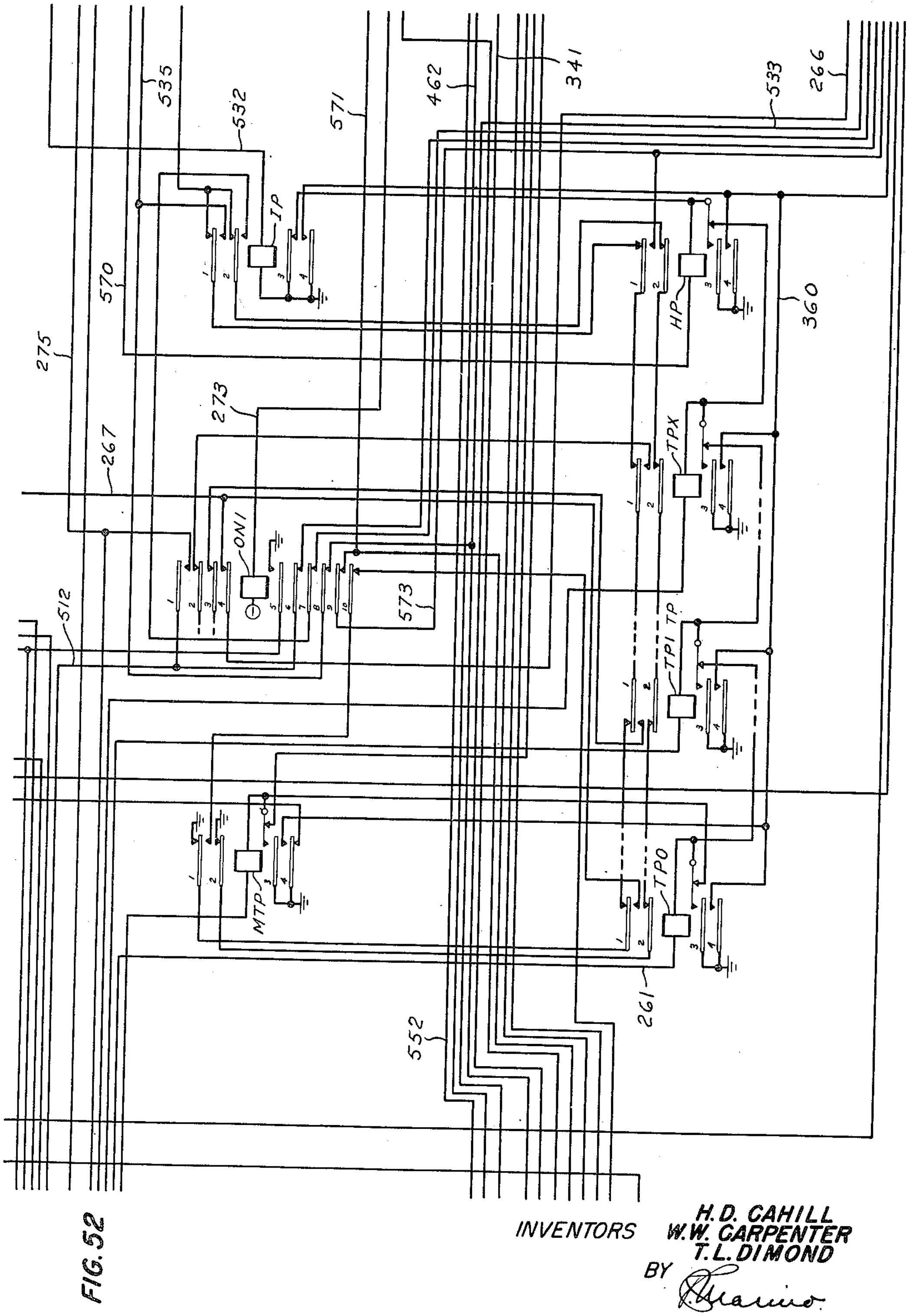
Figure 53:
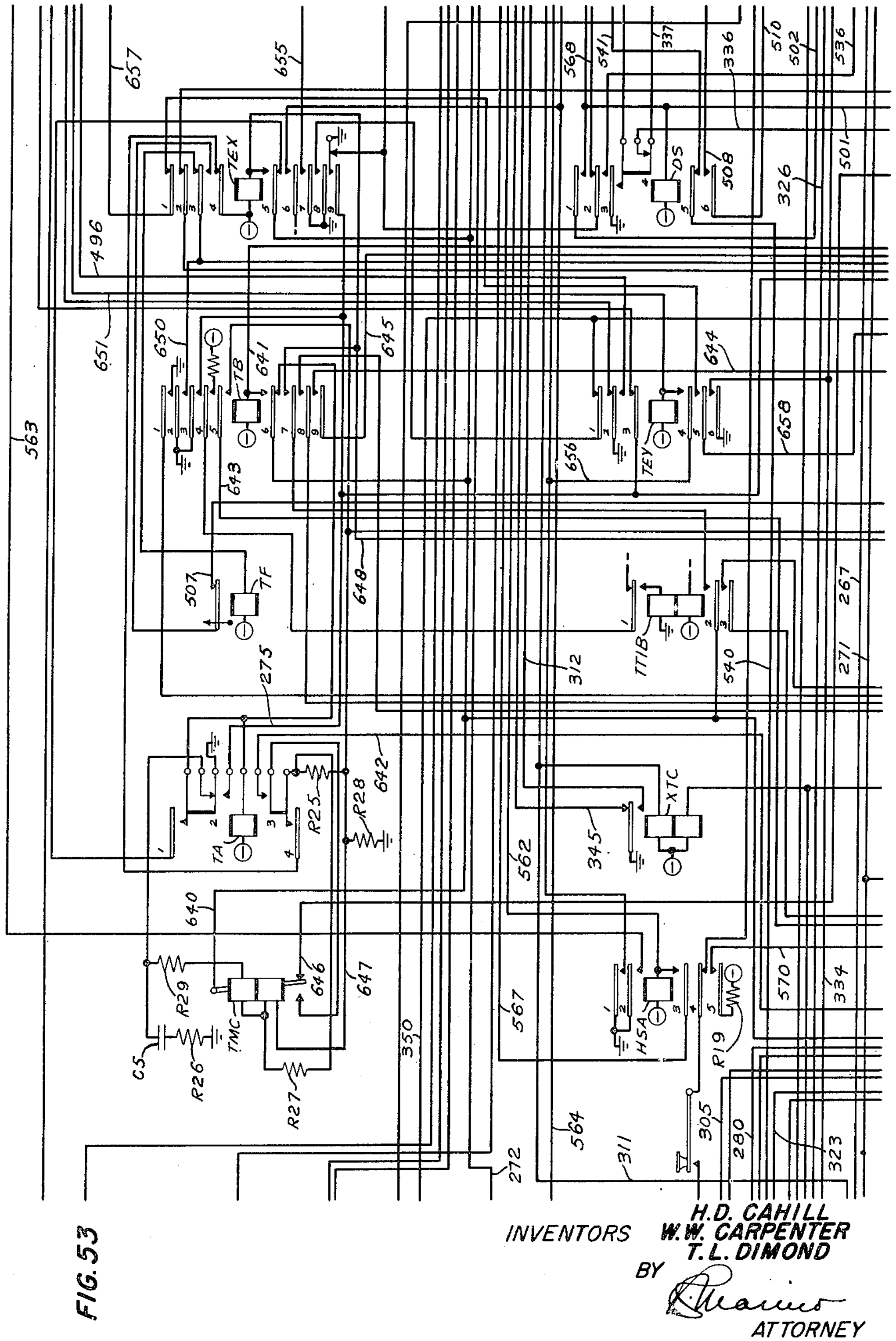
Figure 54:
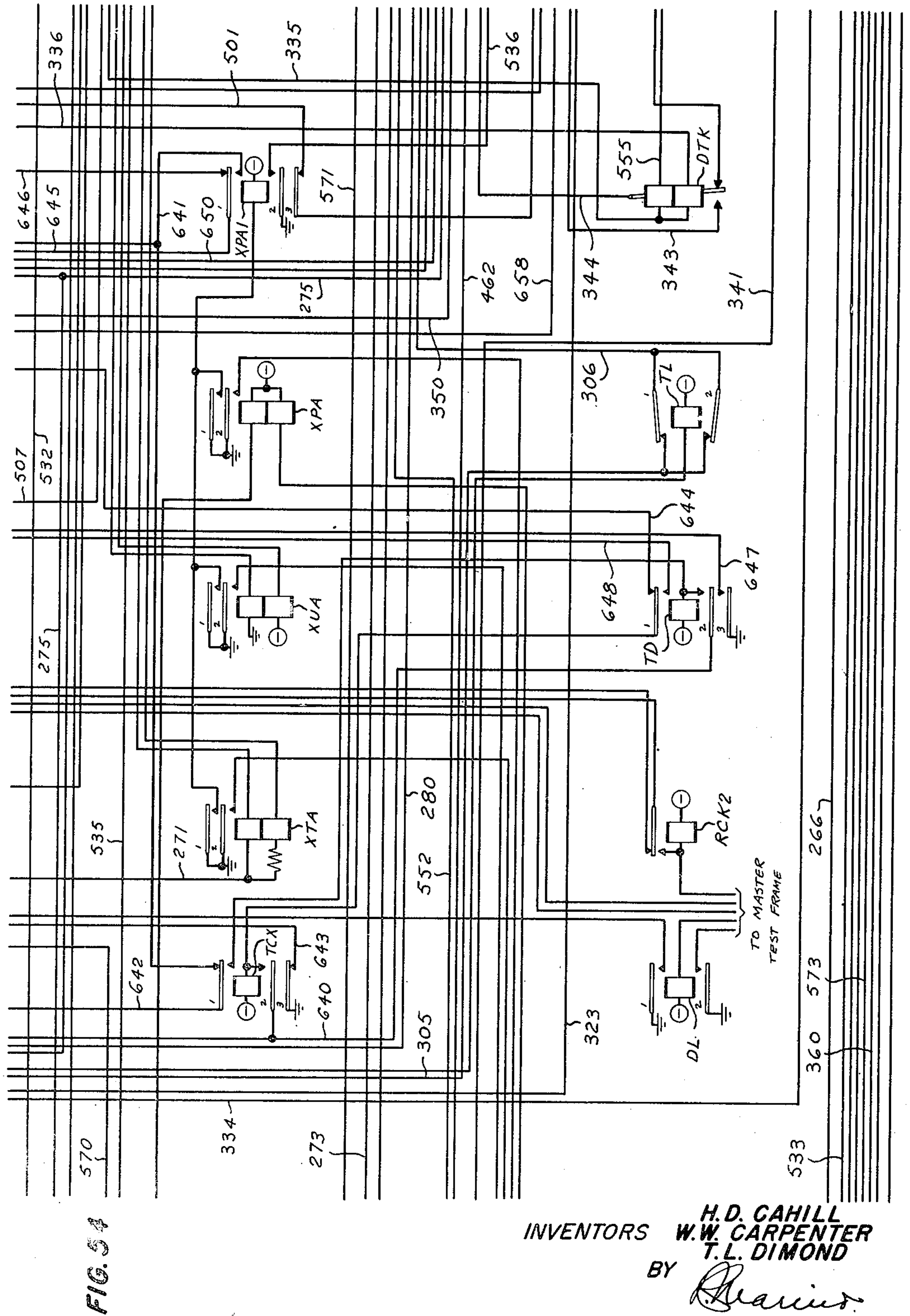
Figure 55:
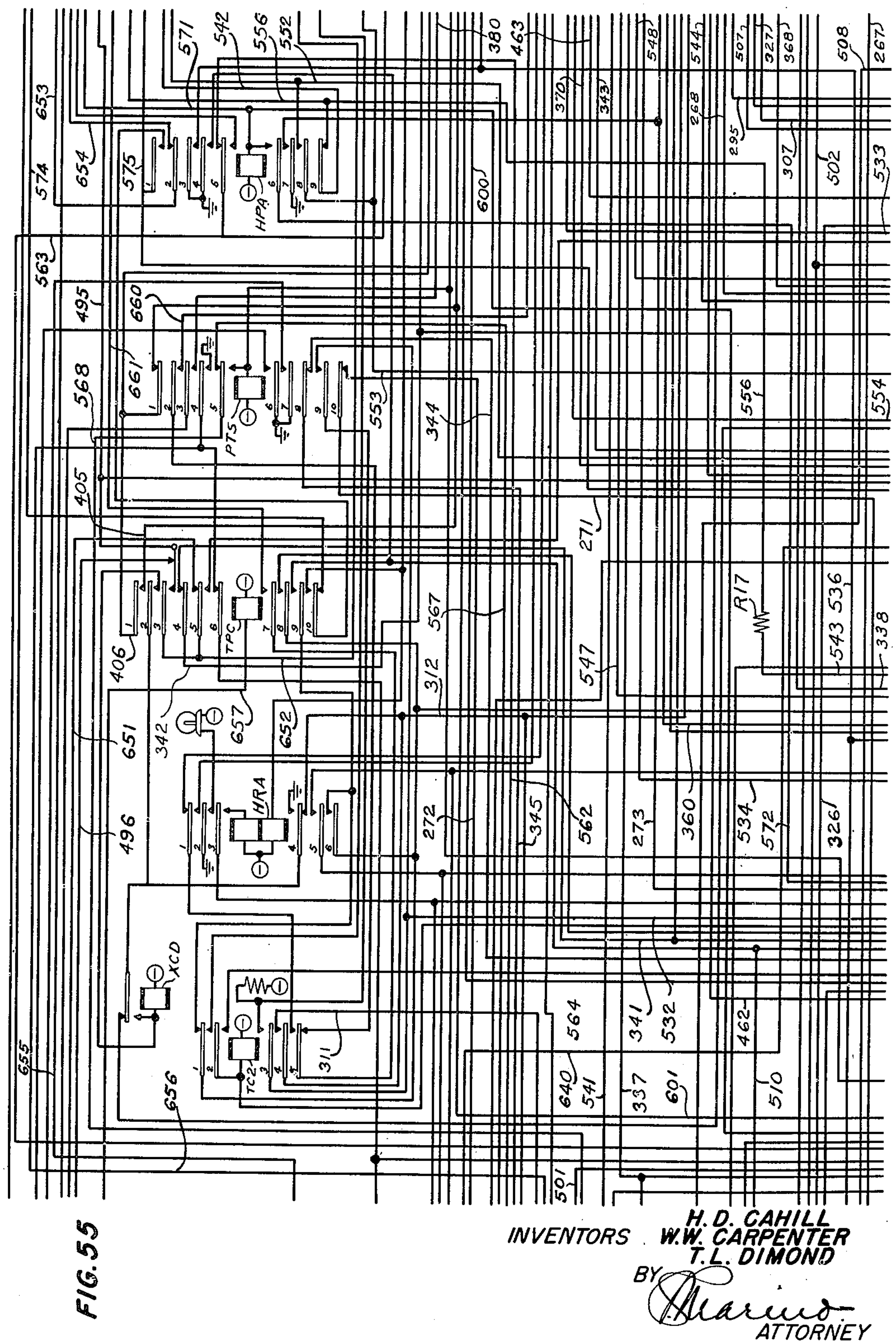
Figure 56:
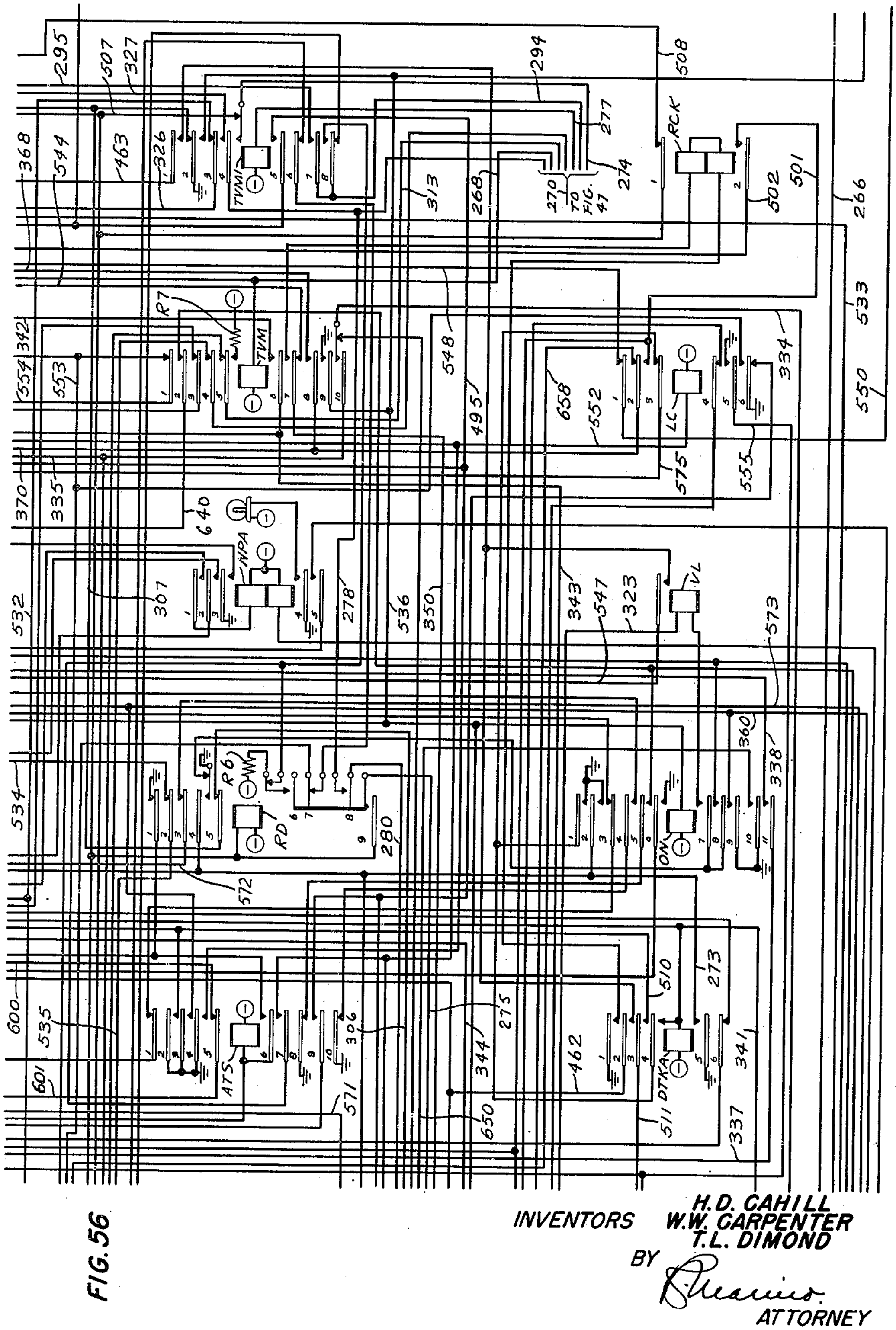
Figure 57:
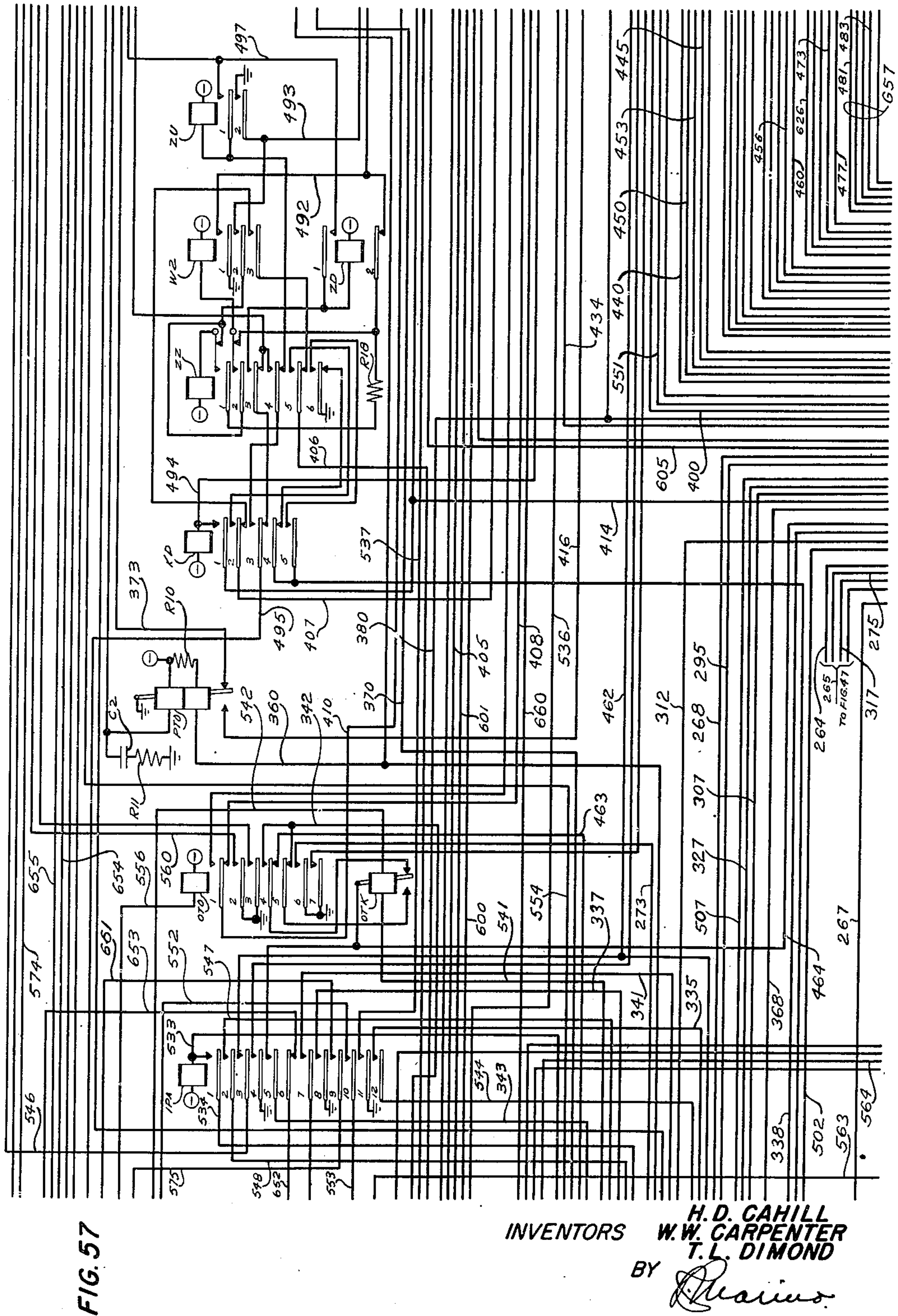
Figure 58:
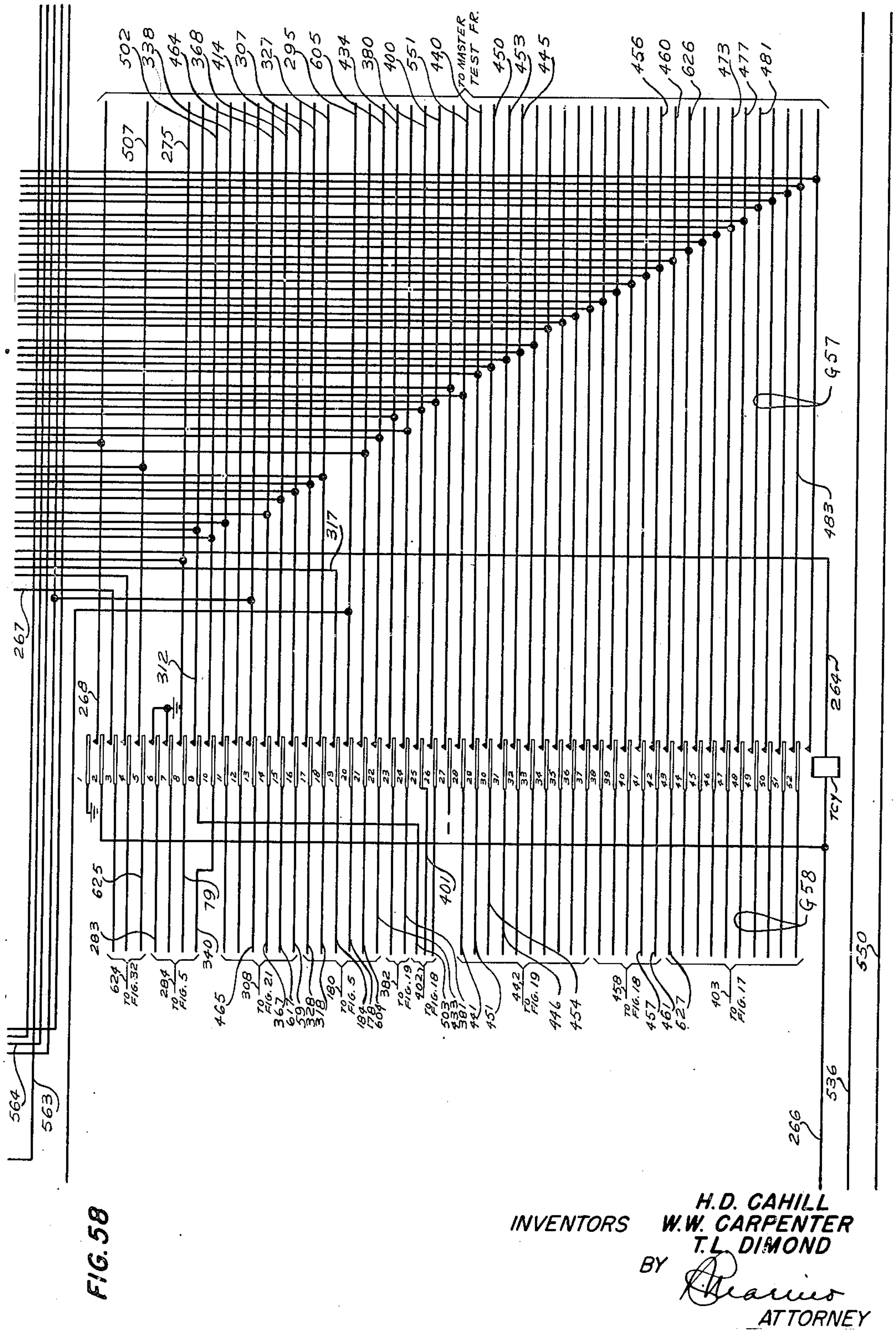
Figure 59:
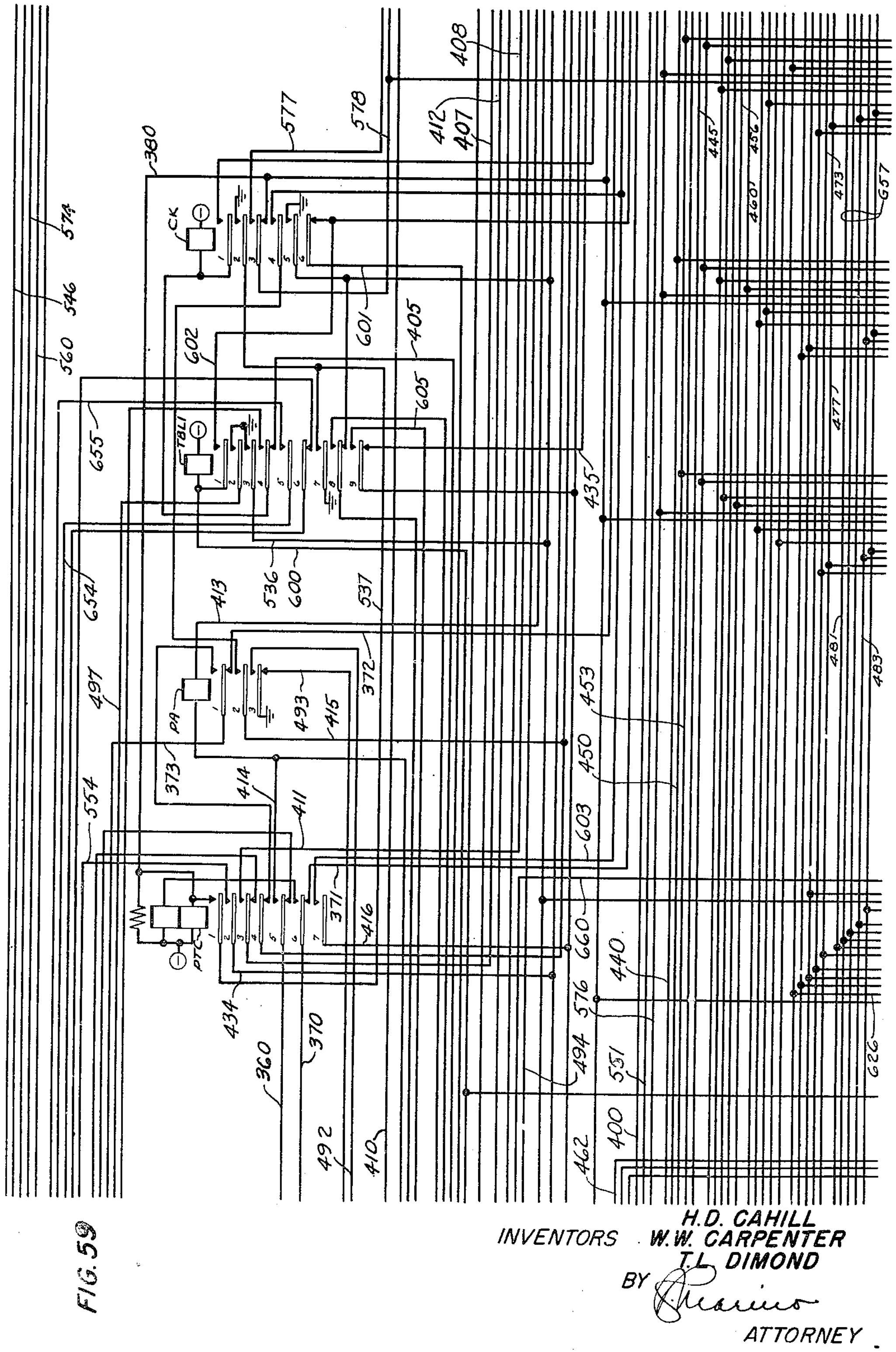
Figure 60:
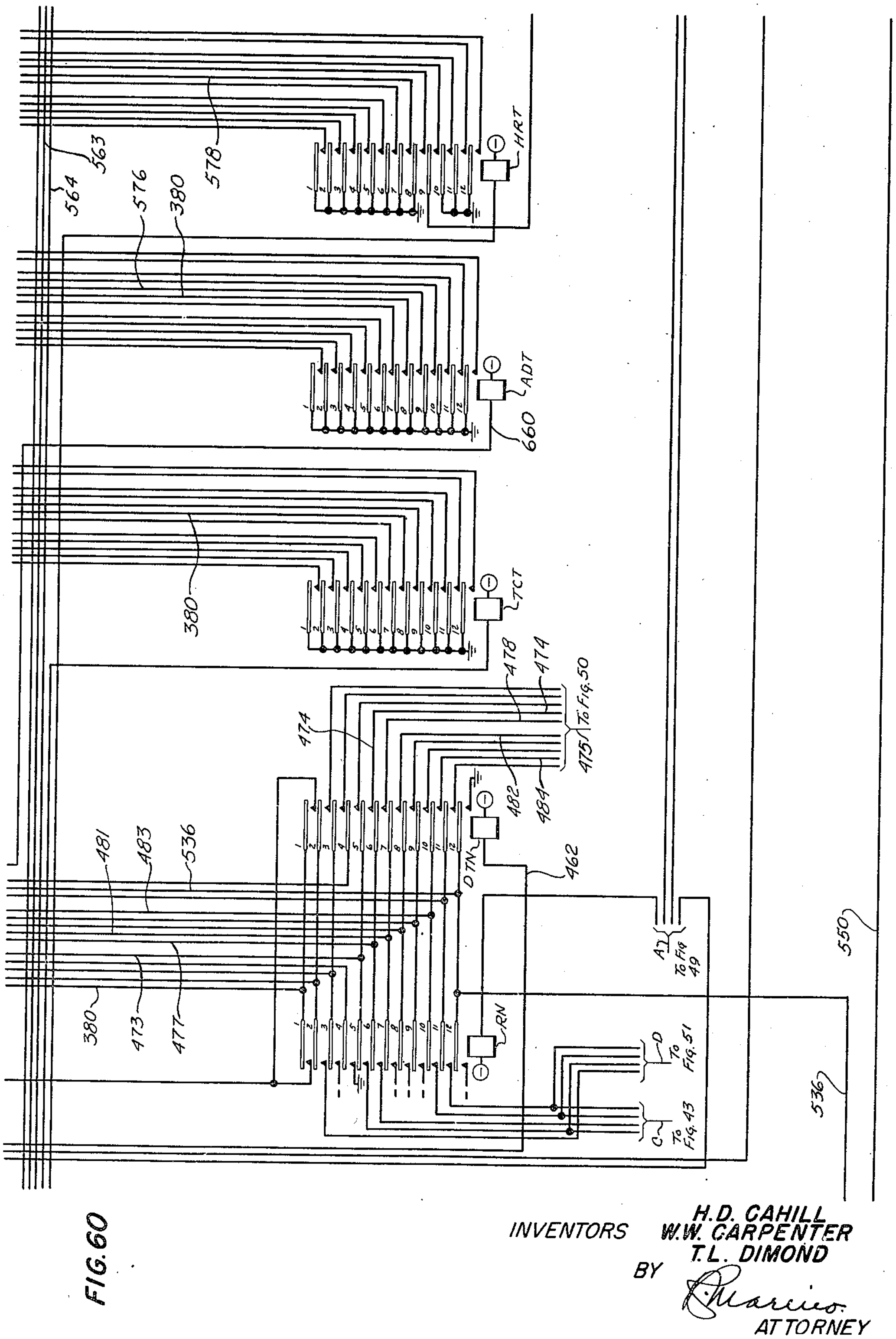
Figure 61:
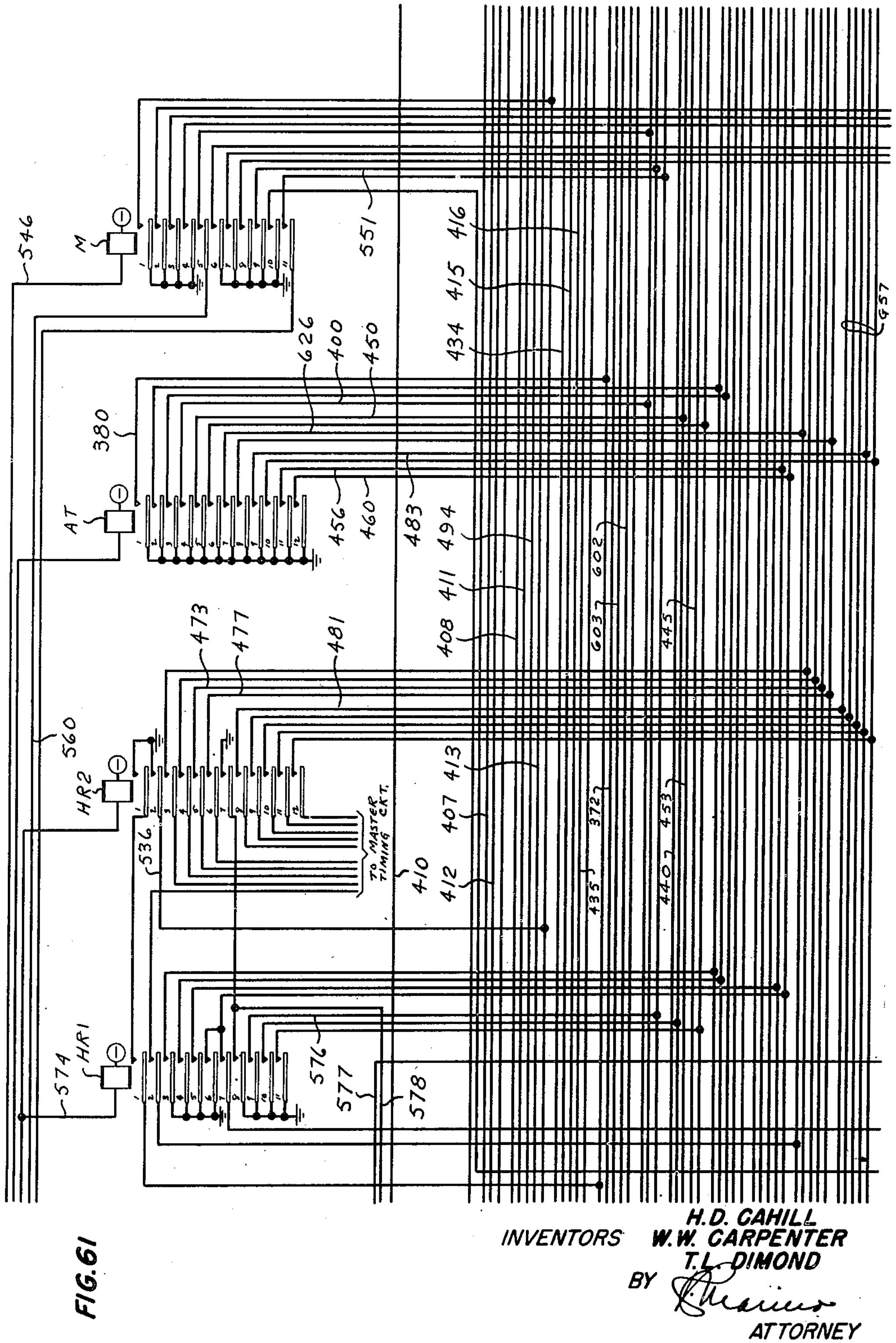
Figure 62:
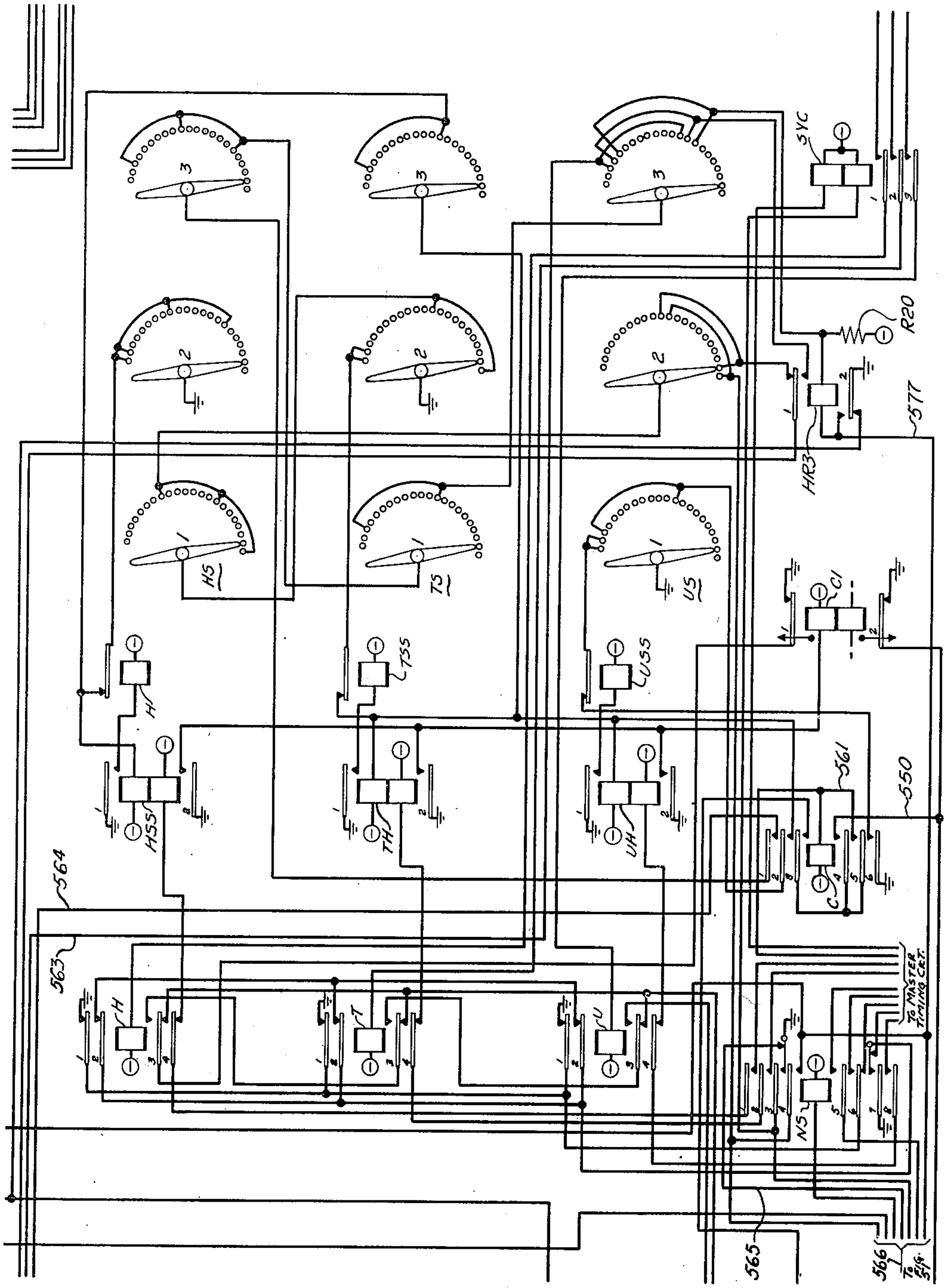
Figure 63:
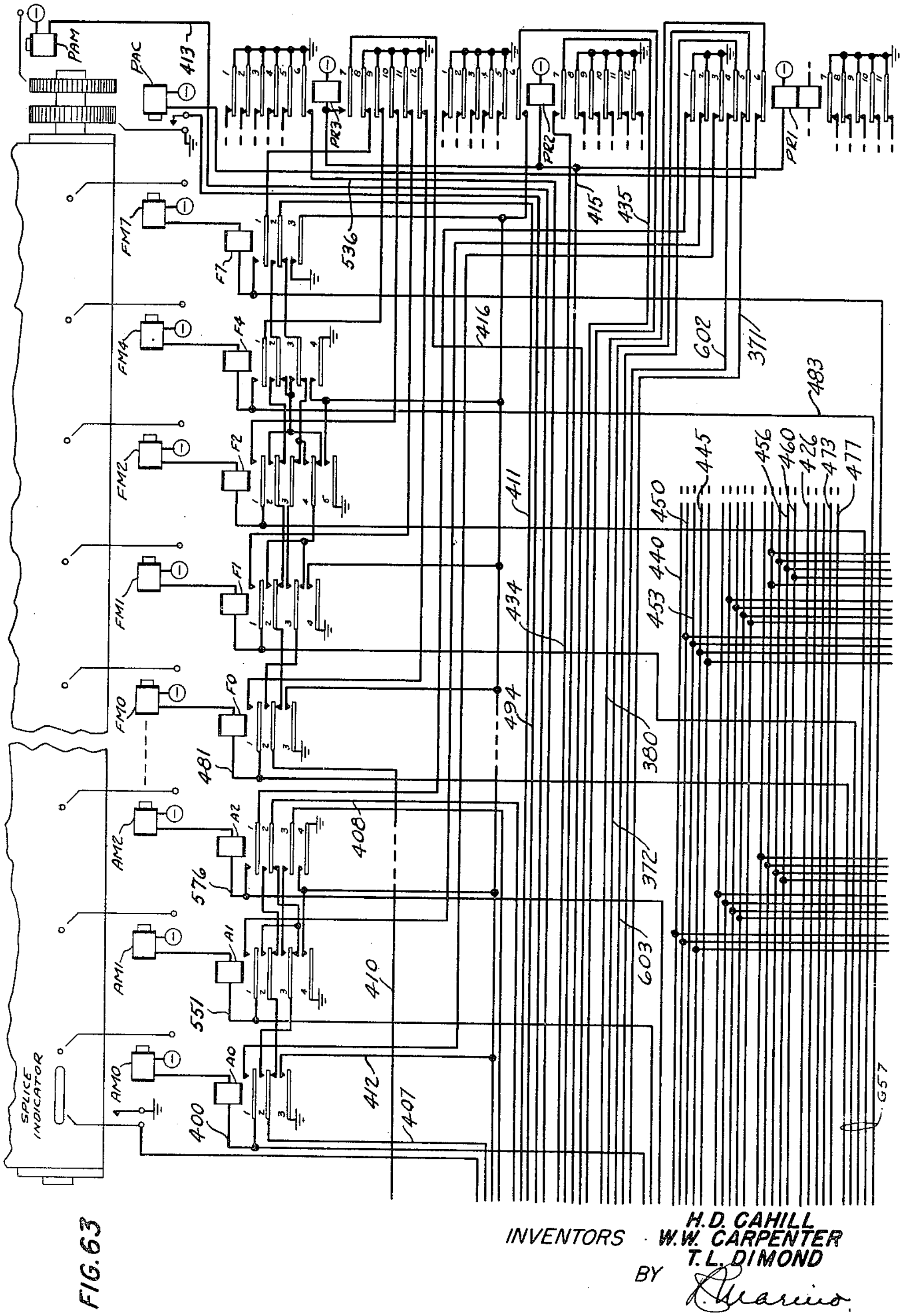
Figure 64:
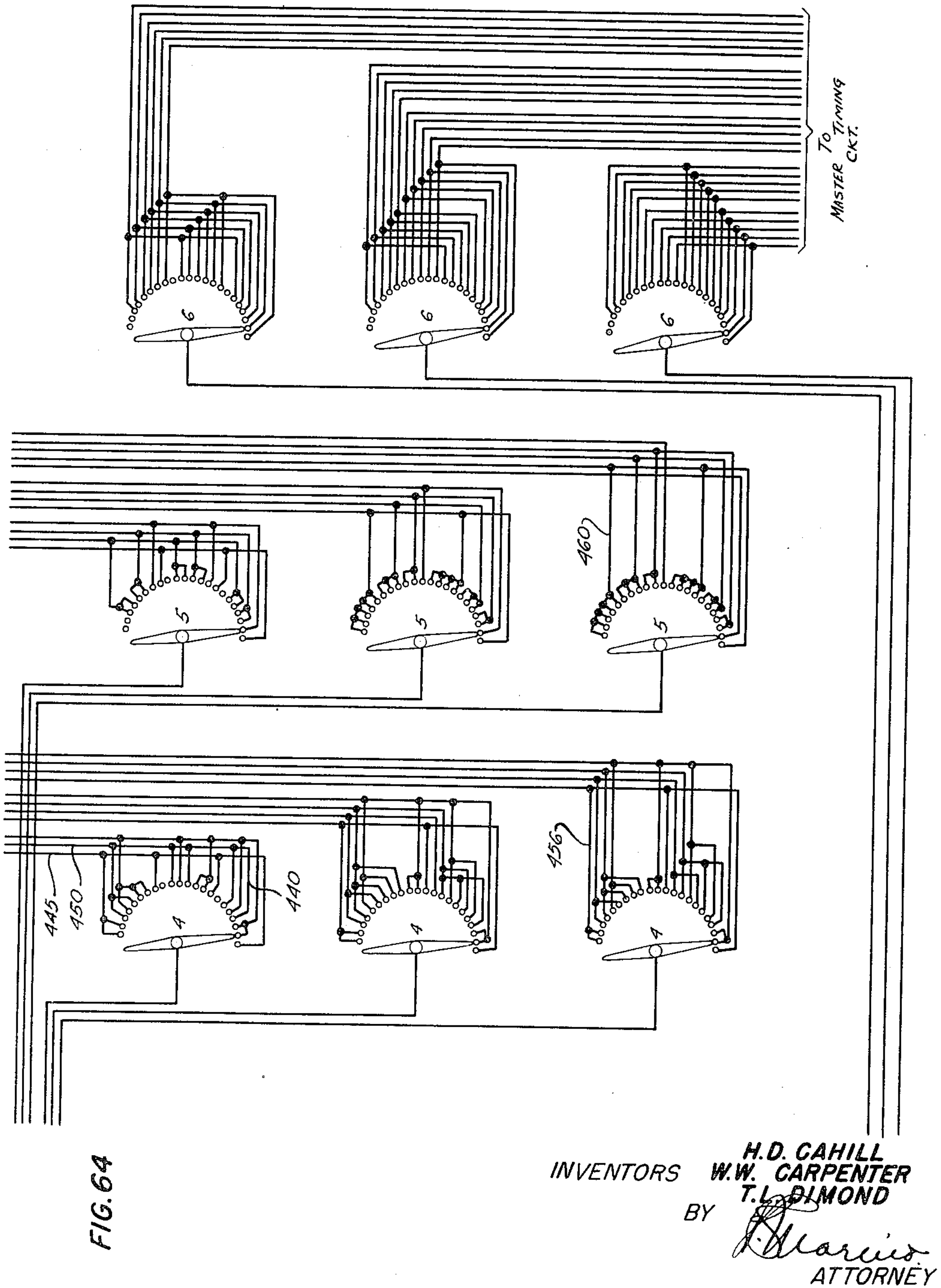
Figure 65:
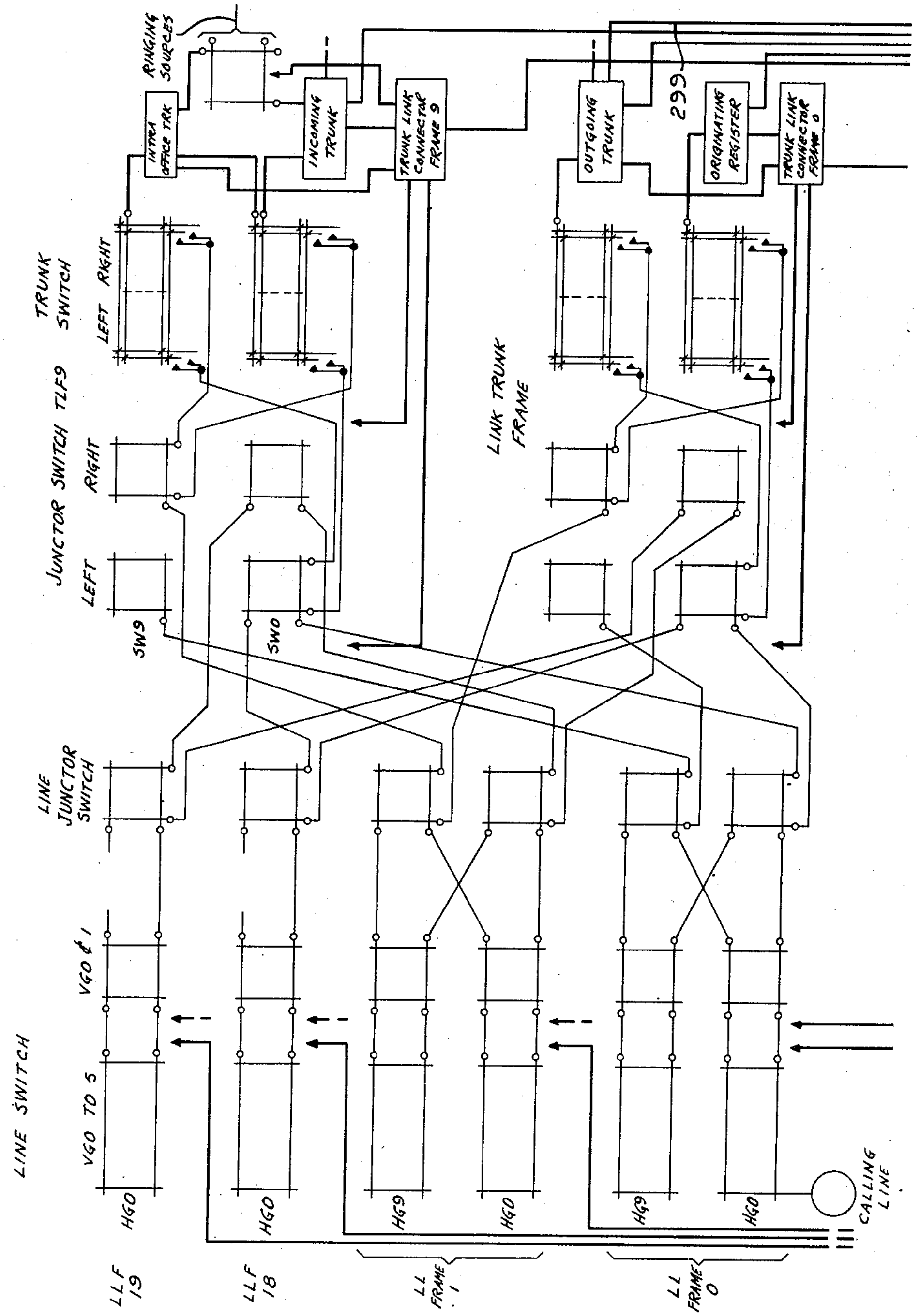
Figure 66:
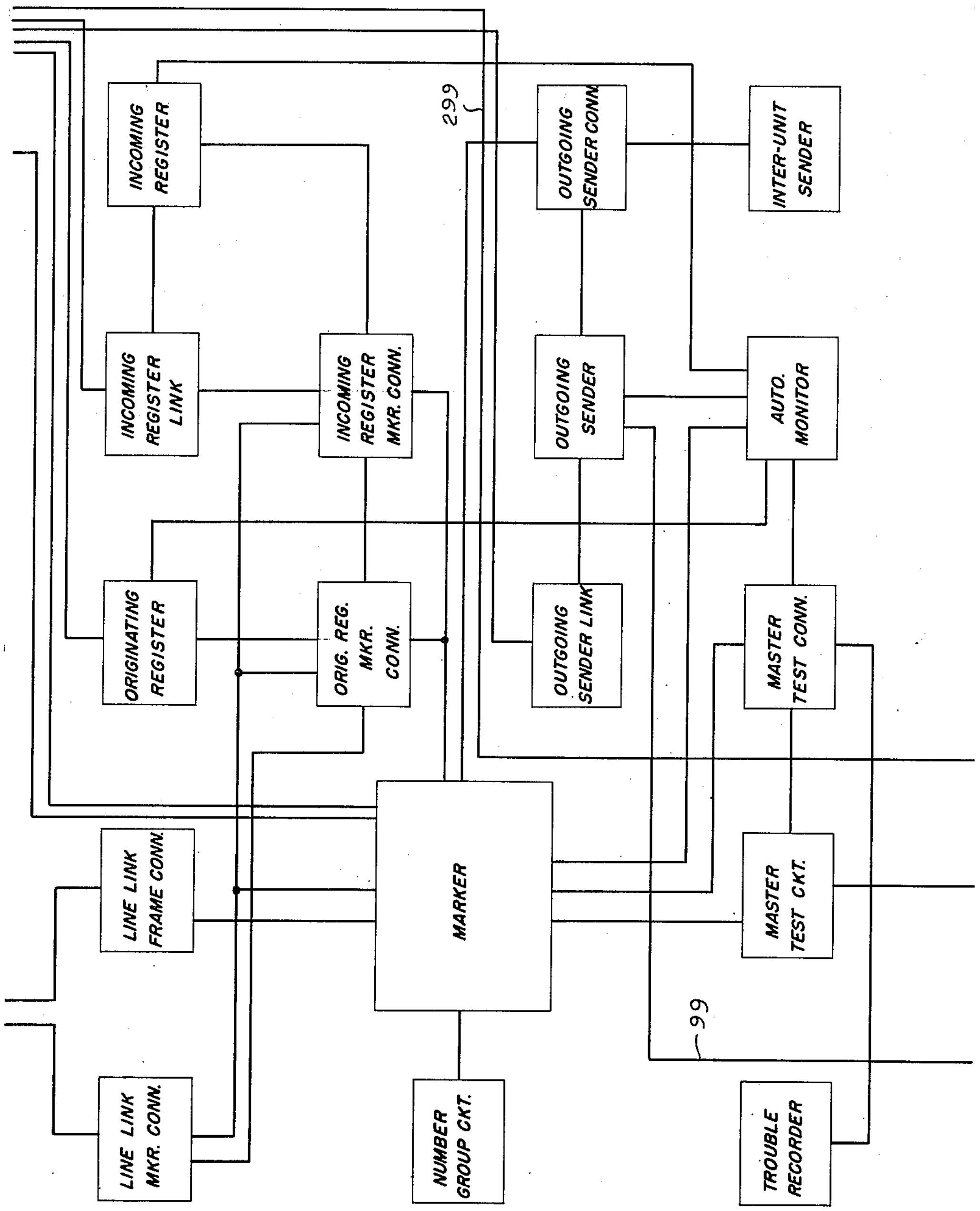
Figure 67:
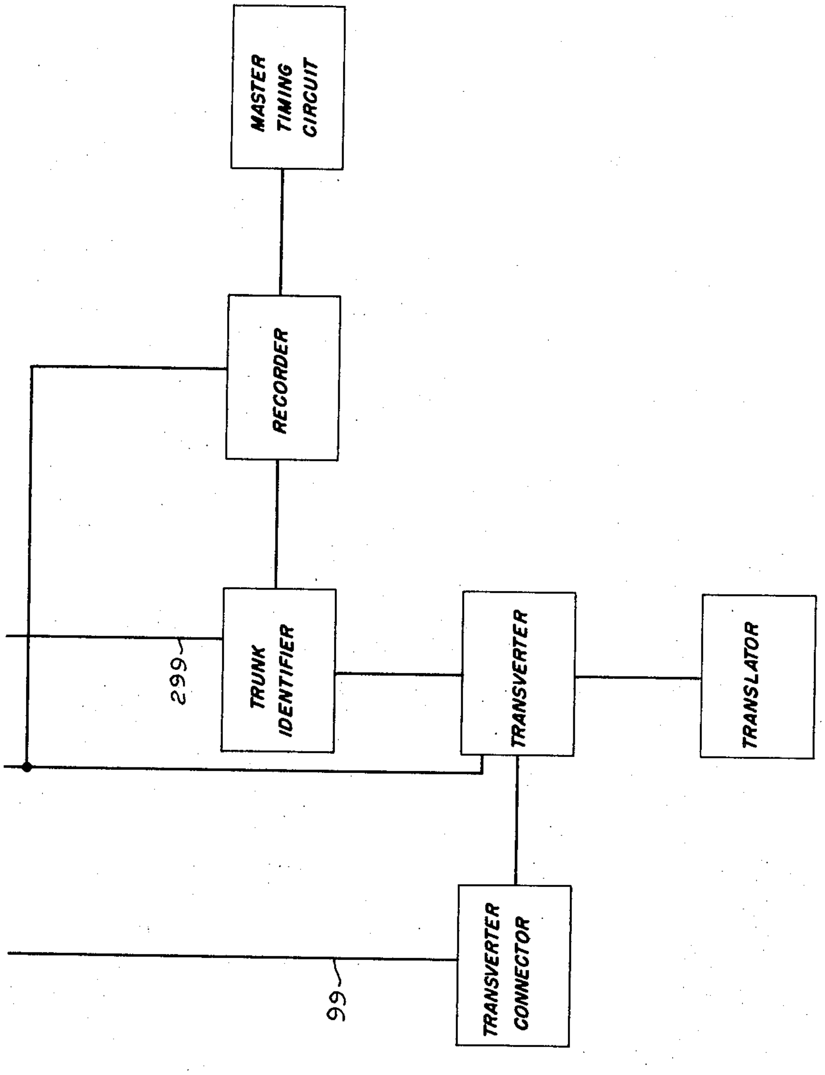
Figure 68:
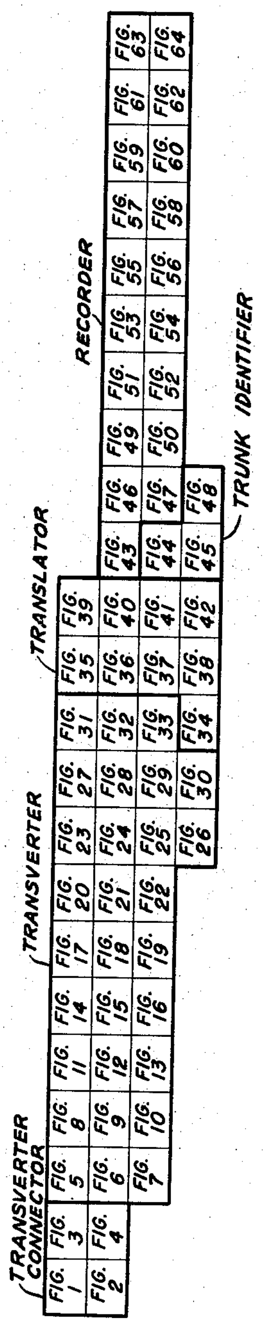
Figure 69:
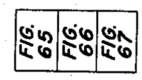

Fig. 63 also shows a recorder;

Figs. 44, 45 and 48 show a trunk-identifier circuit;

Figs. 65–67 show in diagrammatic form a complete telephone system including a diagrammatic indication of the recording equipment;

Fig. 68 shows how Figs. 1–64 should be placed in relation to one another to disclose the recording circuits; and Fig. 69 shows how Figs. 65–67 should be placed in relation to one another to disclose the complete recording telephone system.

The invention is illustrated in its application to the telephone system disclosed in the concurrently filed application of A. J. Busch, Serial No. 57,394, filed October 29, 1948, and now Patent No. 2,585,904, dated February 19, 1952, which is incorporated herein by reference. The recording means functions, of course, in association with the elements of the telephone system and is controlled thereby. The telephone system is, however, extensive and the inclusion in the present application of drawings and descriptions of the whole of the telephone system, as well as of the recording means and its associated equipment, would greatly expand and complicate the drawings and unduly lengthen the specification. Only such parts of the telephone system as are essential to the recording functions are, therefore, shown and described in detail herein. It is believed that, by reference to the above-mentioned A. J. Busch patent for a more complete understanding of the construction and operation of such parts of the telephone system as are not herein shown in detail, the operation of the recording system and its association with the telephone system will be clearly understood.

The telephone system of the present embodiment of the invention comprises line links by which the lines of calling stations are extended, trunk links for further extending the lines of calling stations to trunks, outgoing trunks of various types, markers, originating registers for registering called numbers, outgoing senders for controlling connections to distant points, and various connectors and links for associating these elements. All of these elements are indicated diagrammatically in Figs. 65 and 66 and are shown and described in detail in the above-mentioned copending application. For recording purposes, in accordance with the present invention, one or more recorders, transverters, transverter connectors, trunk identifiers, and master timing circuits are provided. Fig. 67 shows diagrammatically the association of these latter elements with one another and with the elements of the telephone system of the above-mentioned copending application. For simplicity, only one of each element is indicated. These will serve to illustrate the invention but it will be understood that, in an actual telephone system, a plurality of each element is usually provided, the number, in each case, depending upon the expected usage of the element.

In the present embodiment of the invention, the recorders are of the type disclosed in the application of W. W. Carpenter, Serial No. 588,401, filed April 14, 1945, and now Patent No. 2,583,086, dated January 22, 1952. Each of these recorders has twenty-eight punches controlled by individual magnets and arranged in a line across a wide paper tape carried by a drum. Each punch, when actuated, produces a small round depression in the paper tape. One of the first three punches is operated to record, by the position of the resulting depression in the tape, the digit "0" or the digit "1" or the digit "2." A digit so recorded is an "index digit" indicating the character of the information recorded in the remainder of the line. A combination of two punches in each group of five consecutive punches of the remainder of the punches is actuated to record five additional digits, the particular digit recorded in each group being indicated by the relative positions of the two depressions produced by the particular combination of two punches actuated. For convenience, the five punches in each group are designated (0), (1), (2), (4) and (7), respectively. The digits recorded by the actuation of combinations of two punches of the group are as follows:

| Digit | Punches Actuated in Group of Five Punches |
|---|---|
| 1 | (0) (1) |
| 2 | (0) (2) |
| 3 | (1) (2) |
| 4 | (0) (4) |
| 5 | (1) (4) |
| 6 | (2) (4) |
| 7 | (0) (7) |
| 8 | (1) (7) |
| 9 | (2) (7) |
| 0 | (4) (7) |

This convenient system of designations is also applied to various register relays of the system, which operate in combinations of two to register digits in accordance with the above code. It will be understood that where registration or recording in two-out-of-five code is mentioned, the above code is referred to.

When one line of six digits has been thus recorded, the drum carrying the paper tape is stepped by a magnet to bring the tape to a position for recording a new line of digits by the same punches. The digits recorded (except the first digit of each line) represent items of information relating to telephone calls, the significance of each digit depending upon the line in which it is recorded and its position in said line.

Each recorder is provided with equipment for recording time intervals and this equipment is synchronized and controlled by the master timing circuit. The master timing circuit also causes the recording on the tape of each recorder of an entry at each hour containing a record of the month, day and hour at which the entry is made. By means of these "calendar" entries, the approximate time of any entry on a recorder tape may be determined. The above-mentioned copending application of W. W. Carpenter and R. E. Collis shows and fully describes records of this type.

As mentioned above and more fully described below, certain information is required in connection with each telephone call for which a charge is to be made, the amount and character of the information depending upon the type of call. For a call to be billed in "message units," for example, it is necessary to record the number of the calling station and the rate at which the charge for the call is to be computed. For a call to be billed as a direct "money charge," on the other hand, it is necessary to record, in addition to the above, particulars of the station called. This information is available in the telephone system but not all in a form suitable for recording in the manner described above. Some of it, normally registered in the telephone system, is not therein registered in the code used for recording. Furthermore, it is not practicable to record all the information required in connection with a call on one line of the record. Since the significance of each recorded digit depends upon the line in which it is recorded and its position in said line, it is necessary to place each digit in its correct position in the record and to supply additional digits to identify the various items of recorded information. The transverter mentioned above is a novel element which is provided to perform these functions. Not only does the transverter act as a code converter, but it also arranges, transposes and adds to the information to be recorded.

In the telephone system of the above-mentioned patent to A. J. Busch, a calling line is identified by its location on the line-link switches. For billing purposes, it is necessary to know the directory number of the station from which the call is made. The translators mentioned above are inductive devices which enable the transverters to obtain from the locations of calling lines and indications of the calling stations, the directory numbers of said stations.

In the present embodiment of the invention, the time of answer and the time of disconnect are recorded for each completed call. These records enable the length of conversation time of each call to be computed. They also, by their presence, clearly indicate the calls that are completed and should be charged for, and, by their absence, the calls which are not completed and should not be charged for. The principal information in connection with each call is recorded when the call is originated, this being the most convenient time to record said information. In the case of a local call to be billed in message units, the information is recorded in an entry of two lines. More information is required for a call to be billed as a direct money charge and, in this case, four lines of the record are used. Only one line is used for the record of disconnect time or of answer time. These latter entries, however, cannot be made when the call is originated but only when the call is answered and when the connection is terminated. They are, therefore, separated in time from each other and from the initial entry of the call to which they relate. Many different calls are recorded on one record tape and, in consequence, the entries of different calls are interspersed on said record. It is necessary to associate the three entries of each completed call and to distinguish them from other entries. For this purpose the number of the trunk over which a call is made is recorded in each of the entries relating to said call. This clearly distinguishes and associates the entries of the various calls, since two calls cannot be made over the same trunk at the same time. The trunk identifiers are provided to identify the trunks over which the calls are made and to cause the recorders to record these identifications.

While, as described above, an initial entry of two lines is normally made for each call chargeable in message units, for service observing purposes it is desirable to have more complete information. A four-line entry, similar to the entry made for a toll call, is therefore, made for every observed call, regardless of the way in which the call is to be billed.

For a clear understanding of the invention, the general functions of the elements of the system, indicated in Figs. 65–67, in recording information relating to a call will first be described. When a call is initiated at a calling station, a marker is associated with the line of said station by a line-link-marker connector and selects a trunk link having access to an idle originating register. The marker identifies the calling line by its location on the line-link equipment and establishes a connection from said line to the originating register through the line-link and the trunk-link. The subscriber at the calling station then receives dial tone and when he dials, the called office and number are registered in the originating register. The line-link also indicates to the originating register the party identification of the calling station. The originating register then indicates to the marker the office called, from which the marker determines the route of the call, selecting in accordance therewith a trunk-link having access to an appropriate trunk and to an idle outgoing sender. The calling line is then extended through said trunk-link to said trunk and the originating register is connected to an outgoing sender by an outgoing-sender link. The marker is also connected to the outgoing sender by an outgoing-sender connector. Particulars of the call, including information relating to the calling station, the called station, the class of the call, the number of the trunk group, and the message-billing index or rate of charge determined by the marker are registered in the outgoing sender. When this information has been transferred to the outgoing sender, the marker and originating register are dismissed. These operations are described in greater detail in the abovementioned patent to A. J. Busch.

The outgoing sender controls the completion of the connection to the called station and is also connected by a transverter connector to a transverter. The particulars of the call registered in the sender are then registered in the transverter. As mentioned above, the information in regard to the calling station comprises the location of the calling line and the party designation of the calling station, the directory number of the calling station being required for recording. In accordance with the information in regard to the calling station, the transverter selects an appropriate translator and obtains therefrom the directory number of the calling station. The message-billing index, transmitted to the transverter from the outgoing sender, indicates to the transverter the manner in which the call is to be billed and the number of the trunk group indicates the recorder to be used, one recorder being associated with each trunk group. The transverter then selects the appropriate recorder and controls it to record a suitable entry, of two lines if the call is not observed and is billed in message units, or of four lines if the call is observed or is to be billed by a direct money charge. At the same time, the trunk identifier identifies the trunk and causes the recorder to record the trunk number in the entry.

When the recording of an initial entry is completed, the transverter and the recorder are disconnected and are free to record entries relating to other calls. When the called subscriber answers, a signal from the trunk causes the trunk identifier to again identify the trunk, and to select the same recorder, which is associated with this and other trunks of the group, to record a one-line entry containing the current time (in six-second intervals of the hour) and the trunk number. The recorder is then freed and available to record entries for other calls. A similar entry is made in the same way when the connection of the calling station to the called station is terminated.

When trouble is encountered in the operation of the recording circuits, the recording equipment signals the master test circuit which controls a trouble recorder to make a record of the trouble. The recorder in which the trouble occurred then records a special entry of one line which shows that trouble was experienced in recording the previous line of the record. The digits recorded in the trouble entry differ depending upon whether the trouble is encountered in an initial entry, in an answer or a disconnect entry, or in an hour entry.

*Operation in detail*

The recording operations outlined above will now be described in greater detail. Assume that a call on which recording is required is originated at a station of the telephone system and has progressed, in the manner above briefly indicated but more fully described in the above-mentioned patent to A. J. Busch, to the point where the pertinent information has been registered in the outgoing sender. When the relay designated STT in the outgoing sender of the above-mentioned patent to A. J. Busch operates, it applies battery to conductors 50 and 51 within bracket 99. Relay SS1 associated, in the transverter connector, with said sender, then operates over a circuit extending from said battery over conductor 50 within bracket 99 and the winding of said relay to ground. The No. 3 normal contacts of relay SS1 open the operating circuits of and prevent the operation of relays SS2 . . . SSX associated with other senders. The connector relays SA, SB and SC then operate, relay SA operating over a circuit extending from battery on conductor 51 within bracket 99, through the winding of relay SA, conductor 52, No. 2 contacts of relay SS1, and No. 2 contacts of relay SS2 . . . SSX to ground; relay SB operating over a circuit extending from battery on conductor 51 within bracket 99 through the winding of relay SB, conductor 53, No. 1 contacts of relay SS1, and No. 1 back contacts of relays SS2 . . . SSX to ground; and relay SC operating over a circuit extending from the same battery on conductor 51 within bracket 99, through the winding of relay SC, conductor 54, No. 56 contacts of relay SA, conductor 55, and No. 5 contacts of relay SS1 to ground. One of the relays TS1 . . . TSX, for example relay TS1 associated with the transverter shown, operates over a circuit extending from battery on conductor 59 within bracket 99, No. 44 contacts of relay SA, conductor 56, No. 5 contacts of relay TC, No. 1 back contacts of relay Z, No. 2 back contacts of relay TRS, No. 1 contacts of relay TR, conductor 57, No. 1 contacts of relay CB1, winding and No. 3 front contacts of relay TS1, and No. 3 normal contacts of relays TS2 . . . TSX to ground, and locks up through its No. 3 front contacts to ground. The circuit of relay CH1 which normally extends from battery through the winding of said relay, conductor 58 within bracket 60, and No. 3 normal contacts of relays TS1 . . . TSX to ground, and the circuit of relay CH2 which normally extends from battery through resistor R3, No. 9 back contacts of relay CK6, conductor 62, No. 2 back contacts of relays TSX . . . TS1, conductor 61 within bracket 60, and the winding of relay CH2 to ground, are thereby opened and relays CH1 and CH2 released, starting a timing circuit described later. Relay TVA then operates over a circuit extending from battery through the winding of said relay, conductor 63, No. 2 front contacts of relay TS1, conductor 62, and No. 8 contacts of relay CK6 (which is operated as described later) to ground. Relay TVC operates over a circuit extending from battery through the winding of said relay, conductor 64, No. 58 contacts of relay TVA, No. 33 contacts of relay SA, conductor 55, and No. 5 contacts of relay SS1 to ground. Relays TVA and TVC connect, through relays SA and SC, the conductors within bracket 99 between the outgoing sender and the transverter necessary for registering in the transverter the information required for a two-line entry or the last two lines of a four-line entry. If relay 4L is operated, as described later, relay TVB operates over a circuit extending from battery through the winding of said relay, No. 37 contacts of relay TVA, conductor 65 within bracket 66, and No. 3 contacts of relay 4L to ground. Relay TVB closes the additional conductors within bracket 99 between the outgoing sender and the transverter necessary for the registering in the transverter the information required for the first two lines of a four-line entry.

Relay CBR operates over a circuit extending from battery through No. 5 back contacts of relay FA1, the winding of relay CBR, conductor 67 within bracket 68, and No. 11 contacts of relay TVA to ground. By the operation of relay TVA, resistor R1 is connected over conductor 70 and No. 1 contacts of relay TVA to ground. The upper winding of relay CB1 is thereby short-circuited and the operation of said relay is prevented. Relays CB2 . . . CBX, however, operate, relay CB2, for example, operating over a circuit extending from battery through resistor R21, the upper winding of said relay, conductor 71 within bracket 60, and No. 2 contacts of relay CBR to ground, and locking up over a circuit from battery through resistor R21, its lower winding and No. 2 front contacts, No. 2 back contacts of relay CB1, conductor 72, and No. 10 contacts of relay SA to ground. Relay CB2 . . . CBX make the transverter connector busy to other senders.

When the transverter connector is normal, conductors 73, 74, and 75 are connected through contacts of relay GT to the lower winding of relay CA. If one or more of these conductors is falsely grounded, relay CA is thereby operated and battery through the upper winding and No. 2 front contacts of said relay is connected to the master test frame (not shown) to actuate an alarm. When relay TVC operates, as described above, relay GT operates over a circuit extending from battery through the winding of said relay, conductor 76, and No. 14 contacts of relay TVC to ground, disconnecting conductors 73, 74 and 75 from the winding of relay CA.

*Preparation of transverter*

When the transverter is normal, the principal conductors therein are checked for false grounds. Some of the conductors are connected together and to the winding of relay XNL by contacts of relays CO1 . . . CO5. Others are connected together and to the winding of relay XP1 by contacts of relays COA . . . COD. If any of the conductors in the first group are falsely grounded, relay XNL operates to said ground and locks up through its lower winding and No. 3 contacts, conductor 170 within bracket 171, and No. 2 contacts of relay TRZ to ground. Relay X then operates over a circuit extending from battery through the winding of said relay, No. 1 contacts of relay XL, and No. 2 contacts of relay XNL to the locking ground of the latter relay, and locks up through its No. 5 contacts and No. 2 back contacts of relay TBC3 to the same ground. Relay TRZ operates over a circuit extending from battery through the winding of said relay, No. 2 contacts of relay TR, conductor 172 within bracket 173, No. 1 back contacts of relay TE, conductor 174 within bracket 175, and No. 8 contacts of relay X to ground.

The winding of relay XP1 and resistor R23 form a potentiometer so that if any conductor in the second group is crossed with either ground or battery, relay XP1 operates and operates relay XP over an obvious circuit. Relay XP locks up through its No. 3 contacts and the locking circuit of relay XNL traced above to ground, and operates relay X through the No. 1 contacts of relay XP to the same ground, which in turn operates relay TRZ.

If conductor 59 is crossed with battery, relay XT operates over an obvious circuit, operating relay XTU over an obvious circuit. Relay TRZ then operates over the circuit traced above to conductor and No. 1 contacts of relay XTU to ground.

If conductor 69 is falsely grounded, relay TKK operates to said ground and operates relay XTK over a circuit extending from battery through the winding of said relay, conductor 176 within bracket 177, and front contacts of relay TKK to ground, or if conductor 79 is falsely grounded, relay XTK operates to said ground through its No. 3 normal contacts. Relay TRZ then operates over the circuit traced above to conductor and No. 5 contacts of relay XTK to ground.

If conductor 89 is falsely grounded, relay XOF operates to said ground and locks up through its No. 3 contacts to ground on conductor 170 traced above. Relay X then operates over an obvious circuit to the same ground, operating relay TRZ, as described above.

If conductor 178 is falsely grounded, relay ICK operates over a circuit extending from battery through the winding of relay DCB, both windings of relay ICK in series and No. 3 contacts of relay TOK to said ground, operating relay IC over an obvious circuit. Relay X1CK then operates over a circuit extending from battery through the upper winding of said relay, conductor 181 within bracket, 84, No. 1 contacts of relay CKG, and No. 1 contacts of relay IC to ground, and locks up through its lower winding and No. 3 contacts to the locking ground of relay XNL traced above. Relay X operates through No. 2 contacts of relay X1CK to the same ground, operating relay TRZ as described above.

If conductor 184 is falsely grounded, relay XCK operates over a circuit extending from battery through the winding of said relay, conductor 182, No. 5 contacts of relay TR1A, conductor 183 within bracket 175 and No. 8 contacts of relay TE to said ground, and locks up through its No. 3 contacts to the locking ground of relay XNL traced above. Relay X operates through No. 1 contacts of relay XCK to the same ground, operating relay TRZ, as described above. Operation of relay TRZ in any case signals the master test frame to make a trouble record.

If none of the conductors are falsely grounded, relay CKG operates over a circuit extending from battery through the winding of said relay, normal contacts of relay TBC2, conductor 77, No. 1 front contacts of relay TS1, conductor 78, and No. 34 contacts of relay SA to ground. Relays CO1 . . . CO5 and C0A . . . C0D then operate. Relays CO1 and CO2 operate over a circuit extending from battery through the windings of said relays in parallel, conductor 81 within bracket 80, and No. 3 contacts of relay CKG to ground, relays CO3, CO4 and CO5 operate over a circuit extending from battery through the windings of said relays in parallel, conductor 82 within bracket 80, and No. 4 contacts of relay CKG to ground, relays C0A . . . C0D operate over a circuit extending from battery through the windings of said relays in parallel, conductor 83 within bracket 84, and No. 6 contacts of relay CKG to ground. The conductors bunched for checking are thereby separated. Relays CK5 and CK6 then operate over a circuit extending from battery through the windings of said relays in parallel, No. 6 contacts of relay CK2, No. 5 contacts of relay CK1, conductor 85 within bracket 86, No. 2 back contacts of relays T0 . . . T4, conductor 86, No. 2 back contacts of relays T5 . . . T9, conductor 87, No. 1 back contacts of relays U0 . . . U4, conductor 88, No. 1 back contacts of relays U5 . . . U9, conductor 90, No. 2 back contacts of relays TH0 . . . TH4, conductor 91, No. 2 back contacts of relays TH5 . . . TH9, conductor 92, No. 1 back contacts of relays HN0 . . . HN4, conductor 93, No. 1 back contacts of relays HN5 . . . HN9, conductor 94, No. 1 back contacts of relays OFF5 . . . OFF0, conductor 95 within bracket 86, contacts of relay CKP, conductor 96 within bracket 97, No. 1 contacts of relay C0A, conductor 98, No. 1 contacts of relay C0B, conductor 100, No. 1 contacts of relay C0C, conductor 101, No. 5 contacts of relay C0D, conductor 102, No. 1 contacts of relays CO5 . . . CO1, conductor 103 within bracket 80, No. 5 contacts of relay CKG and thence, over the operating path of relay CKG, traced above, to ground. Operation of relays CK5 and CK6 over this circuit checks that the register relays of the transverter are normal and that all of relays CO1 . . . CO5 and C0A . . . C0D are operated. Relays CK5 and CK6 lock up through No. 5 contacts of relay CK5 to ground on the operating path of relay CKG traced above. Relay CK7 operates over a circuit from battery through the winding of said relay, conductor 104, and No. 8 contacts of relay CK5 to ground. Relay TBC1 operates over a circuit extending from battery through the winding of said relay, No. 9 front contacts and No. 8 contacts of relay CK6 to ground, closing, at its No. 1 contacts, an obvious circuit for relay TBC2. Relay CKG is now locked up over an obvious circuit through front contacts of relay TBC2. Relays TBC1 and TBC2 are slow to release so that, if calls are handled by the transverter in rapid succession, relay CKG and consequently relays CO1 . . . CO5 and C0A . . . C0D, remain operated and the check for grounded conductors is omitted. When relay CK6 operates, relay DCB operates over a circuit extending from battery through the winding of said relay, resistor R2, and No. 5 contacts of relay CK6 to ground.

*Registration of information in transverter*

The transverter being now connected to the outgoing sender, as described above, by relays TVA, TVC, SA and SC, and by relays TVB and SB if a four-line entry is to be made, information relating to the call is registered in the transverter by the operation of register relays corresponding to similar register relays operated in the outgoing sender. This information is not all in the form required for recording but is registered in the transverter in order that the items required to be recorded may be derived therefrom. The information relating to the calling station comprises the number of the line-link frame, the number of the vertical of said frame on which the line of said station appears, and the party designation of the calling station. Information relating to the type of call, including the "code pattern" of the called office (indicating thereby whether the call is for a local area, an extended area, etc.), the number of digits in the numerical portion of the called station number, the "message-billing index" which indicates the manner in which the charges for the call should be made, as registered in the outgoing sender, is also registered in the transverter, together with the number of the recorder appropriate for recording the information. The relays by which this information is registered in the transverter and the combinations in which they are operated, together with the designations and locations of the relays in the above-mentioned patent to A. J. Busch by which they are operated, are as follows:

| Information Registered | Designations and Figures of Present Application | | | Designation and Figures of Busch Application Serial No. 57,394, filed October 29, 1948, and now Patent No. 2,585,904, dated February 19, 1952. | |
|---|---|---|---|---|---|
| | Register Relays of Transverter | Shown in Fig. No. | No. of Relays Operated | Operated from Relays of Outgoing Sender | Shown in Fig. No. |
| Tens digit of line-link frame number. | FT0 . . . FT3 | 28 | 1 of 4 | FT0 . . . FT3 | 212 |
| Units digit of line-link frame number. | FU0 . . . FU7 | 28 | 2 of 5 | FU0 . . . FU7 | 212 |
| Vertical-group number | VG0 . . . VG7 and VG10. | 27 | 2 or 3 of 6 | VG0 . . . VG7 and VG10. | 211 |
| Party | TP and RP | 10 | 1 of 2 | TP and RP | 226 |
| Code pattern | CP0 . . . CP7 | 11 and 14 | 2 of 5 | CP0 . . . CP7 | 226 |
| Number of digits | 4DG | 14 | 1 of 4 | 4DG | |
| Message-billing index | MB0 . . . MB7 | 7 | 2 of 5 | MB0 . . . MB7 | 226 |
| Observed or not observed call. | OBS and NOB | 10 | 1 of 2 | OBS and NOB | 226 |
| Serviced or test call | SC1 and TVT | 10 | 1 of 2 | SC and TVT | 226 |
| Recorder and trunk group number. | RN0 . . . RN7 | 7 | 2 of 5 | RN0 . . . RN7 | 212 |

Figure 7:
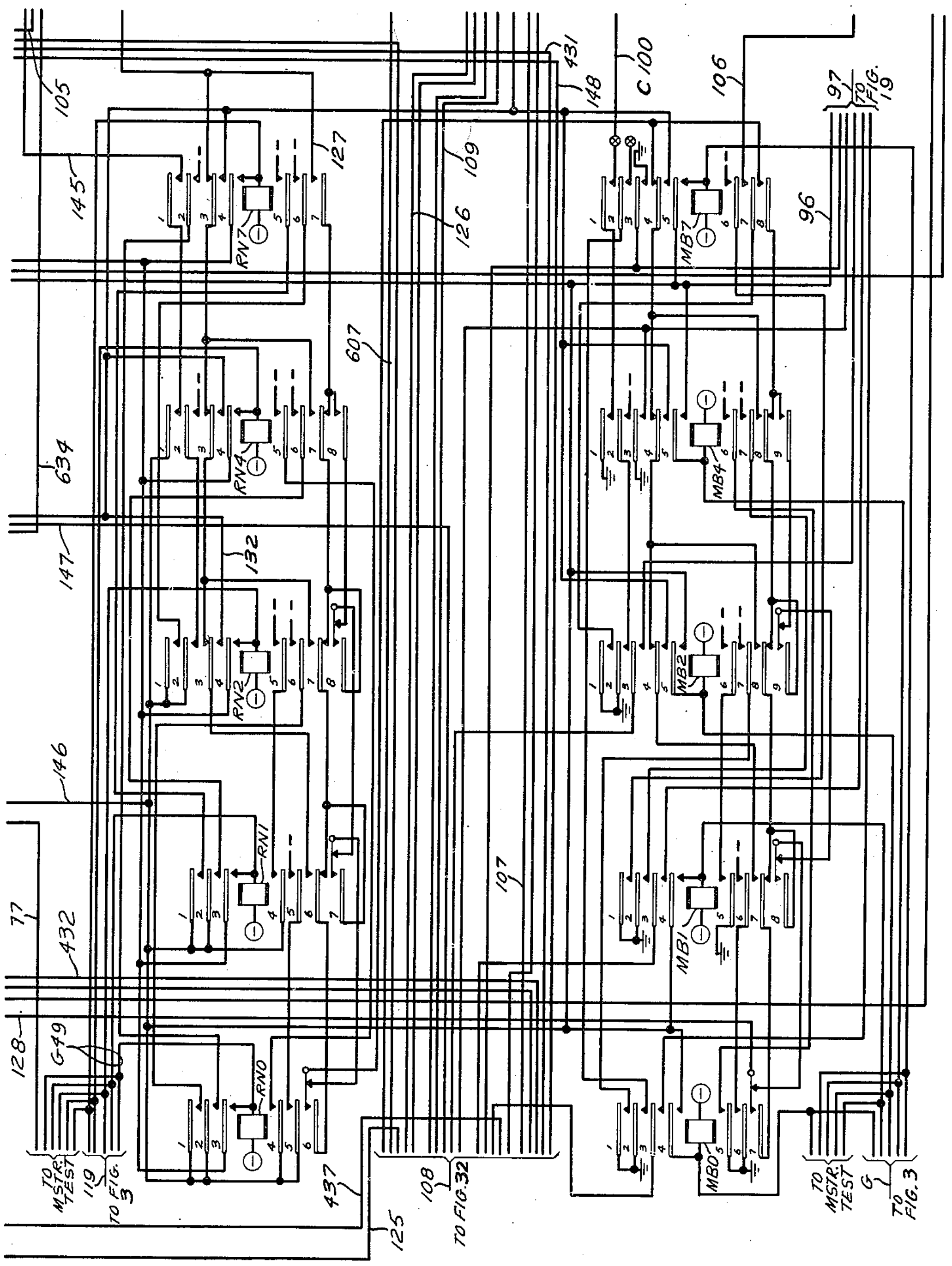
Figure 8:
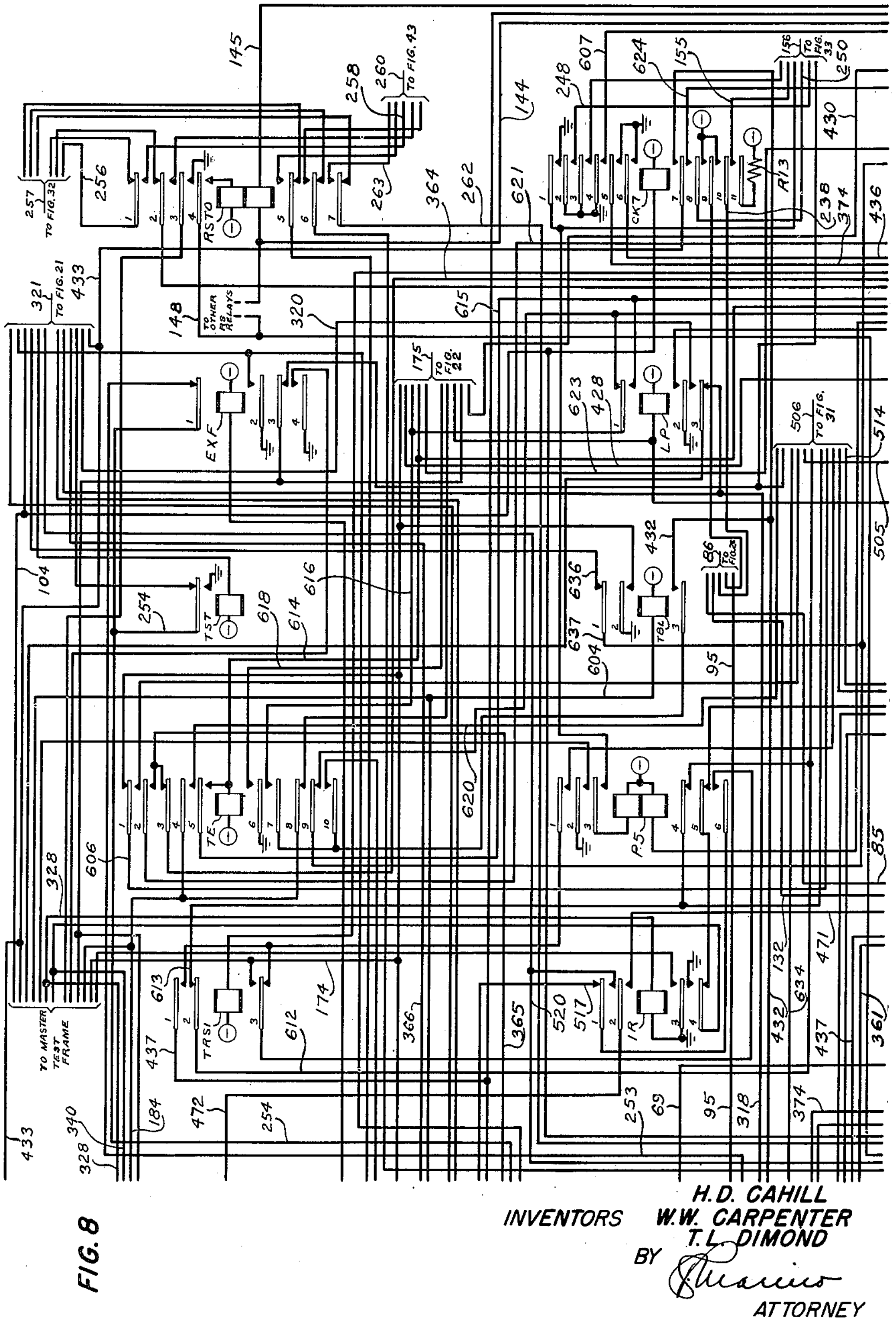
Figure 9:
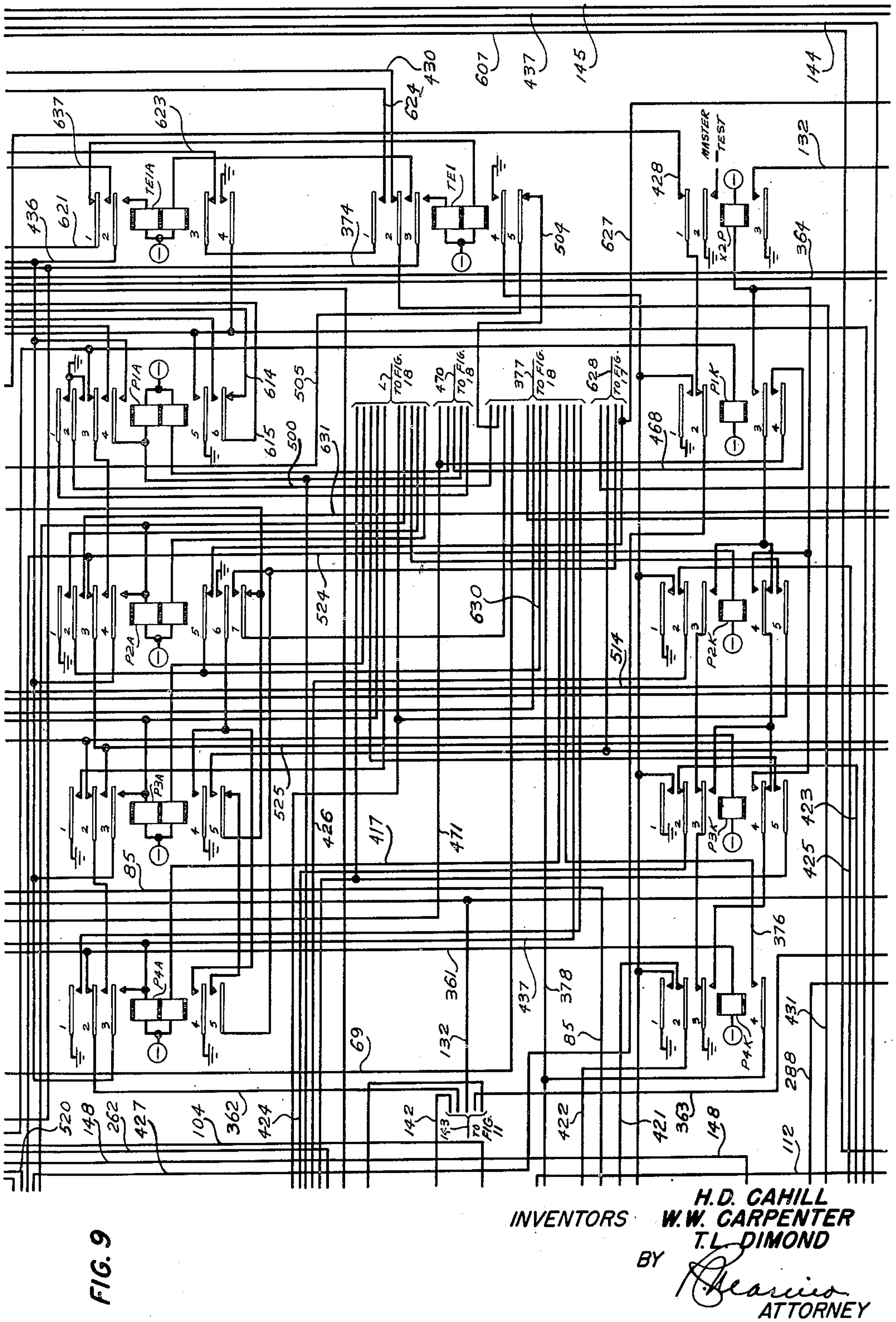
Figure 10:
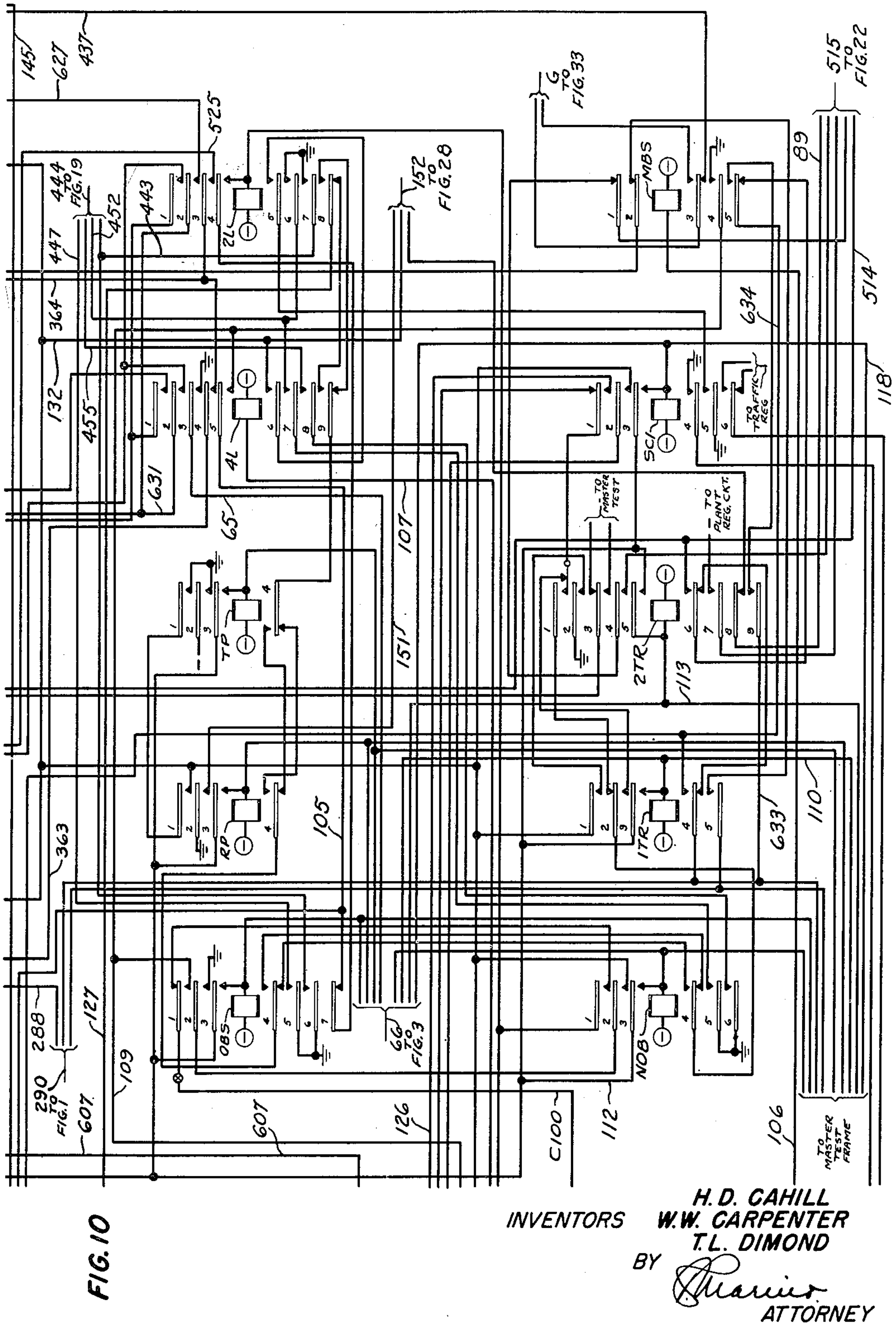
Figure 11:
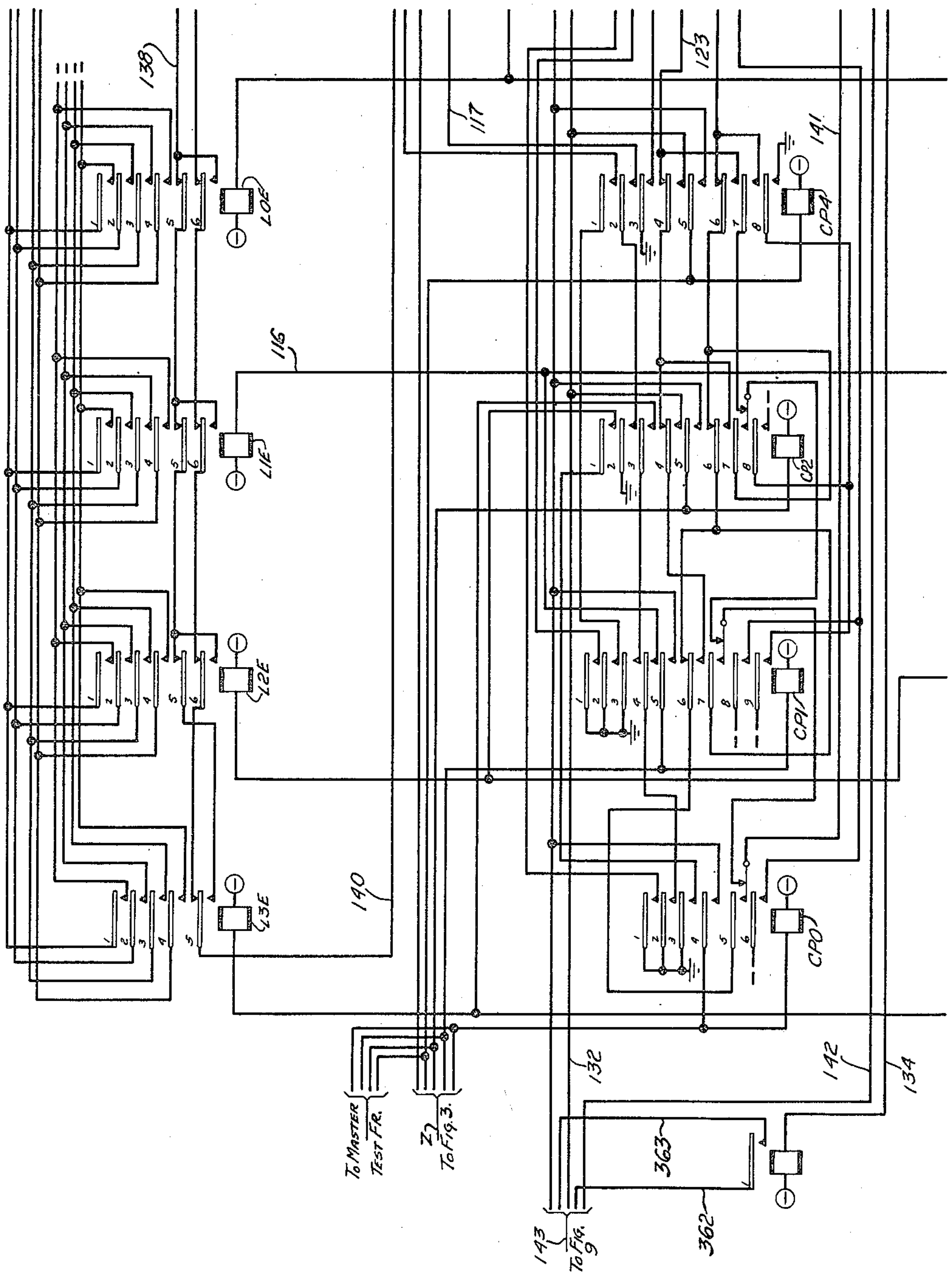
Figure 12:
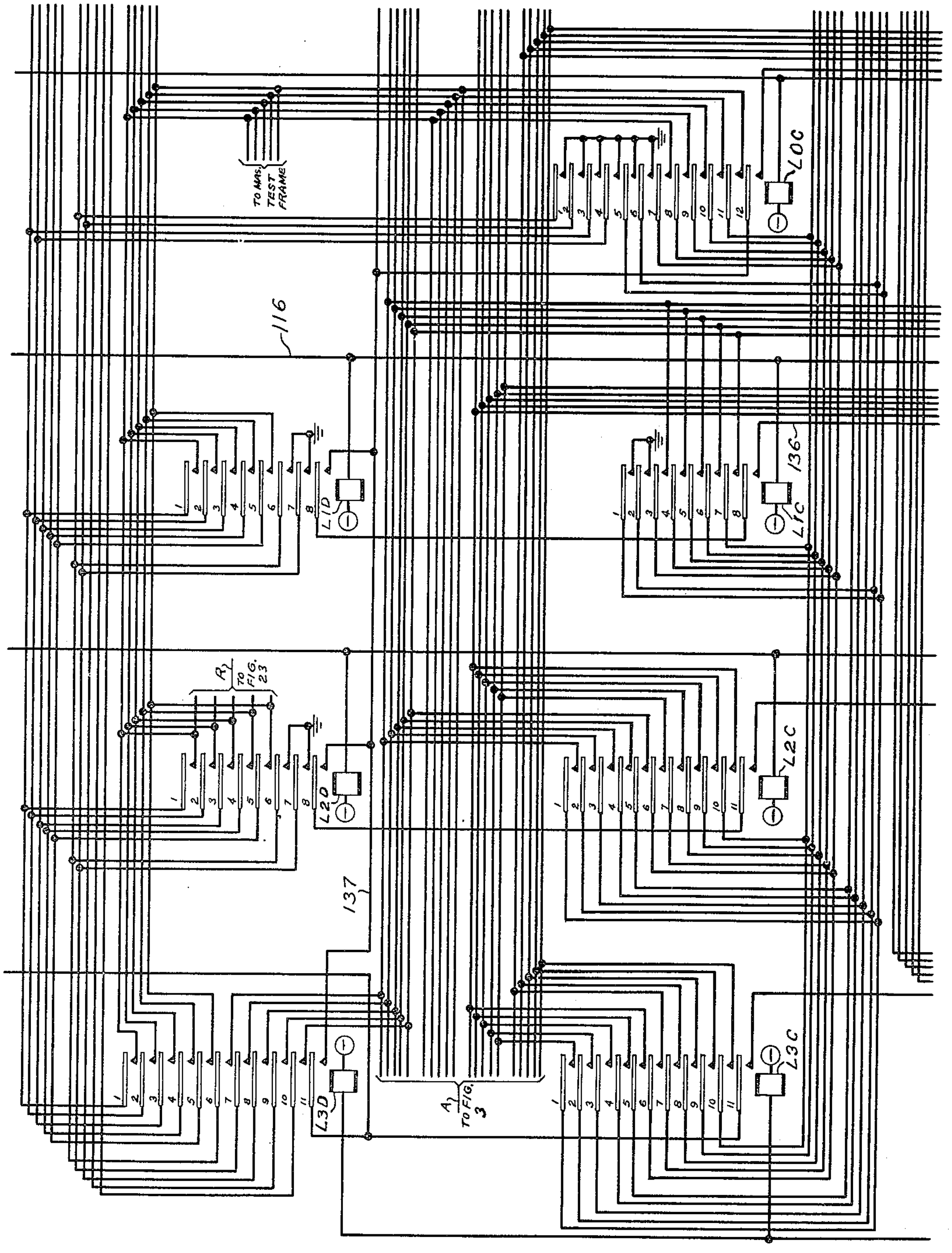
Figure 13:
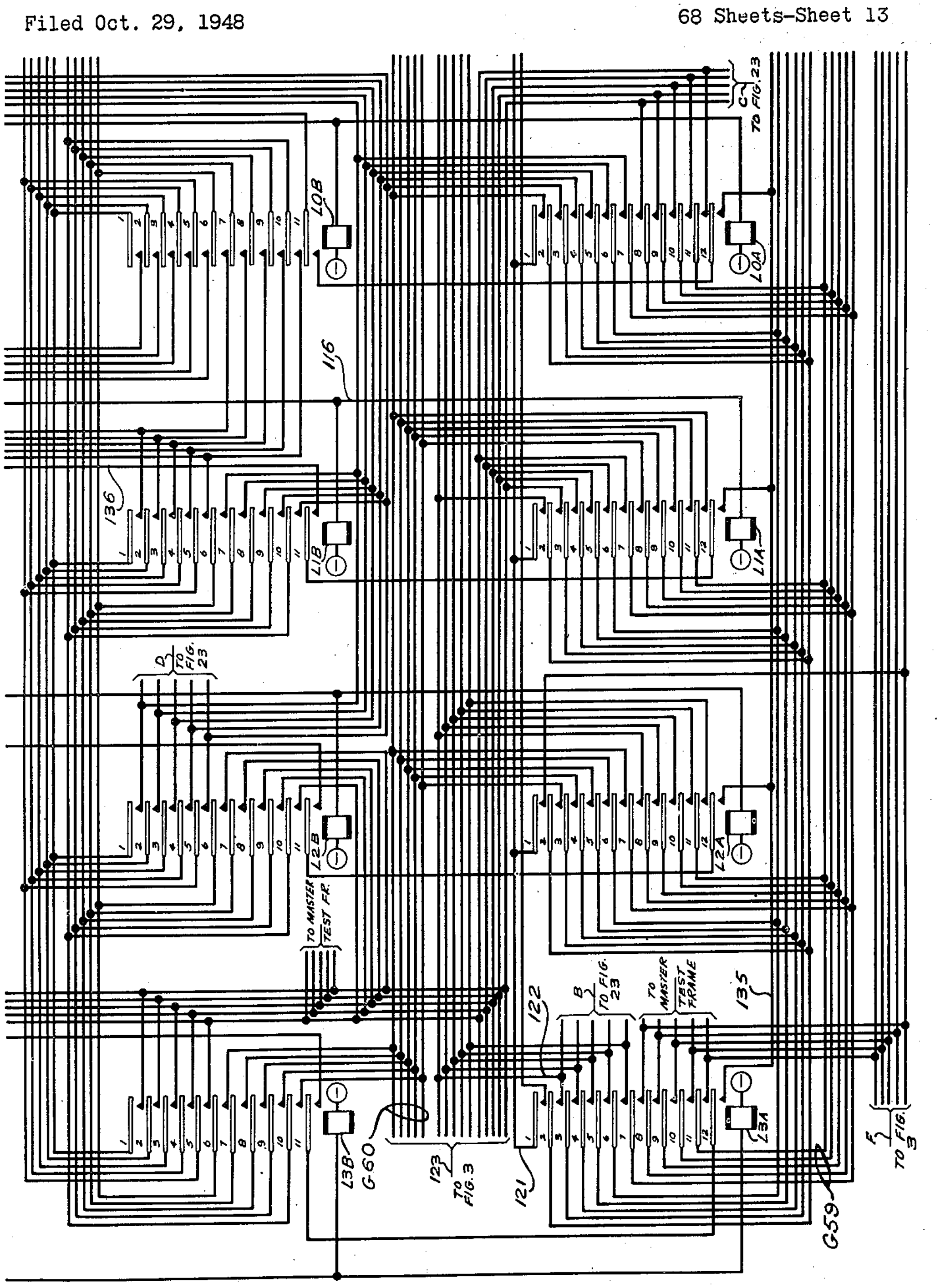
Figure 14:
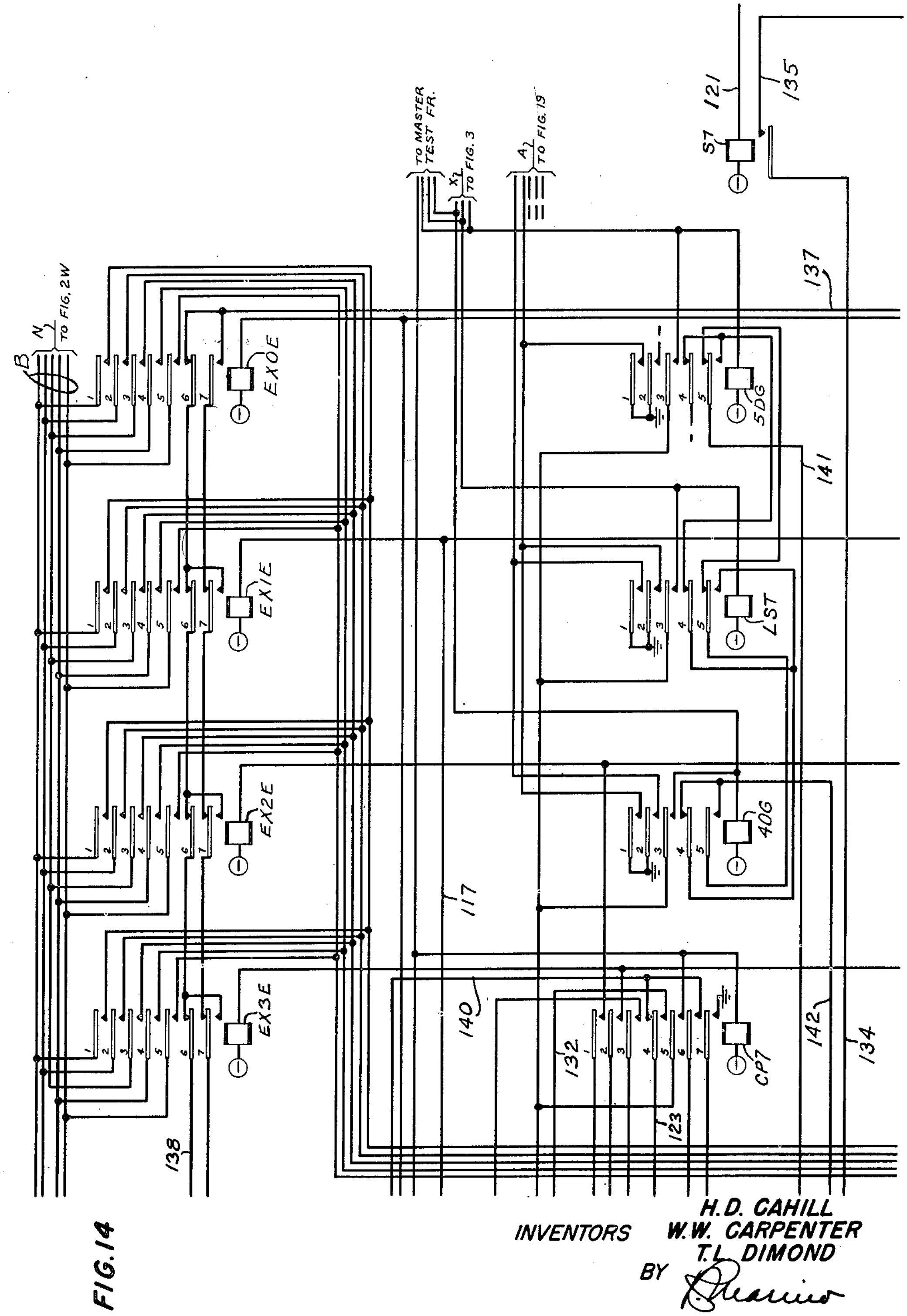
Figure 15:
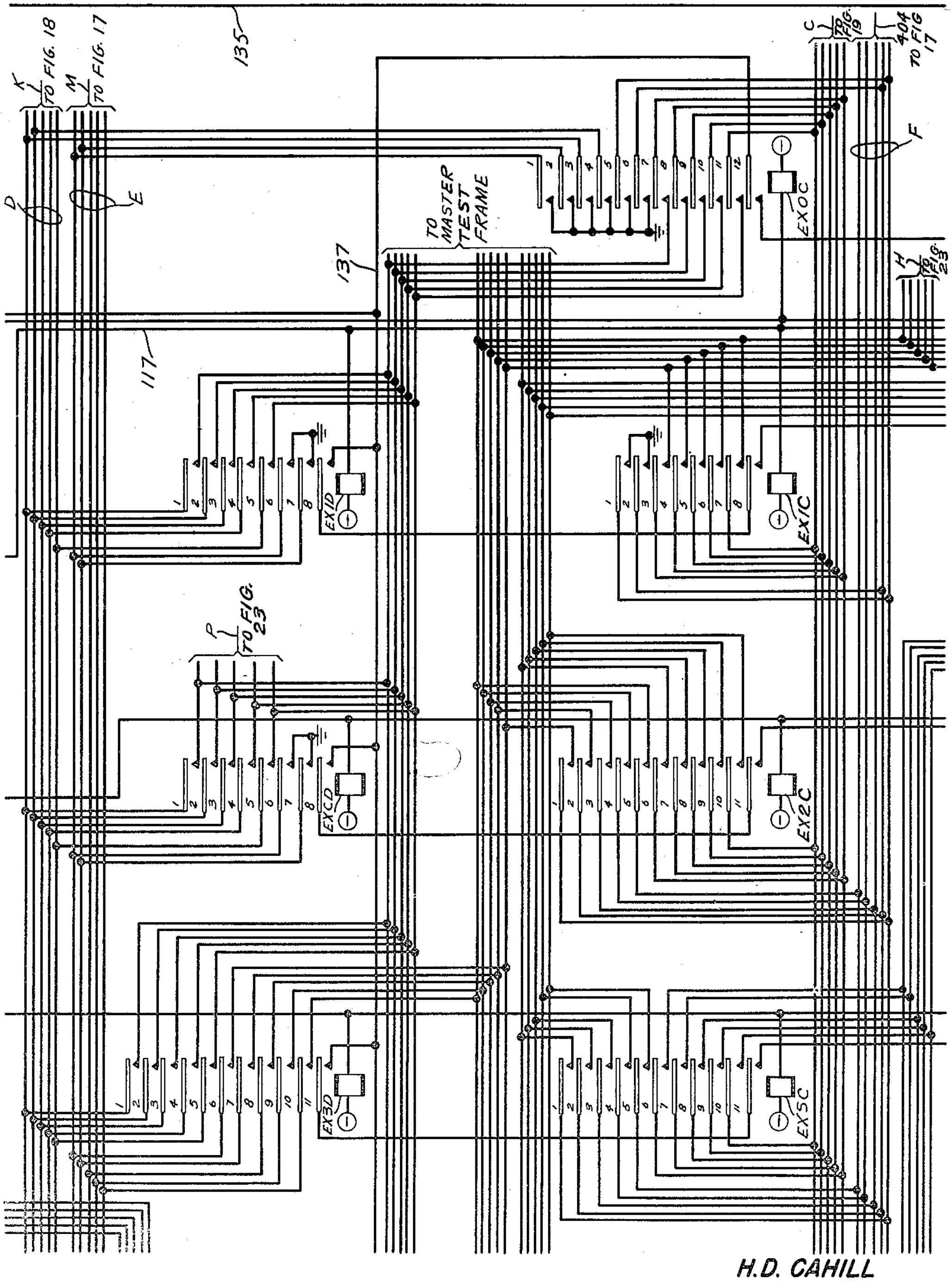
Figure 16:
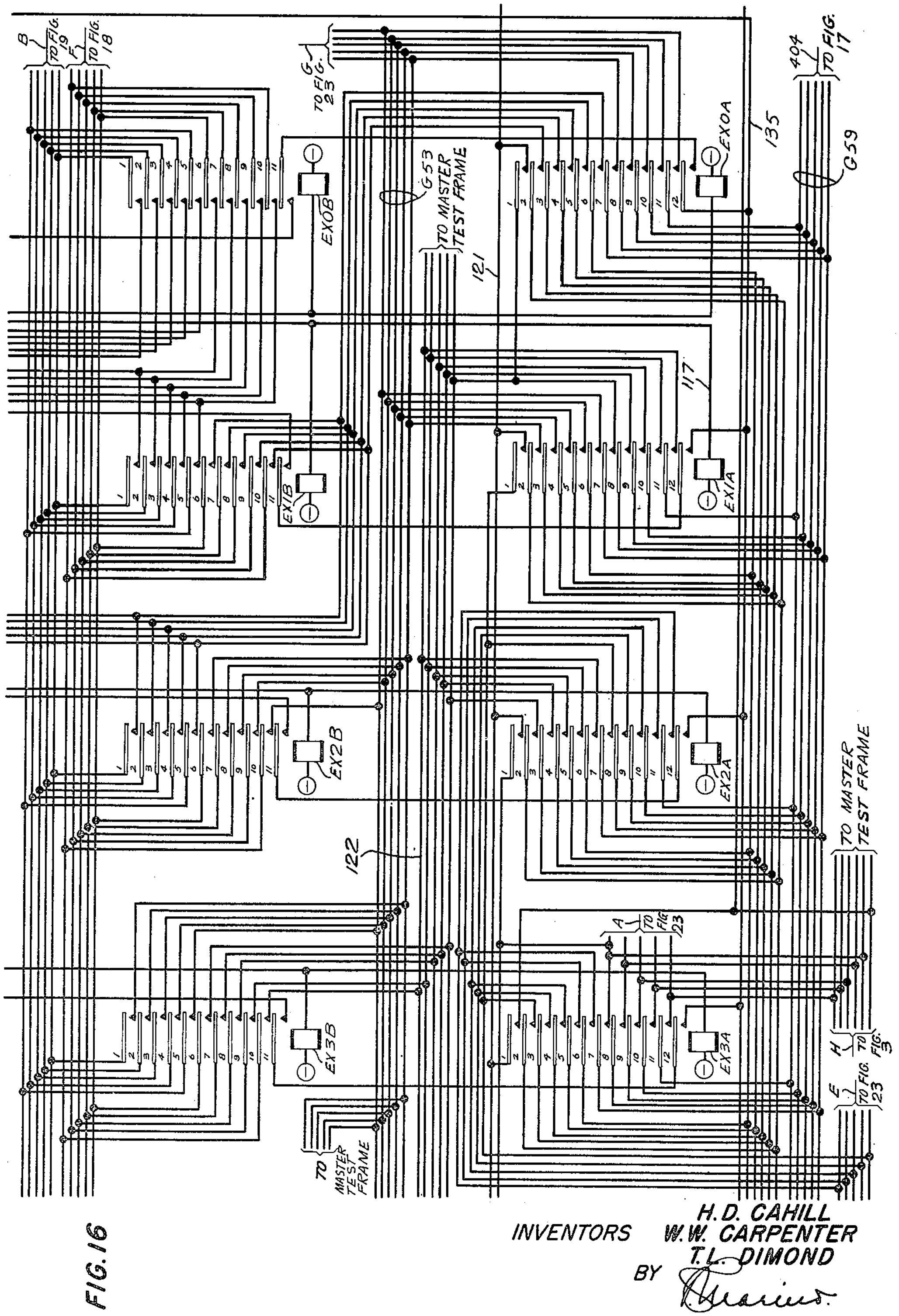
Figure 17:
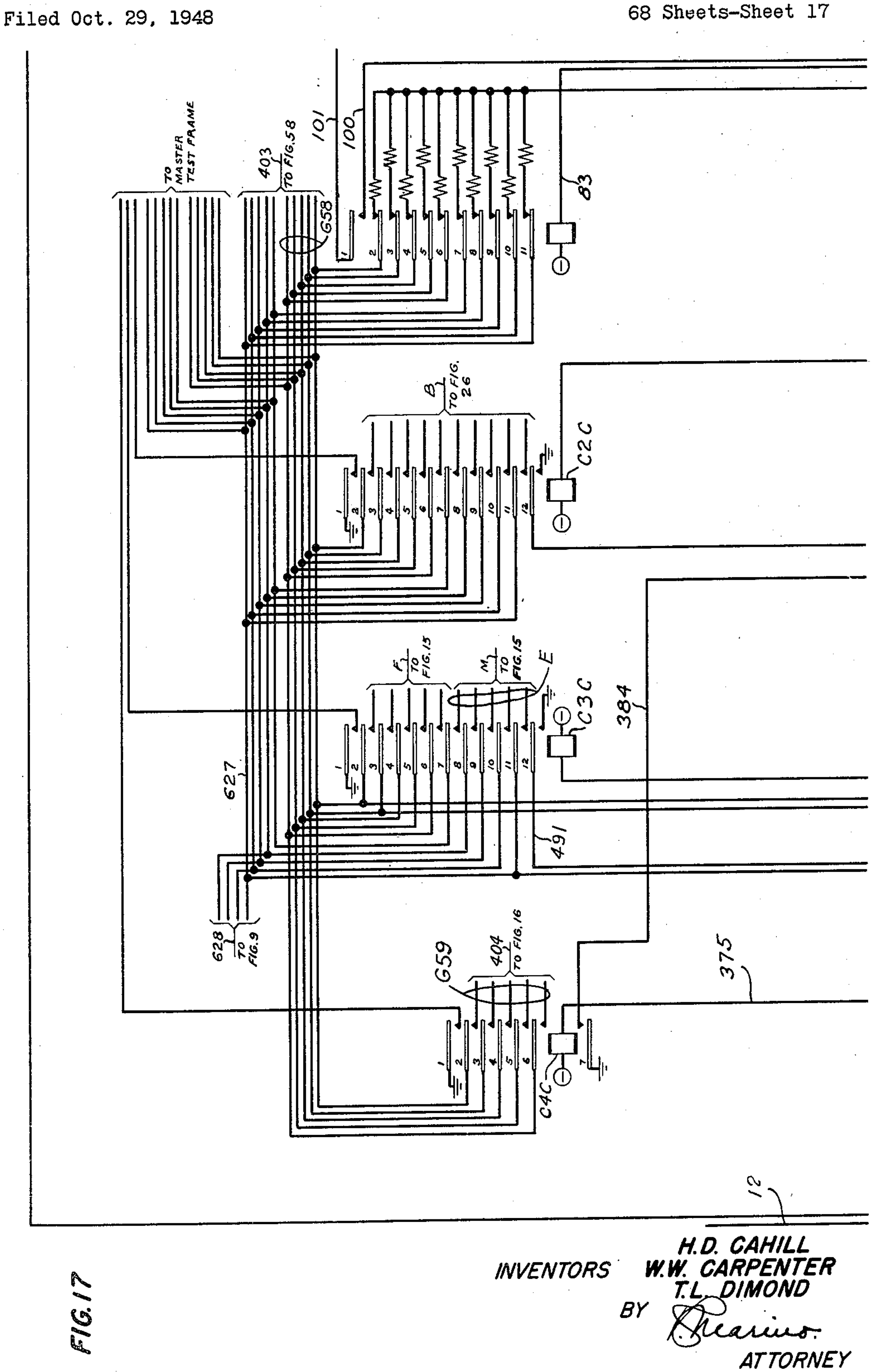
Figure 18:
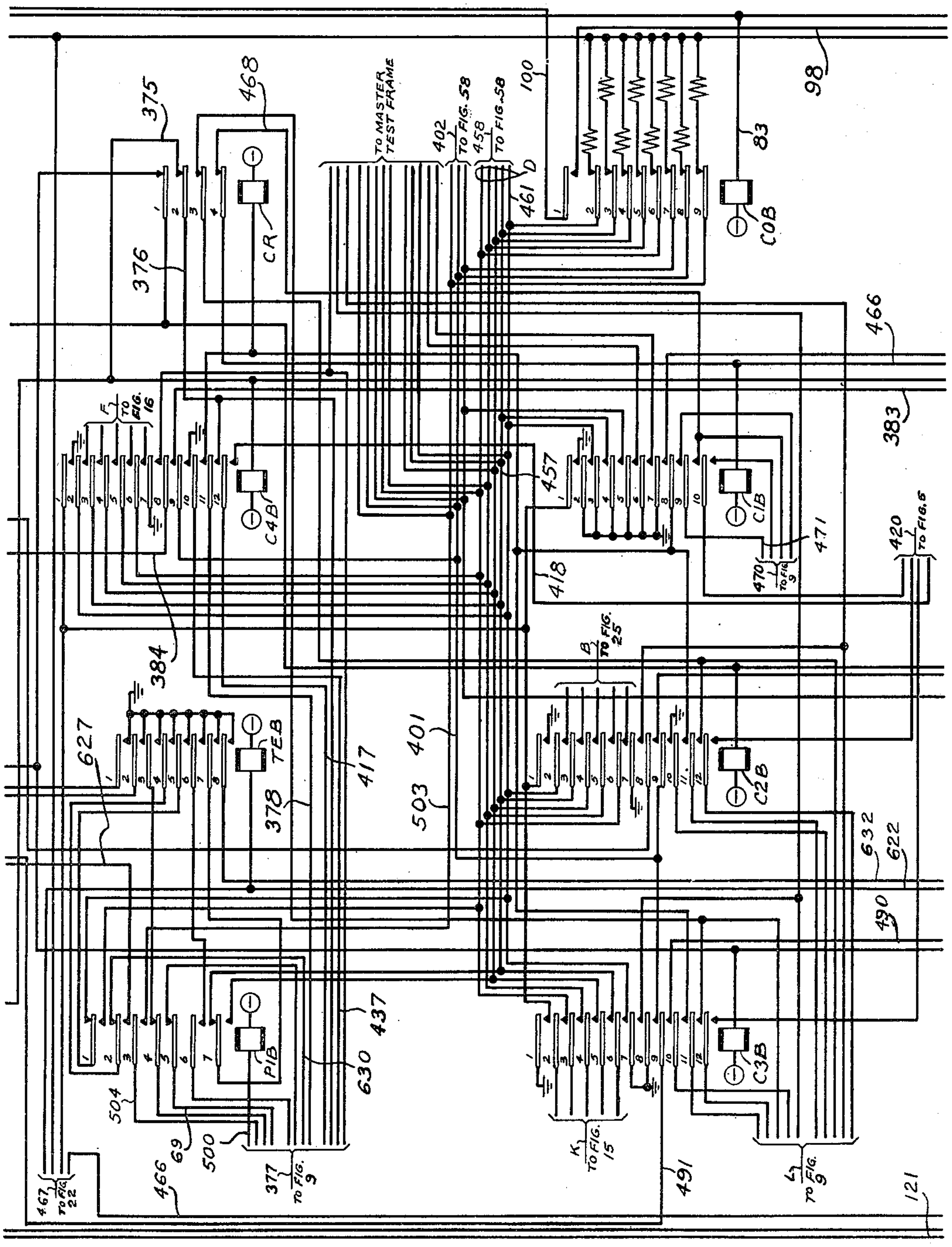
Figure 19:
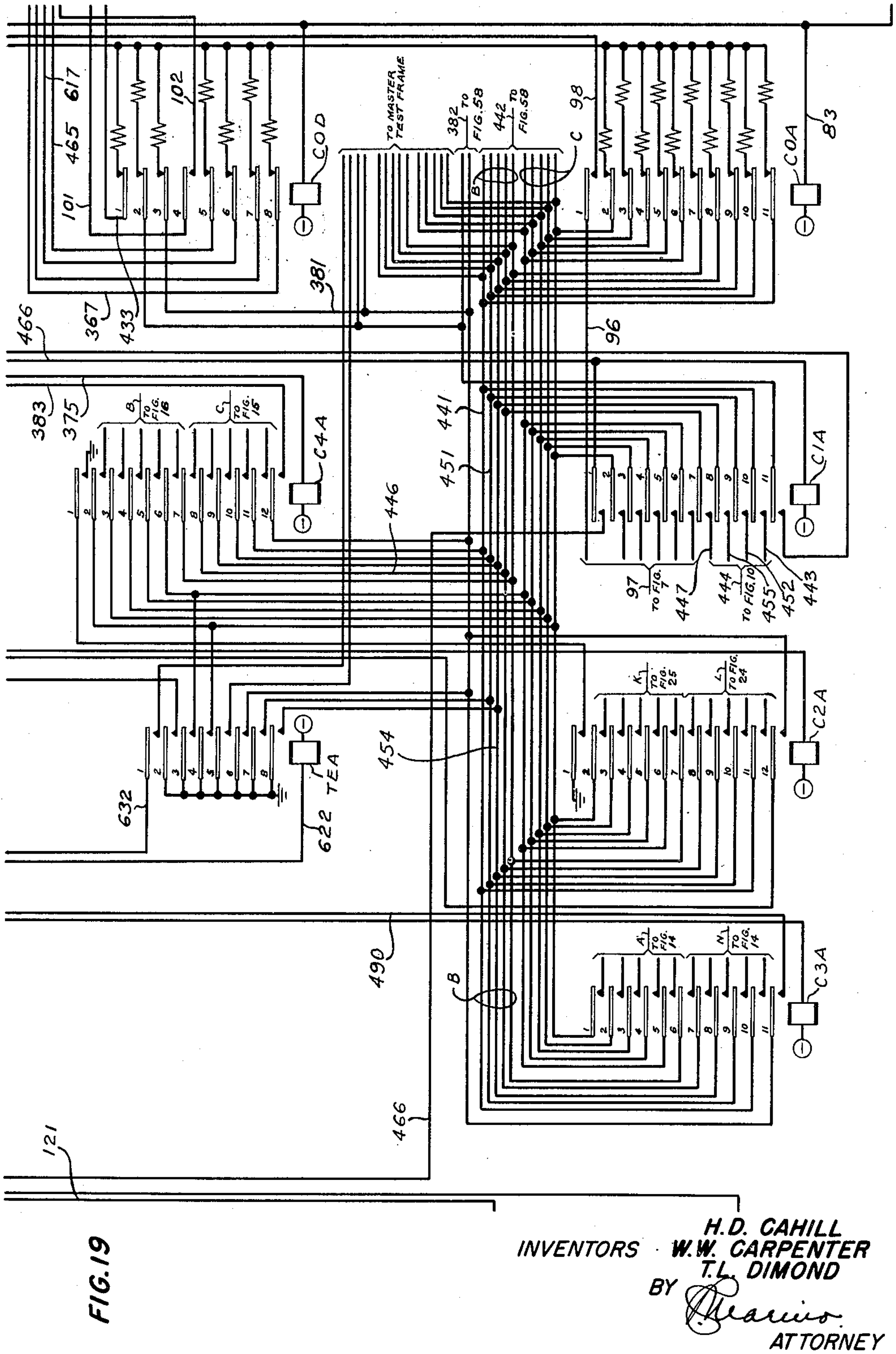
Figure 20:
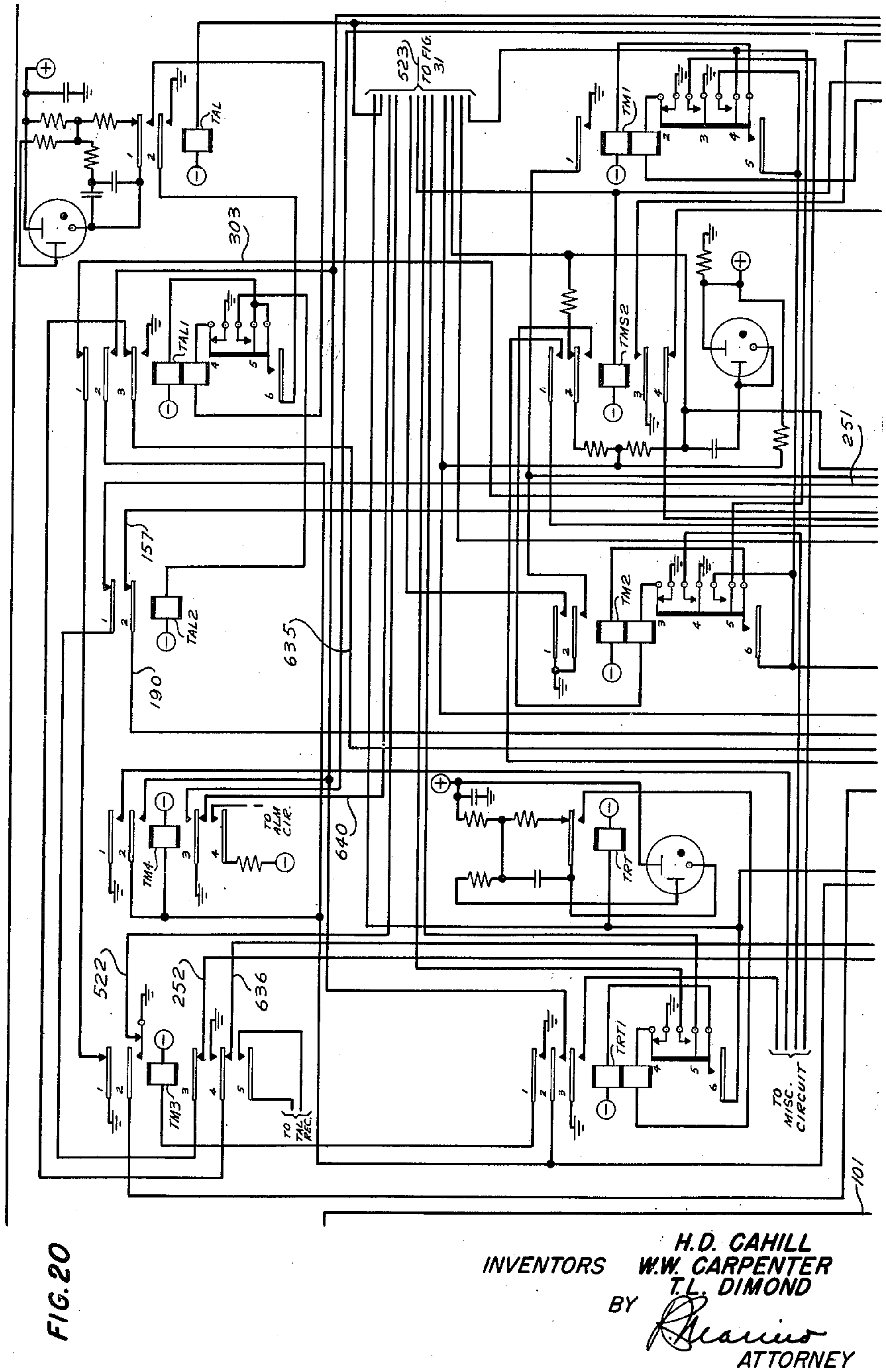
Figure 21:
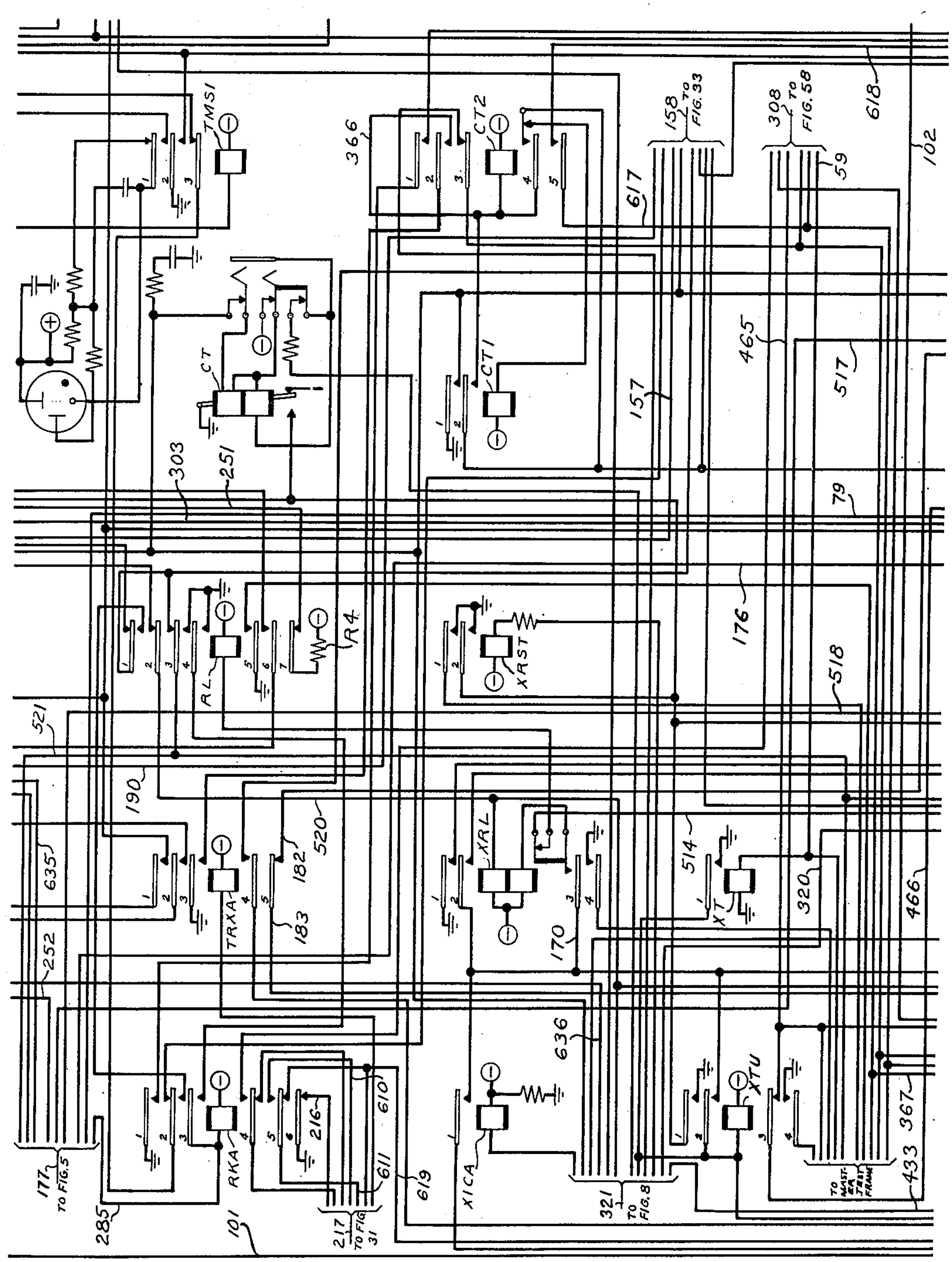
Figure 22:
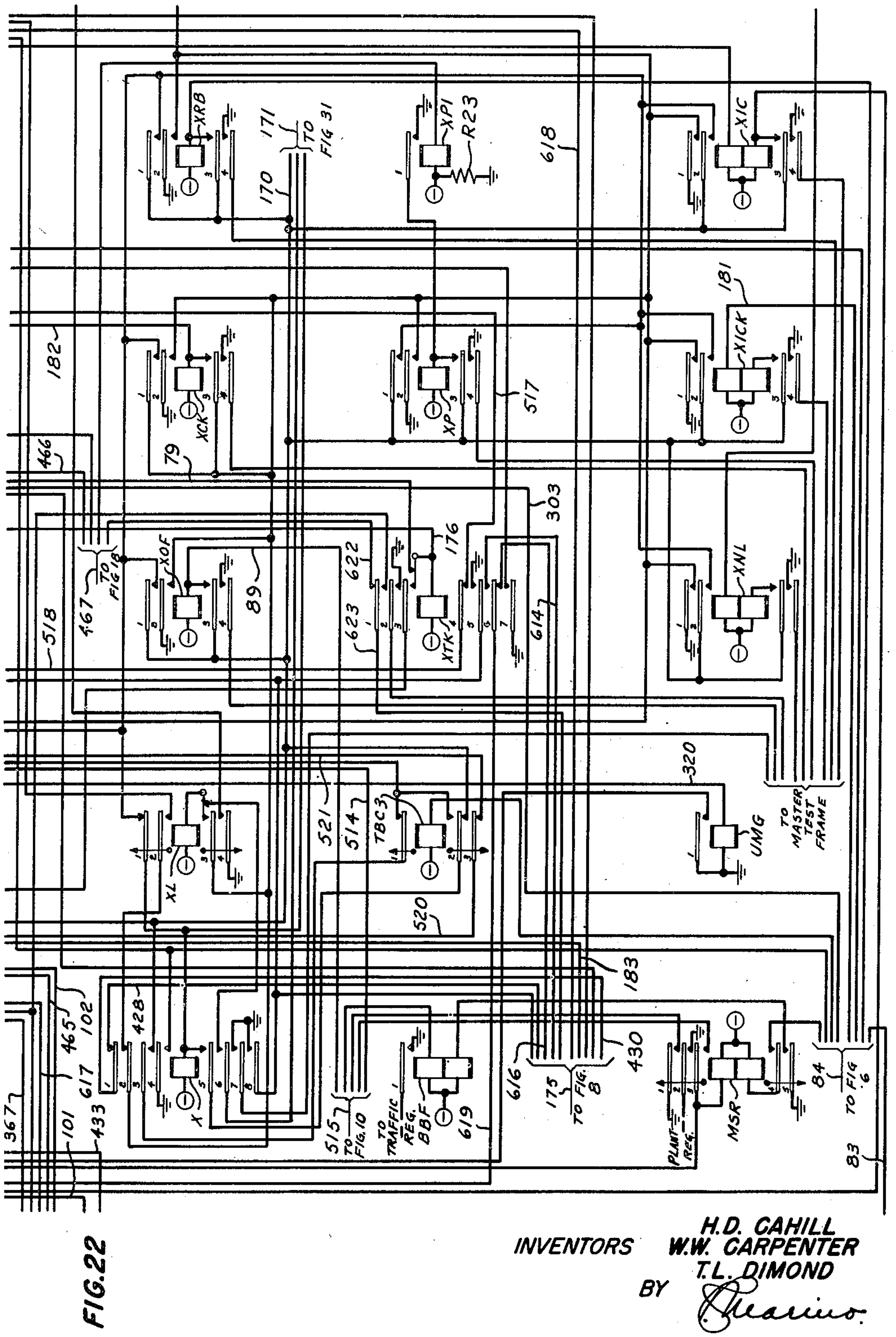
Figure 23:
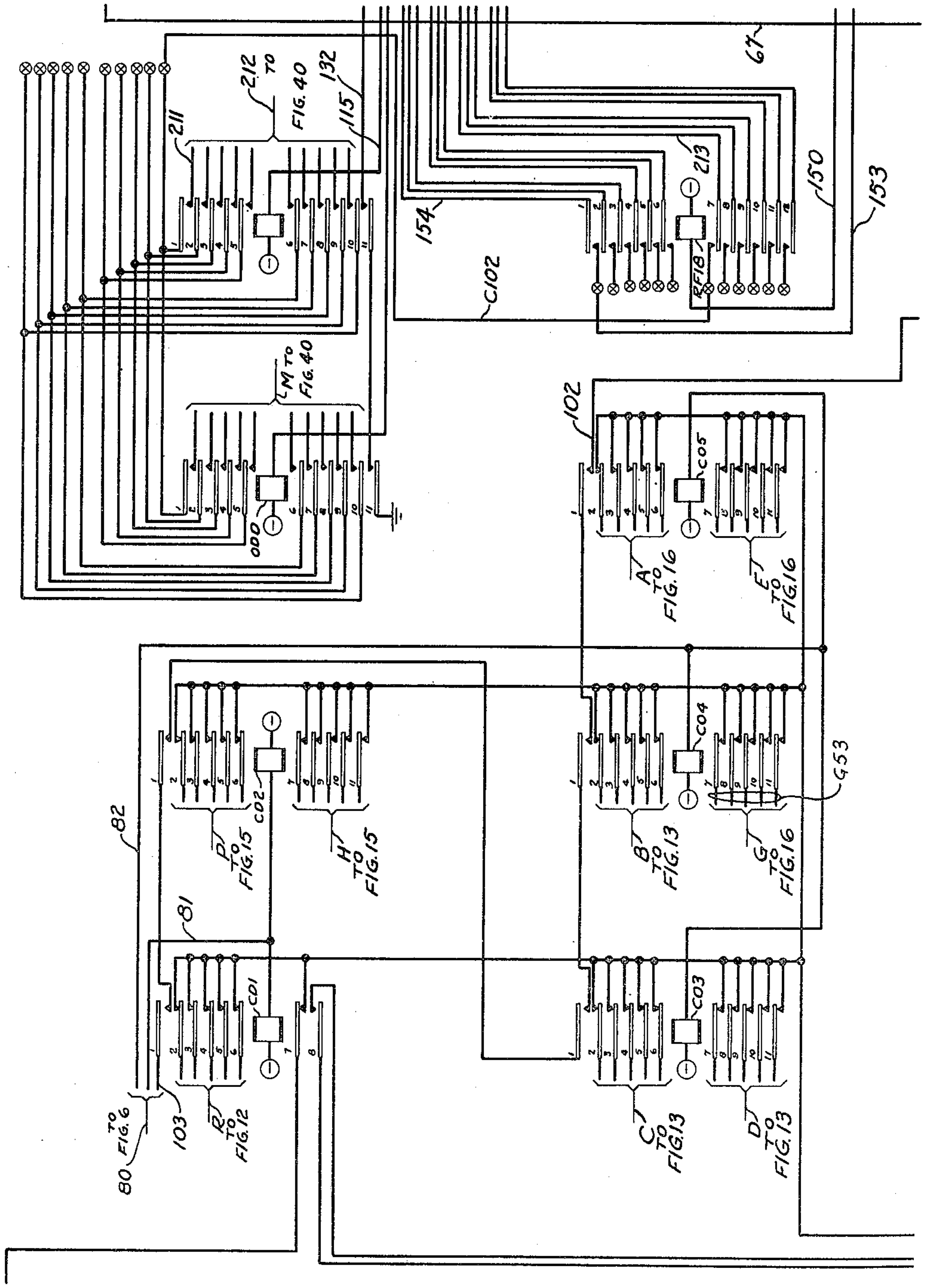
Figure 24:
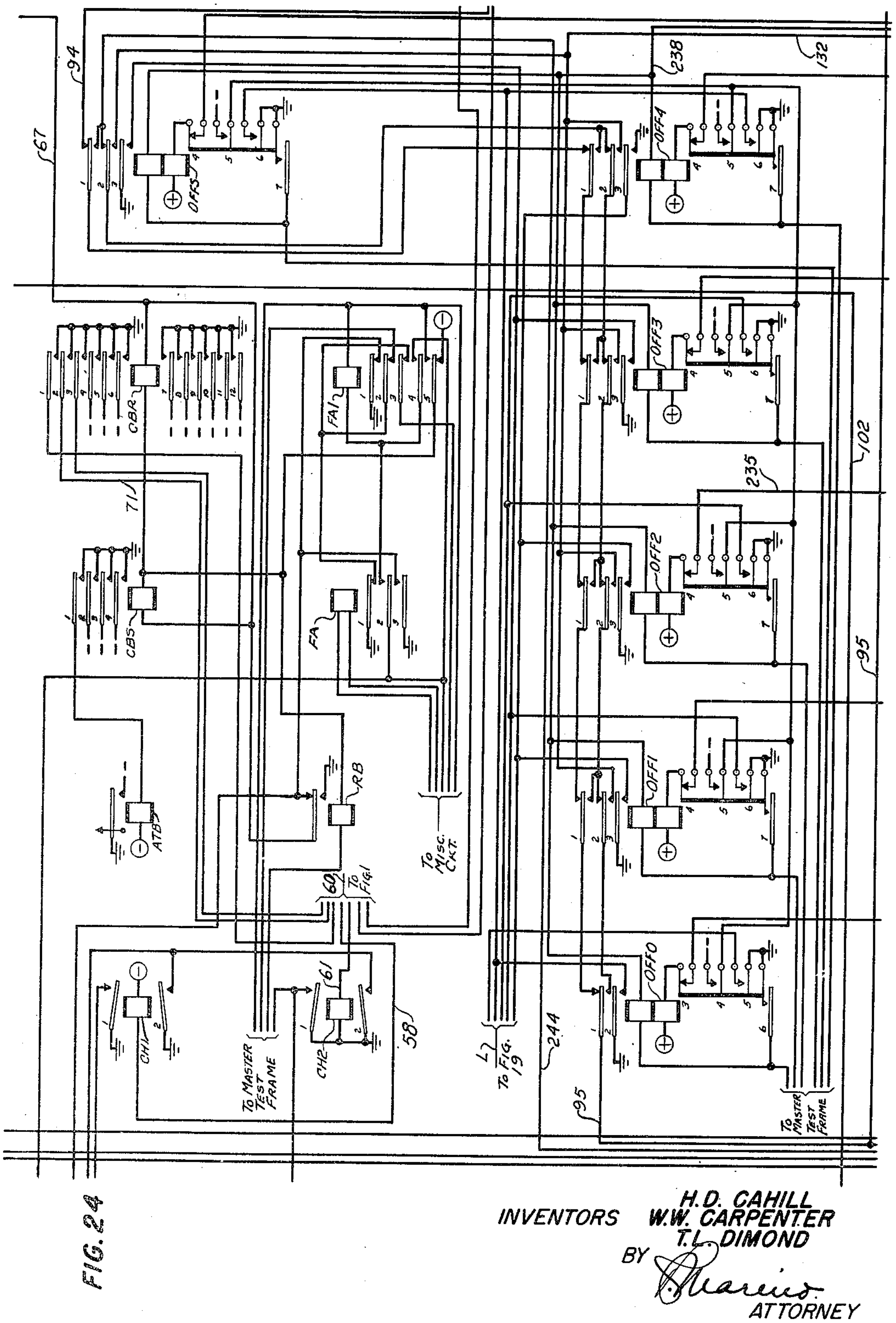
Figure 25:
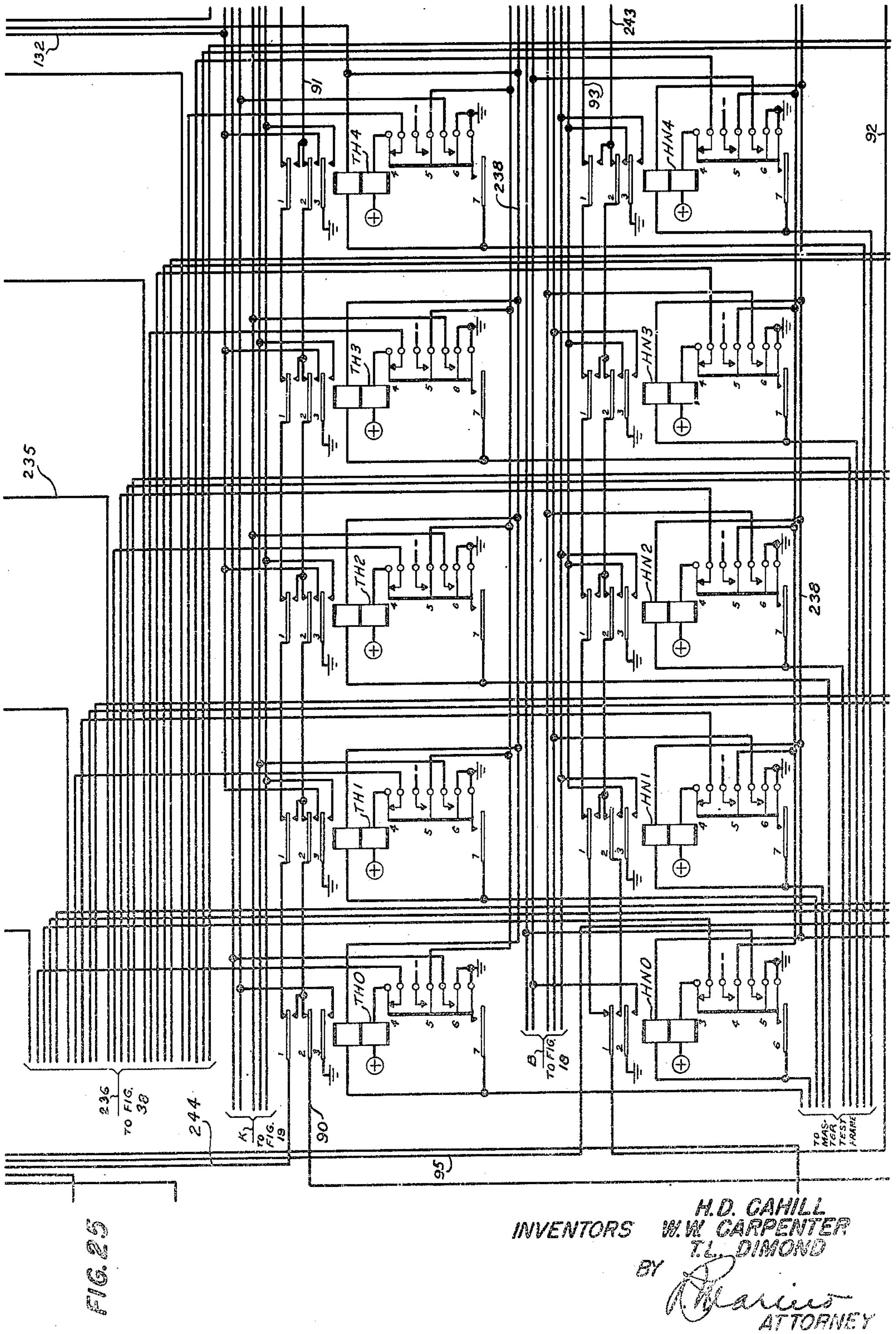
Figure 26:
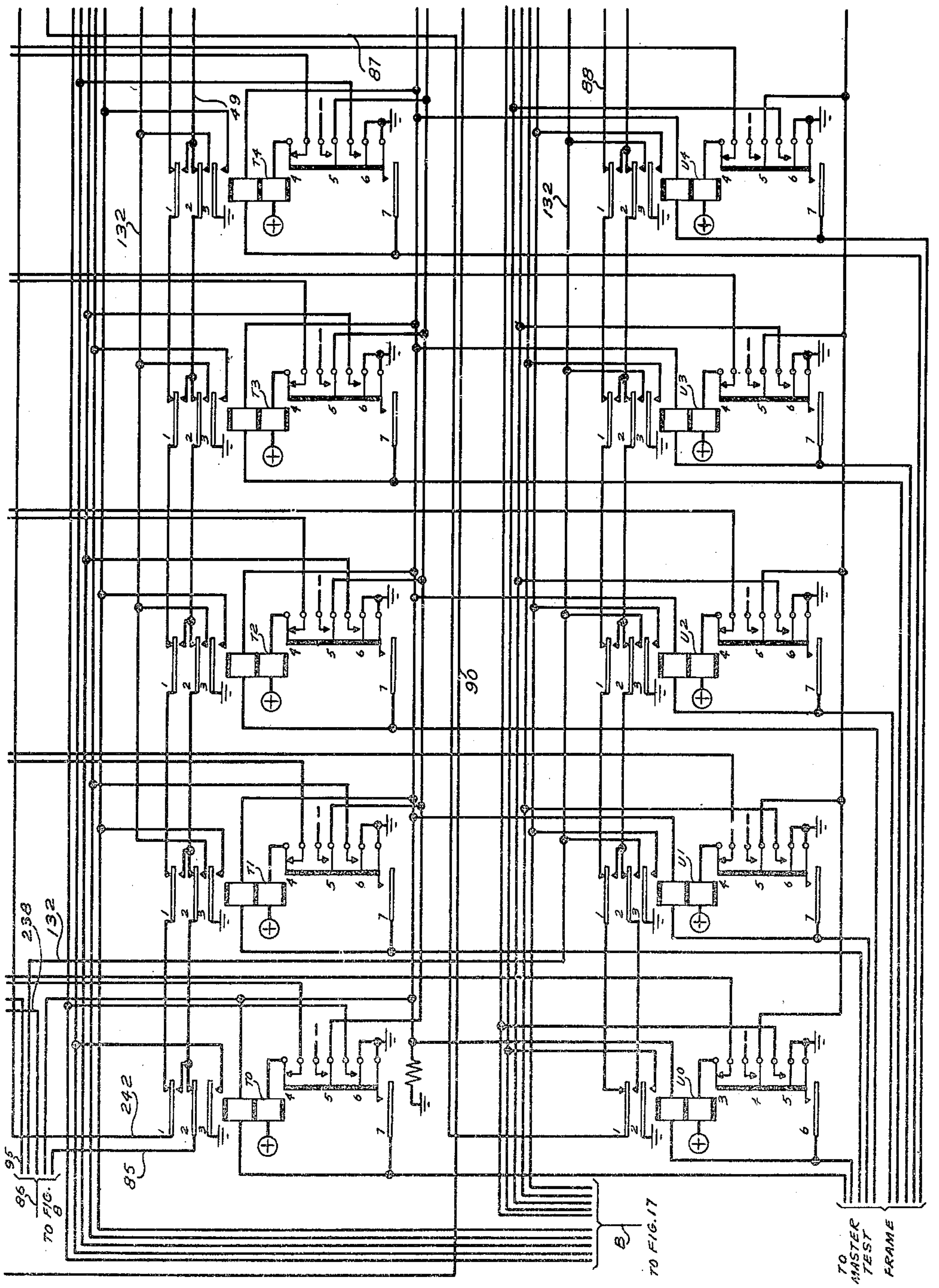
Figure 27:
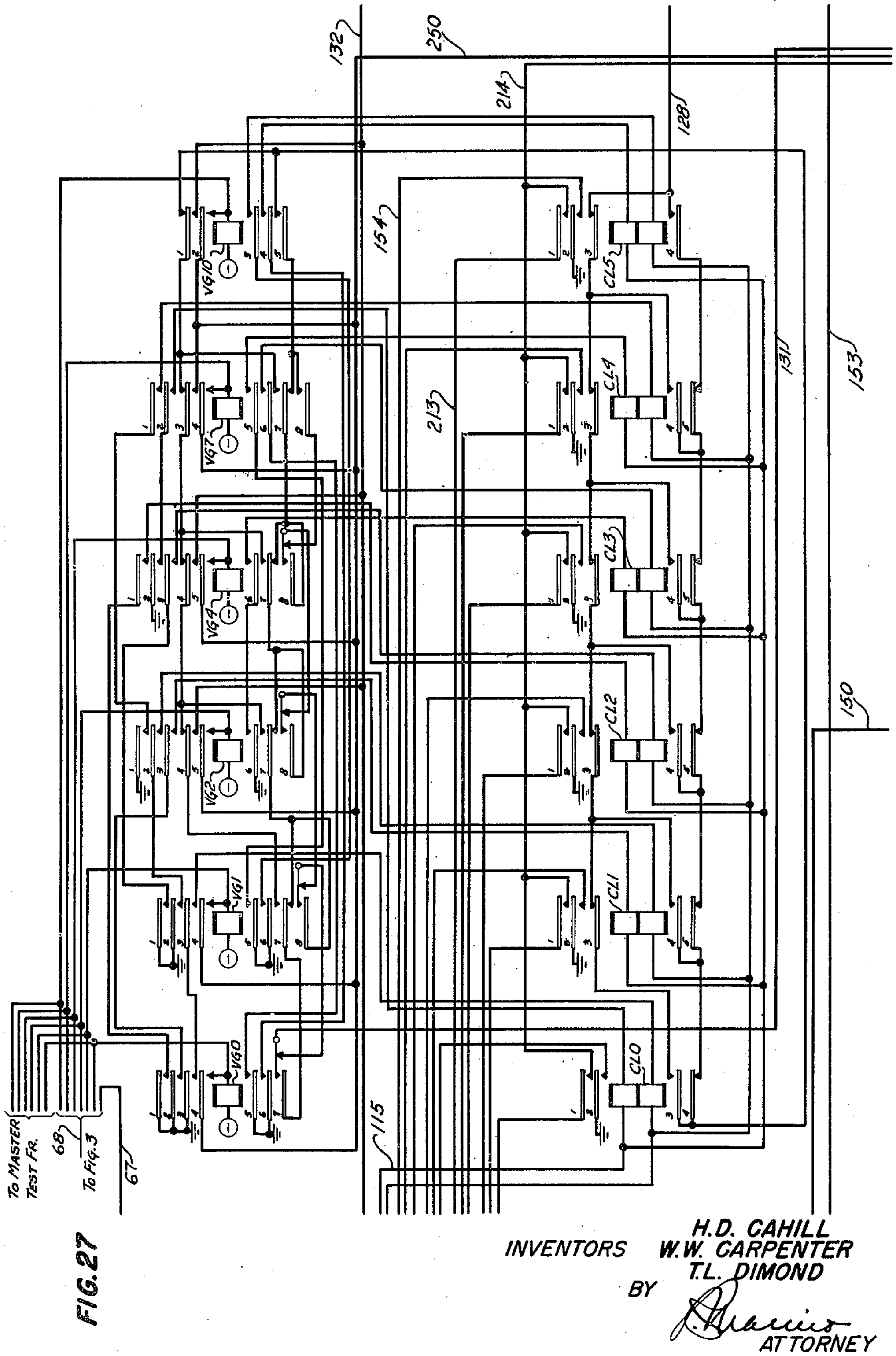
Figure 28:
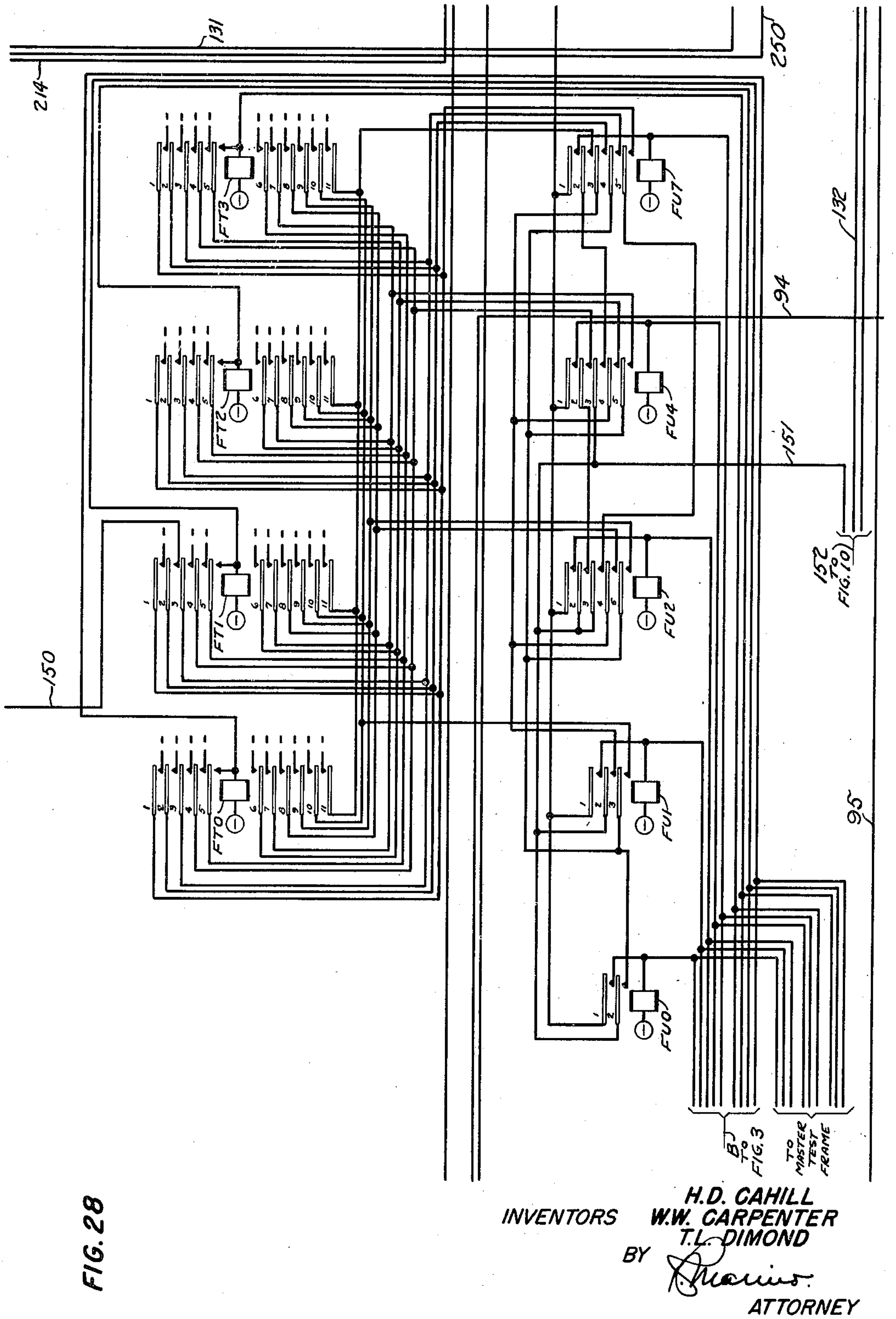
Figure 29:
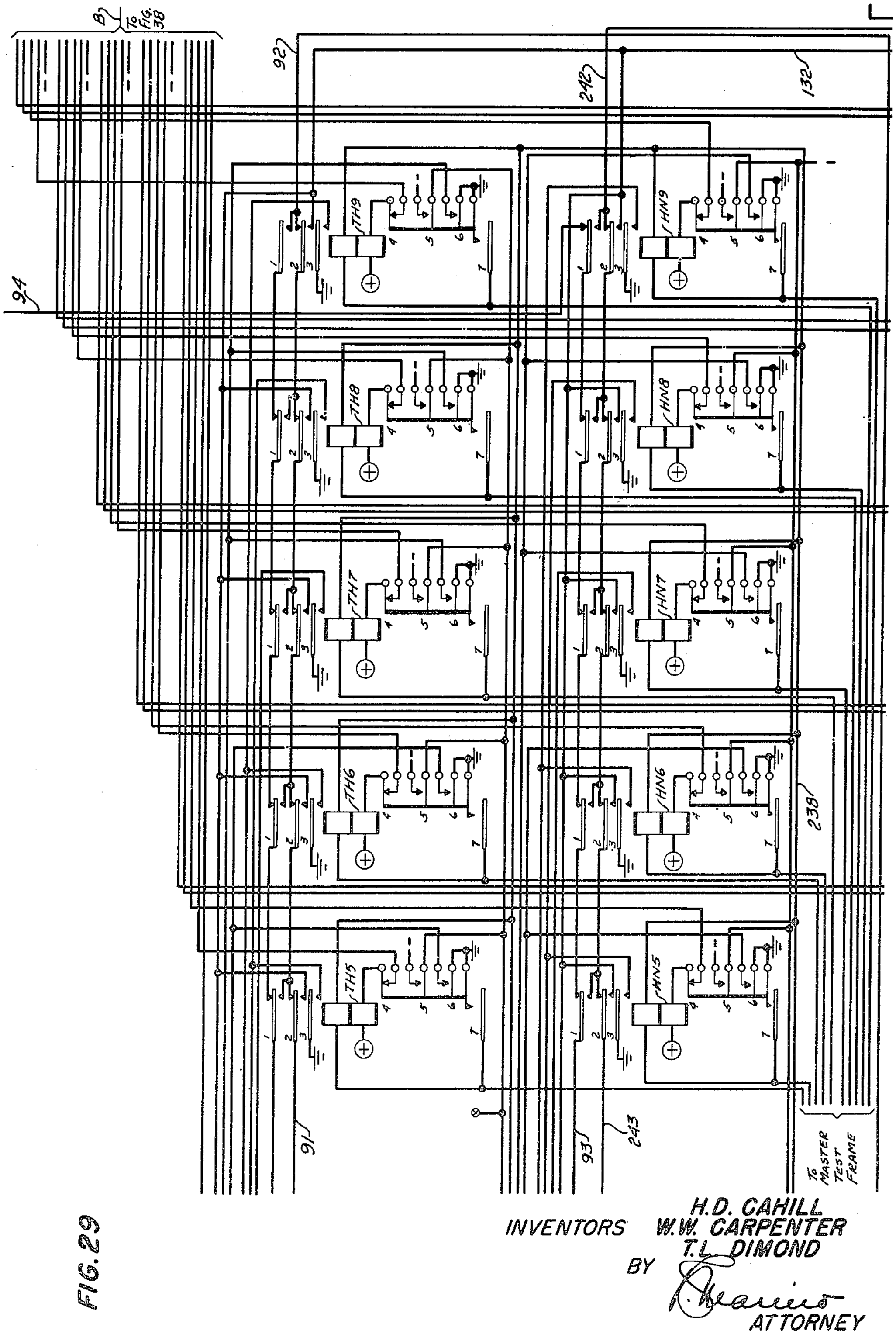
Figure 30:
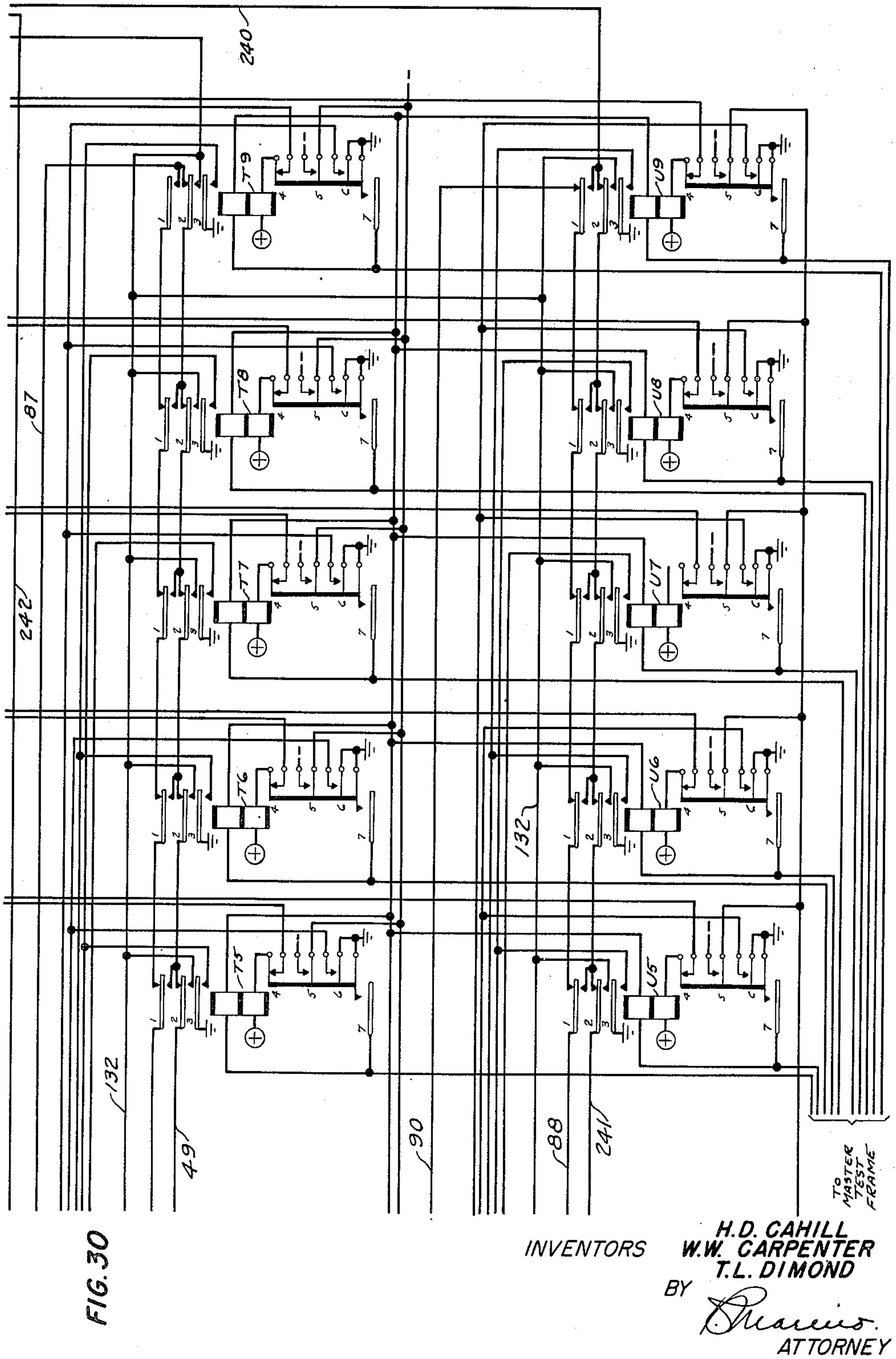
Figure 31:
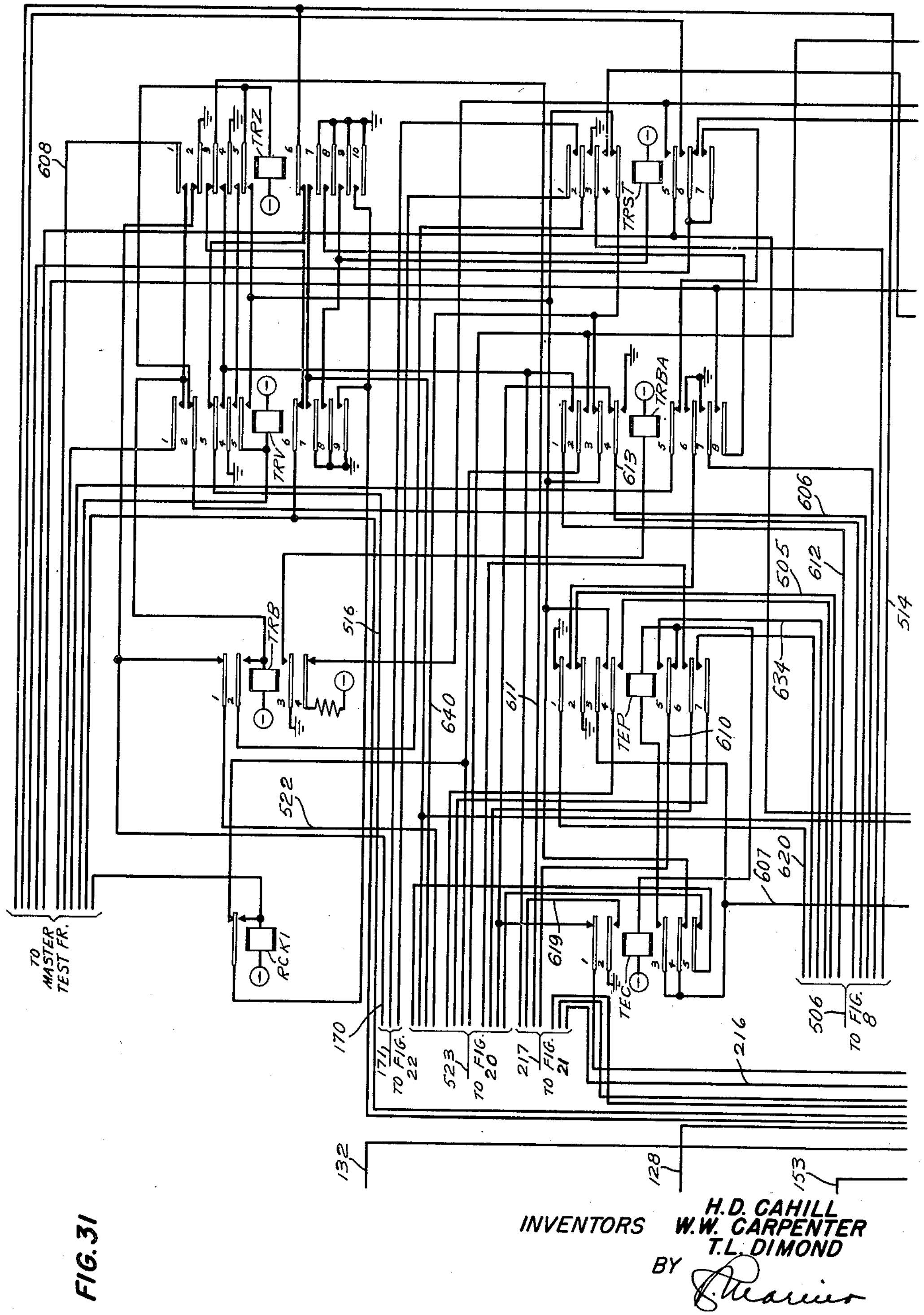
Figure 32:
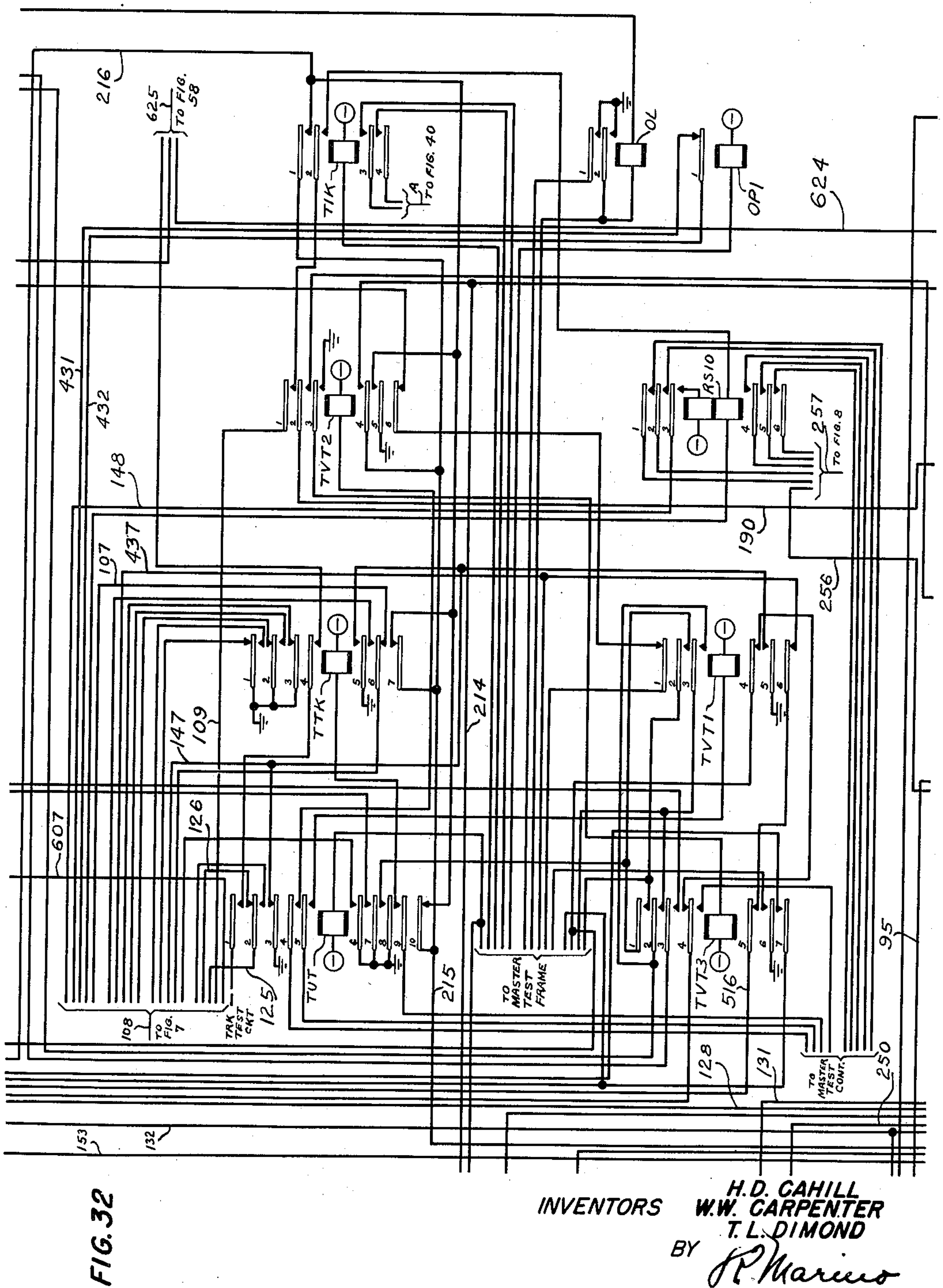
Figure 33:
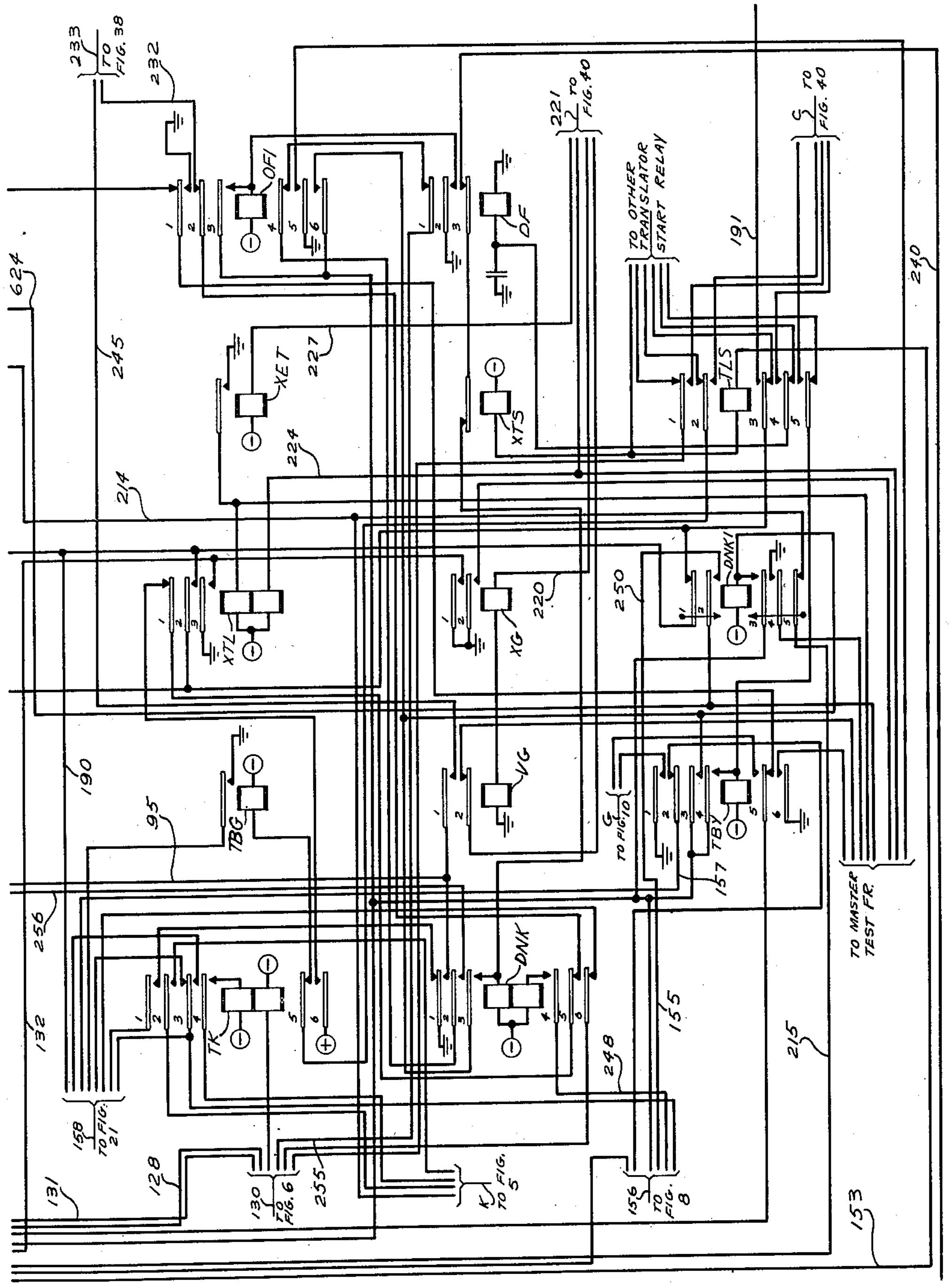

The circuits over which these relays operate are obvious. For example, two of relays RN0 . . . RN7 of Fig. 7 operate over circuits extending from battery through the windings of said relays, conductors in the group G49 within bracket 119, Nos. 23—27 contacts of relay TVA, Nos. 22—26 contacts of relay SA, and conductors in the group G48 within bracket 99 to ground through contacts of the corresponding operated relays of the relays RN0 . . . RN7 of Fig. 212 of said copending Busch application. The other relays listed above operate over similar circuits. The operated relays of the group RN0 . . . RN7 of Fig. 7 lock up through their No. 3 contacts, conductor 129, and No. 9 contacts of relay CK5 to ground. Other operated register relays of the transverter lock up over similar circuits.

In the embodiment of the invention illustrated, it is assumed that called stations have code pattern No. 1 (local area) and four-digit directory numbers. In this case, relays CP0 and CP1 are operated to register the code pattern and relay 4DG is operated to register the fact that the directory number of a calling station has four digits. However, relays CP0 . . . CP7 permit the registration of nine other code patterns while relay 5DG is provided for stations having five-digit directory numbers, relay LST for stations having four-digit directory numbers and letter party designations, and relay L5D for stations having five-digit directory numbers and letter party designations.

Relays MB0 . . . MB7 may register any message-billing index 0–9 in accordance with the message-billing index registered by the similar relays in the outgoing sender. The indices 0–8 are reserved for different rates for calls billed in message units. On this type of call a two-line entry is sufficient and relay 2L, which controls recording of two-line entries, should be operated. Appropriate cross-connections are, therefore, made to operate relay 2L for each of the indices 0–8 employed. The drawings show a cross-connection for message-billing index "0." When this index is registered by the operation of relays MB4 and MB7 and relay NOB is operated to indicate a non-observed call, relay 2L operates over a circuit extending from battery through the winding of said relay, No. 1 contacts of relay NOB, No. 1 back contacts of relay OBS, cross-connection C100, and No. 1 contacts of relays MB7 and MB4 to ground, and locks up through its No. 4 contacts, No. 7 contacts of relay OBS, conductor 105, and No. 5 contacts or relay CK5 to ground.

The message-billing index "9" is reserved for calls to be billed in money value. For a call of this kind, a four-line entry is required and relay 4L, which controls recording of four-line entries should be operated. When this index is registered by the operation of relays MB2 and MB7, relay MB9 operates over a circuit extending from battery through the winding of said relay, conductor 106, No. 7 contacts of relay MB7, and No. 1 contacts of relay MB2 to ground. Relay 2L does not then operate but relay 4L operates over a circuit extending from battery through the winding of said relay, conductor 107 within bracket 108, No. 6 back contacts of relay TTK, conductor 109 within bracket 108, and No. 4 contacts of relay MB9 to ground, and locks up through its No. 5 contacts, conductor 105, and No. 5 contacts of relay CK5 to ground. It will be observed that the operating circuit of relay 4L is independent of relays OBS and NOB and, therefore, relay 4L is operated and a four-line entry is made for every call with message-billing index "9" whether or not said call is observed.

On an observed call with message-billing index "0," however, relays MB4, MB7, and OBS are operated. Relay 4L then operates over a circuit extending from battery through the winding of said relay, conductor 107 within bracket 108, No. 6 back contacts of relay TTK, conductor 109 within bracket 108, No. 1 front contacts of relay OBS, cross-connection C100, and No. 1 contacts of relays MB7 and MB4 to ground. Thus, four-line entries are made on all observed calls, regardless of the message-billing index.

Relay 1TR or relay 2TR is also operated, indicating whether the present operation is a first trial or a second trial with the present transverter. If it is a first trial, relay 1TR operates over a circuit extending from battery through the winding of said relay, conductor 110 within bracket 66, No. 35 contacts of relay TVA, conductor 111, and No. 2 back contacts of relay TRA to ground, and locks up through its No. 3 contacts, conductor 112 and No. 12 contacts of relay CK5 to ground. If it is a second trial, relay TRA is operated, as described later, and relay 2TR operates instead of relay 1TR, over a circuit extending from battery through the winding of said relay, conductor 113 within bracket 66, No. 34 contacts of relay TVA, conductor 114, and No. 2 front contacts of relay TRA to ground, and locks up through its No. 5 contacts, conductor 112, and No. 12 contacts of relay CK5 to ground.

Relays VG0 . . . VG10 register in the transverter the vertical group of the line links on which the calling line is located, as registered by the similar relays in the outgoing sender. Two of the relays VG0 . . . VG7 are operated in combination to register vertical groups 0 . . . 9 and relay VG10 is operated in addition for vertical groups 10 . . . 19. For the purpose of recording, this registration is translated into a corresponding one of ten column numbers 0 . . . 9 by the operation of one of the relays CL0 . . . CL5 and one of the relays EVN and ODD. Relay EVN is operated for even-numbered columns and relay ODD for odd-numbered columns. Relay CL0 is operated for column No. 0 or column No. 1, relay CL1 for column No. 2 or column No. 3, etc. For example, if relays VG0, VG4 and VG10 are operated, thereby registering vertical group No. 14, relays EVN and CL5 operate over a circuit extending from battery through the winding of relay EVN, conductor 115, upper winding of relay CL5, No. 4 contacts of relay VG10, and No. 6 contacts of relay VG0 to ground, registering column No. 8.

The operated relays of the code pattern relays CP0 . . . CP7 cause the operation of relays of one of the groups of relays L0A . . . L0E, L1A . . . L1E, L2A . . . L2E, and L3A . . . L3E for a local call, or relays of one of the groups EX0A . . . EX0E, EX1A . . . EX1E, EX2A . . . EX2E, and EX3A . . . EX3E for an extended area call, the group operated corresponding to the code pattern registered. For example, if relays CP0 and CP1 are operated for code pattern No. 1, relays L1A . . . L1E operate over a circuit extending from battery through the windings of said relays in parallel, conductor 116, No. 4 contacts of relay CP1, and No. 2 contacts of relay CP0 to ground. Or if relays CP2 and CP4 are operated, registering code pattern No. 6 assigned to extended area calls, relays EX1A . . . EX1E operate over a circuit extending from battery through the windings of said relays in parallel, conductor 117, No. 2 contacts of relay CP4, and No. 2 contacts of relay CP2 to ground. The operated relays of the groups L0A . . . L0E, L1A . . . L1E, L2A . . . L2E, L3A . . . L3E, EX0A . . . EX0E, EX1A . . . EX1E, EX2A . . . EX2E, or EX3A . . . EX3E serve to indicate to the recording equipment the correct locations of the various digits composing the directory number of the called station.

A check is now made by relays CK1 and CK2 to insure that the proper number of register relays in the transverter are operated to register the necessary information in connection with the recording of a two-line entry or the last two lines of a four-line entry. Assuming, for example, that this information is registered by the operation of relays VG0, VG4, VG10, CL5, MB0, MB1, RN1, RN4, 2L (or 4L), TP, NOB, ITR, and SC1, relays CK1 and CK2 operate over a circuit extending from battery through the lower winding of relay CK2, conductor 125 within bracket 108, No. 2 contacts of relay TVT, conductor 126 within bracket 108, No. 1 front contacts of relay SC1, No. 1 normal contacts of relay 2TR, No. 2 front contacts of relay 1TR, No. 4 front contacts of relay NOB, No. 4 back contacts of relay OBS, No. 4 back contacts of relay RP, No. 4 front contacts of relay TP, No. 9 back contacts of relay 4L, No. 8 front contacts of relay 2L (or No. 9 front contacts of relay 4L and No. 8 back contacts of relay 2L), conductor 127, No. 3 back contacts of relay RN7, No. 7 front contacts of relay RN4, No. 7 back contacts of relay RN2, No. 7 front contacts of relay RN1, No. 6 normal contacts of relay RNO, No. 4 back contacts of relays MB7 . . . MB2, No. 7 front contacts of relays MB1 and MB0, conductor 128 within bracket 130, No. 4 contacts of relay CL5, No. 5 contacts of relays CL4 . . . CL1, No. 4 contacts of relay CL0, No. 5 contacts of relay VG10, No. 7 back contacts of relay VG7, No. 8 front contacts of relay VG4, No. 7 back contacts of relays VG2 and VG1, No. 7 front contacts of relay VG0, conductor 131 within bracket 130, No. 1 contacts of relay CK6, No. 1 contacts of relay CK5, and the lower winding of relay CK1 to ground. Relays CK1 and CK2, when operated, lock up through their No. 3 contacts and No. 6 contacts of relay CK6 to ground. If less than the proper number of register relays are operated, relays CK1 and CK2 cannot operate and further operations, described below, are prevented. If more than the proper number of relays in any group of register relays (except relays CL0 . . . CL5) are operated, relay AL operates to block further progress of the normal operations. For example, if relays RN1, RN2 and RN4 are operated in error, relay AL operates over a circuit extending from battery through the lower winding of said relay, conductor 132, No. 3 front contacts of relay RN4, No. 7 front contacts of relay RN2, No. 7 front contacts of relay RN1, and thence over the circuit traced above for relays CK1 and CK2 to ground, and locks up over a circuit extending from battery through its upper winding and No. 2 contacts, conductor 133, and No. 3 contacts of relay CK6 to ground, resulting in an alarm.

If a four-line entry is to be made, an additional check is provided to insure that the proper number of additional register relays concerned in this type of entry are operated. For example, relays 4DG, CP0, CP1, L1A . . . L1E and S7 may be operated in connection with a four-line entry to be made. Relay SCK then operates over a circuit extending from battery through the winding of said relay, conductor 134, No. 2 contacts of relay S7, conductor 135, No. 12 contacts of relay L1A, No. 11 contacts of relay L1B, conductor 136, No. 8 contacts of relay L1C, No. 8 contacts of relay L1D, conductor 137, No. 6 contacts of relays EX0E . . . EX3E, conductor 138, No. 5 contacts of relay L0E, No. 6 front contacts of relay L1E, No. 6 back contacts of relay L2E, No. 5 back contacts of relay L3E, conductor 140, No. 4 back contacts of relays CP4 and CP2, No. 6 front contacts of relay CP1, No. 5 front contacts of relay CP0, conductor 141, No. 5 back contacts of relays 5DG and LST, No. 5 contacts of relay 4DG, conductor 142 within bracket 143, and No. 7 contacts of relay CK5 to ground. Operation of relay SCK over this circuit checks that the proper number of register relays for the called-line information is operated.

*Selection of recorder*

When two of the relays RN0 . . . RN7 are operated, registering a recorder number, a recorder start relay associated with the recorder having that number, operates. For example, if relays RN4 and RN7 are operated, registering the recorder number "0," relay RSTO, associated with recorder No. 0, operates over a circuit extending from battery through the winding of relay XRS, conductor 144 lower winding of relay RST0, conductor 145, No. 1 contacts of relays RN7 and RN4, conductor 146, No. 6 contacts of relay CK4, No. 2 contacts of relays CK6, conductor 147 within bracket 108 and No. 3 contacts of relay TVT to ground. The current in this circuit is insufficient to operate relay XRS. Relay RST0 locks up and relay CK3 operates over a circuit extending from battery through the lower winding and No. 4 contacts of relay RST0, conductor 148, the winding of relay CK3, No. 1 contacts of relays CK1 and CK2, and back contacts of relay XRS to ground. Other relays (not shown) similar to relay RST0, are associated with other recorders, and their lower windings multipled to the lower winding of relay RST0. Should one or more of these relays be operated, the current through the winding of relay XRS would be sufficient to operate said latter relay, preventing the operation of relay CK3. When relay CK3 operated, relay CK4 operates over an obvious circuit through front contacts of relay CK3 to ground.

*Selection of translator*

Translators are selected by the transverter in accordance with the registered number of the line-link frame, the column of said frame upon which the calling-line appears, and the party of the calling station. The frame number is registered by the operation of two of the relays FT0 . . . FT3, and two of the relays FU0 . . . FU7, the column number is registered by the operation of two of the relays CL0 . . . CL5 and relay ODD or relay EVN, and the party by relay RP or relay TP, as previously described.

Assuming that relays FT1, FU1, and FU7 are operated, registering the frame number "18," relays EVN and CL5 are operated, registering column "8," and relay RP is operated, registering a ring party, relay RF18, associated with the translator shown, which is for ring parties of lines on frame No. 18, operates over a circuit extending from battery through the winding of said relay conductor 150, No. 2 contacts of relay FT1, No. 3 contacts of relay FU7, No. 2 contacts of relay FU1, conductor 151 within bracket 152, and No. 2 contacts of relay RP to ground. Another translator (not shown) is provided for tip parties of the same lines and would have been selected if relay TP had been operated instead of relay RP. The translator start relay TLS then operates over a circuit extending from battery through the winding of relay XTS, the winding of relay TLS, conductor 153, No. 1 contacts of relay RF18, conductor 154, and No. 2 contacts of relay CL5 to ground. The current in this circuit is insufficient to operate relay XTS. Other relays (not shown) similar to relay TLS, are associated with this translator and other transverters and their windings are multipled to the winding of relay TLS. Should one or more of these relays be falsely energized, the current through the winding of relay XTS would be sufficient to operate the latter relay, preventing operations described hereafter.

When relay TLS operates, relay TVP0 associated with the transverter shown, operates over a circuit extending from battery through resistor R13, No. 11 contacts of relay CK7, conductor 155 within bracket 156, No. 2 contacts of relay TBY, conductor 157 within bracket 158, No. 2 contacts of relay TAL2, conductor 190, within bracket 158, No. 1 contacts of relay DNK1, No. 3 front contacts of relay TLS, conductor 191, No. 6 back contacts of relay TR0, the winding of relay TVP0 and No. 3 normal contacts of relays TVP1 . . . TVPX to ground and locks up through its No. 3 front contacts to ground.

The upper winding of relay CHT is normally connected through No. 1 back contacts of relay TRX1, conductor 192, and No. 3 normal contacts of relays TVP0 . . . TVPX to ground, and the lower winding of relay CHT is normally connected through No. 2 back contacts of relay TRX1, conductor 193, and No. 1 back contacts of relays TVP0 . . . TVPX to ground. Similarly the upper winding of relay CHT1 is normally connected through No. 3 back contacts of relay TRX1, conductor 194, and No. 2 back contacts of relay TVP0 . . . TVPX to ground while the lower winding of relay CHT1 is connected through No. 4 back contacts of relay TRX1, conductor 195, and No. 4 back contacts of relay TVP0 . . . TVPX to ground. Relay CHT2 is similarly connected to relay E0 . . . EX. Relays CHT, CHT1, and CHT2 are differential relays which do not operate when both windings are energized but only when one winding is energized. These relays are not, therefore, normally operated but will operate if the circuit of one winding is opened by a faulty contact of relays TVP0 . . . TVPX and actuate an alarm. When relay TVP0 operates, it opens the circuits of both windings of relays CHT and CHT1 and the latter relays remain unoperated.

The connector relays TV0 and TV1 then operate, connecting the selected translator to the transverter. Relay TV0 operates over a circuit extending from battery through the left-hand winding of said relay, conductor 196, No. 1 back contacts of relay TR0, and No. 1 front contacts of relay TVP0 to ground and also over a circuit extending from battery through the right-hand winding of said relay conductor 197, No. 2 back contacts of relay TR0, and No. 2 front contacts of relay TVP0 to ground. Relay TV1 similarly operates on both windings through No. 3 and No. 4 contacts of relay TR0 and No. 4 and No. 5 contacts of relay TVP0 to ground. Relay W1 operates over a circuit extending from battery through resistor R14, the winding and normal contacts of said relay, conductor 198, and No. 4 contacts of relay TV1 to ground, to prepare the circuits for the next call.

Relay G0 or one of other similar relays not shown operates to register the group of the calling line as registered by relays ODD, EVN, and CL0 . . . CL5. The relay operated is determined by cross-connections which are made in accordance with the grouping of the line circuits. In the present case, relay G0 operates over a circuit extending from battery through the winding of said relay, conductor 210, No. 22 contacts of relay TV1, conductor 211 within bracket 212, No. 1 contacts of relay EVN, cross-connection C102, No. 7 contacts of relay RF18, conductor 213, No. 1 contacts of relay CL5, conductor 214, No. 5 contacts of relay DNK1, conductor 215, No. 10 contacts of relay TVT, conductor 216 within bracket 217, and No. 6 contacts of relay RKA to ground. Relay VG operates over a circuit extending from battery through resistor R12, No. 51 contacts of relay G0, conductor 218, No. 24 contacts of relay TV1, conductor 220 within bracket 221, the winding of relay XG, and the winding of relay VG to ground. The current in this circuit is insufficient to operate relay XG. However, if the transverter is falsely connected to more than one translator through other relays similar to relay TV1, the current in the above circuit is sufficient to operate relay XG which actuates an alarm.

One of the relays VF0 . . . VF9 and two of the relays SW0 . . . SW7 now operate to register the vertical file and the switch of the calling line in accordance with the similar relays registering these items in the outgoing sender. The circuits of relays VF0 . . . VF9 extend from battery through the winding of relay XVF, conductor 222, upper winding of relays VF0 . . . VF4, conductors in the group G51, No. 38 . . . 42, contacts of relay TV1, conductors in the group G52 within bracket 223, No. 46 . . . 50 contacts of relay TVA, No. 45 . . . 49 contacts of relay SA, and conductors in the group G53 within bracket 99, to the corresponding relays in the outgoing sender. The current in this circuit is insufficient to operate relay XVF but if more than one of the relays VF0 . . . VF9 operate in error, the current through the winding of said two relays in parallel is sufficient to operate relay XVF. Relay XTL then operates over a circuit extending from battery through the lower winding of said relay, conductor 224 within bracket 221, No. 25 contacts of relay TV1, and contacts of relay XVF to ground and actuates an alarm. Should any of the conductors, such as conductors 225 and 226 to the No. 11 back contacts of relays VF0 . . . VF9 be falsely grounded, relay XET operates over a circuit extending from battery through the winding of said relay, conductor 227 within bracket 221, and No. 26 . . . 35 contacts of relay TV1 to said ground and operates relay XTL over an obvious circuit. The circuits of relays SW0 . . . SW7 extend from battery through the upper windings of said relays, conductor in the group G54, No. 43 . . . 47 contacts of relay TV1, conductors in the group G55 within bracket 223, No. 51 . . . 55 contacts of relay TVA, No. 50 . . . 54 contacts of relay SA, and conductors in the group G56 within bracket 99 to the corresponding relays in the outgoing sender.

Figure 34:
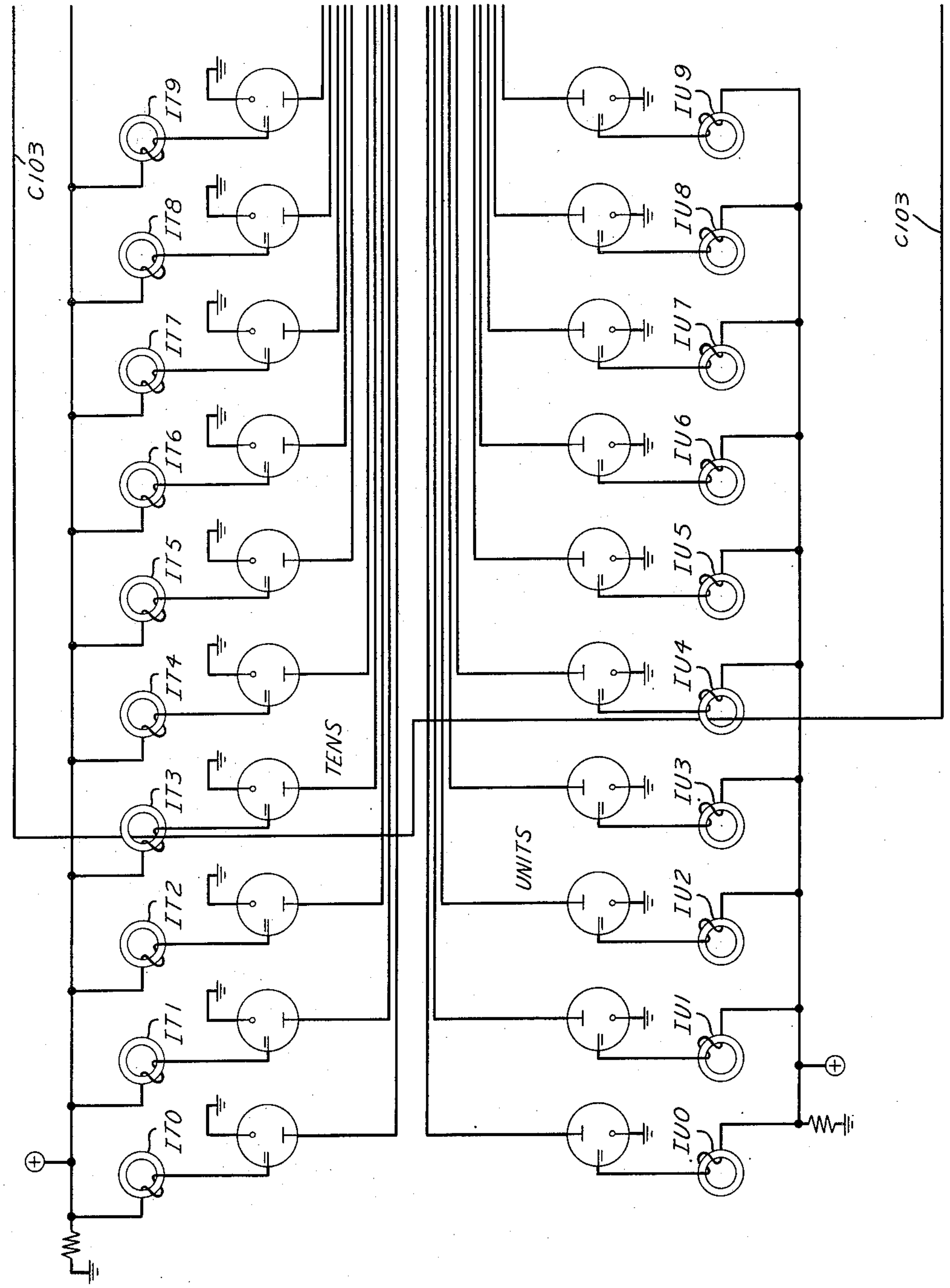
Figs. 34–42 show a translator circuit.
Figure 35:
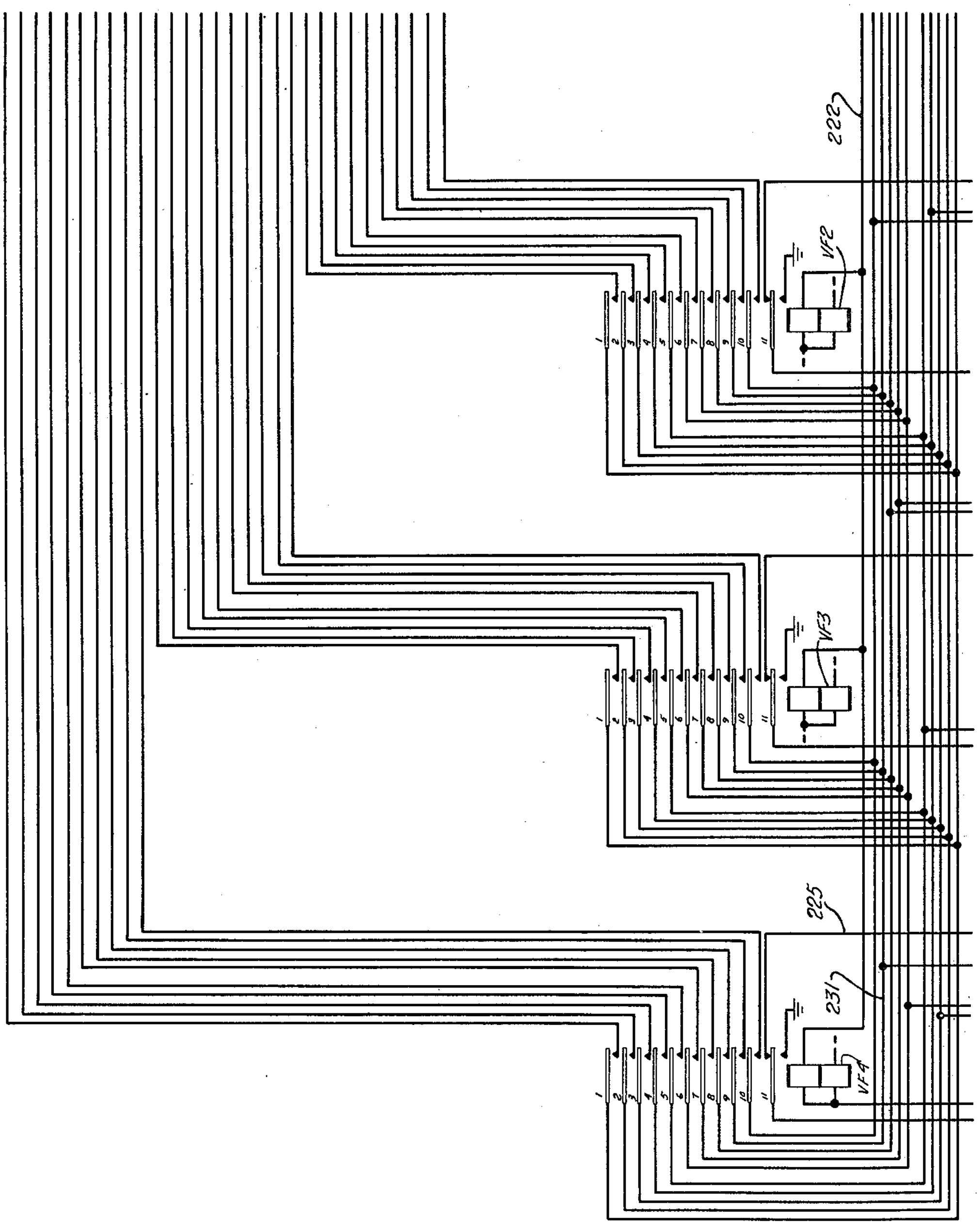
Figure 36:
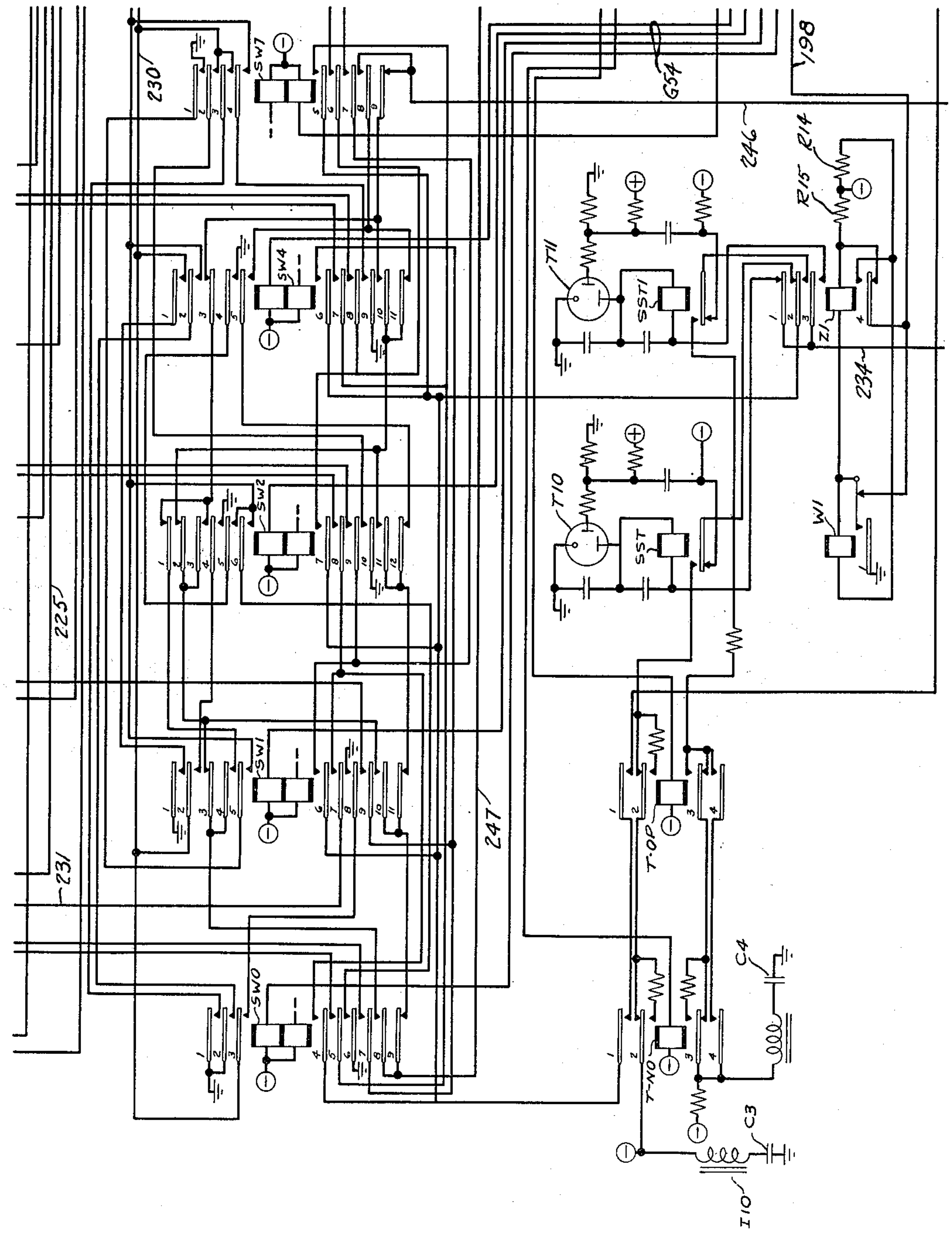
Figure 37:
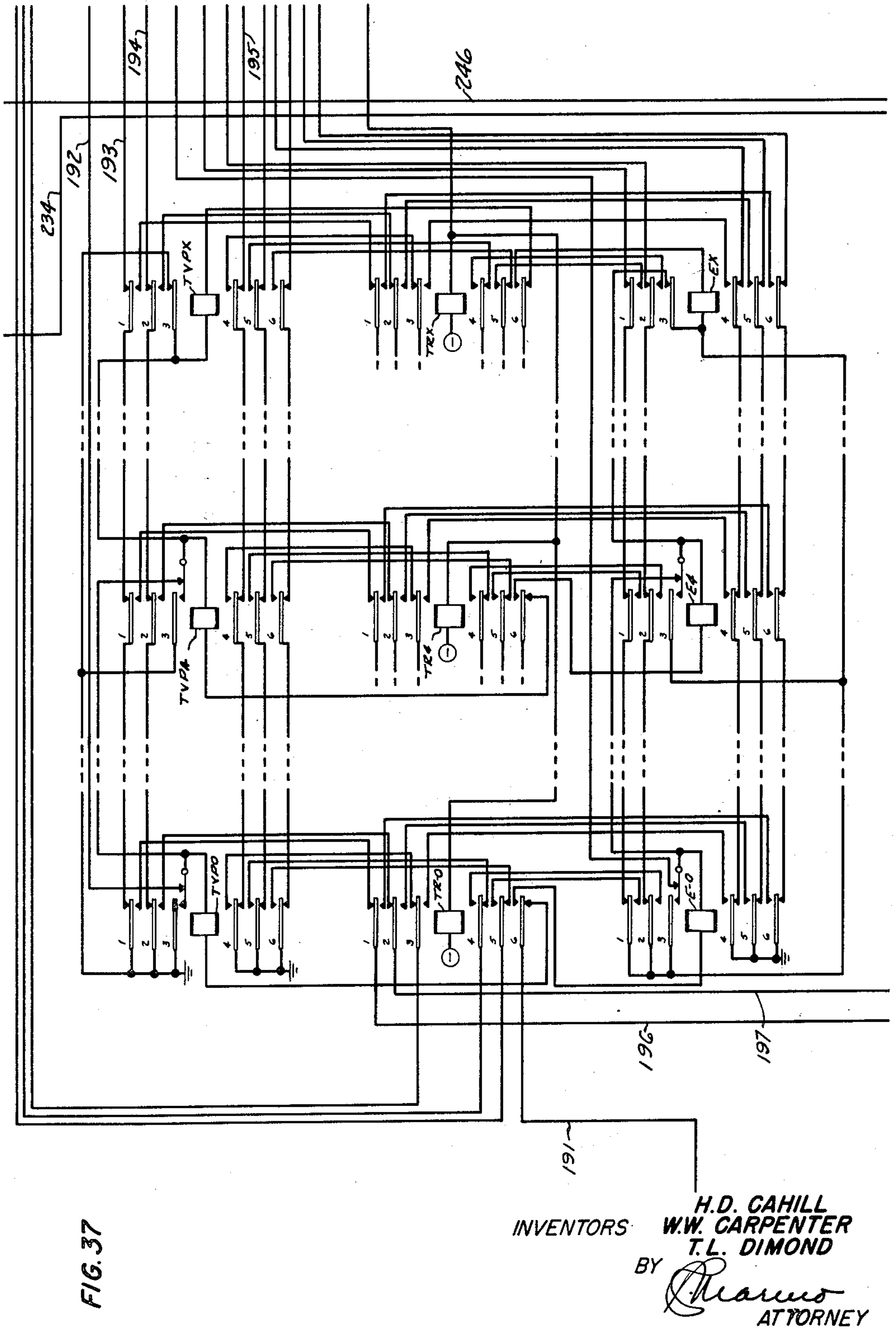
Figure 38:
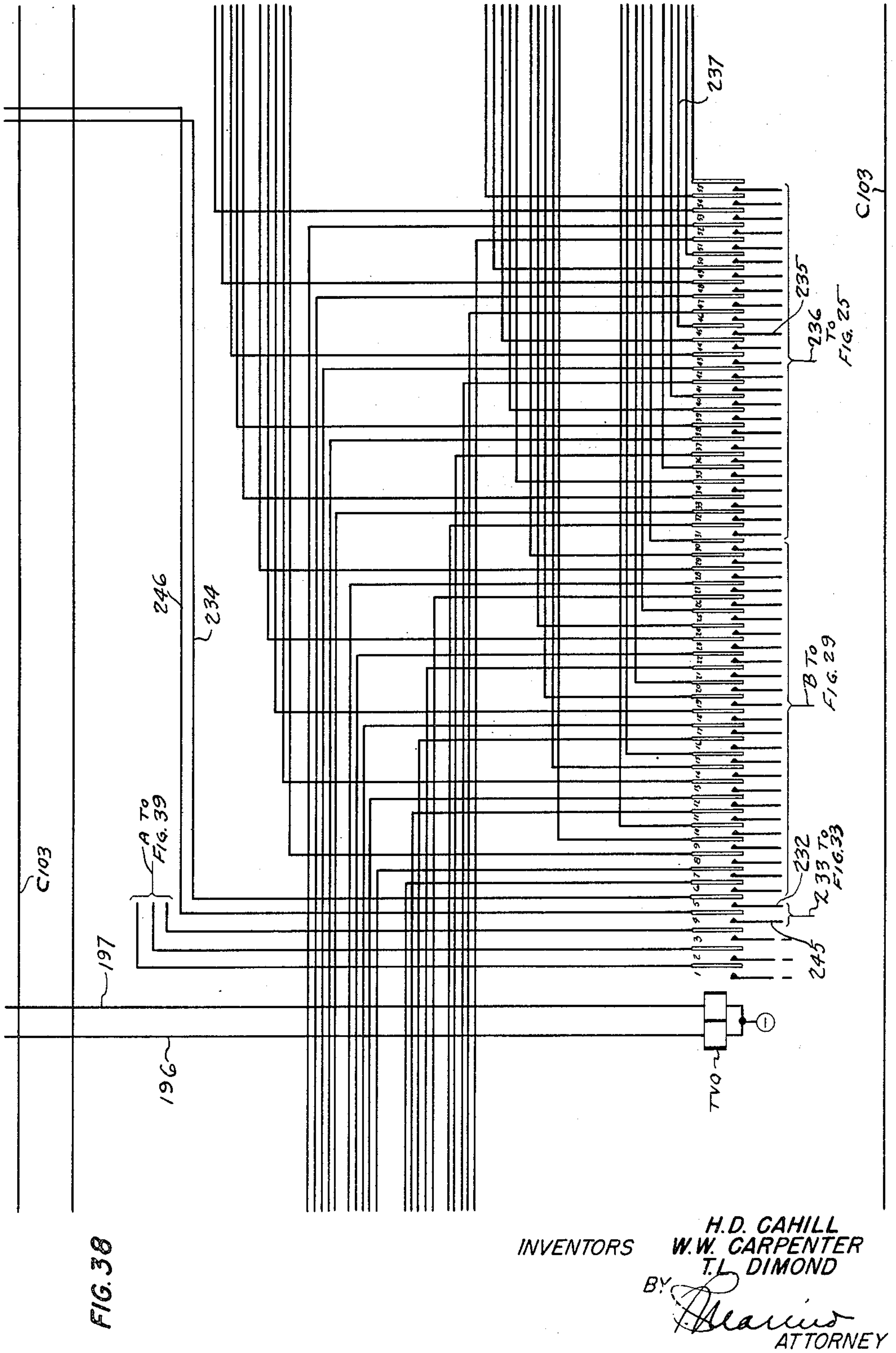
Figure 39:
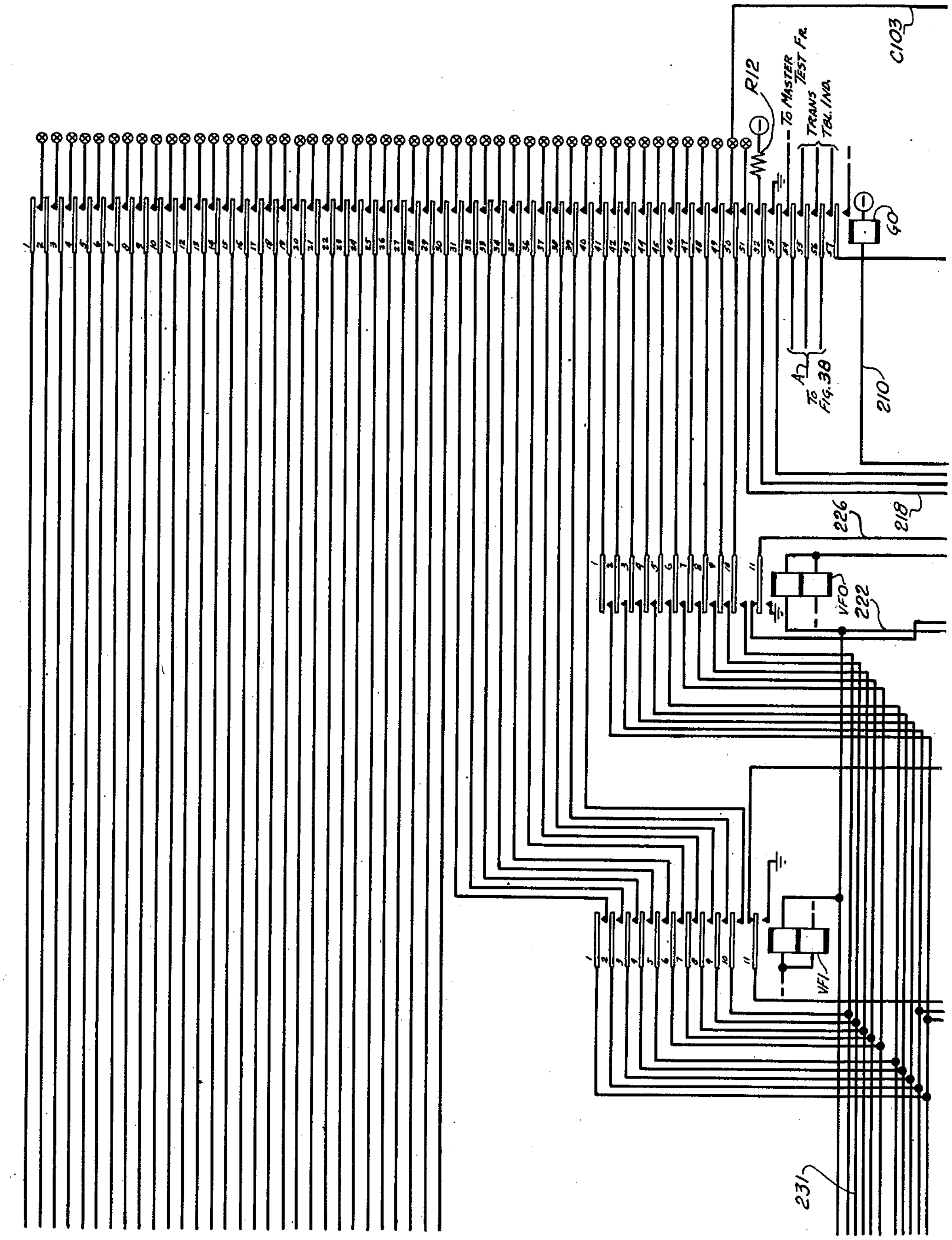
Figure 40:
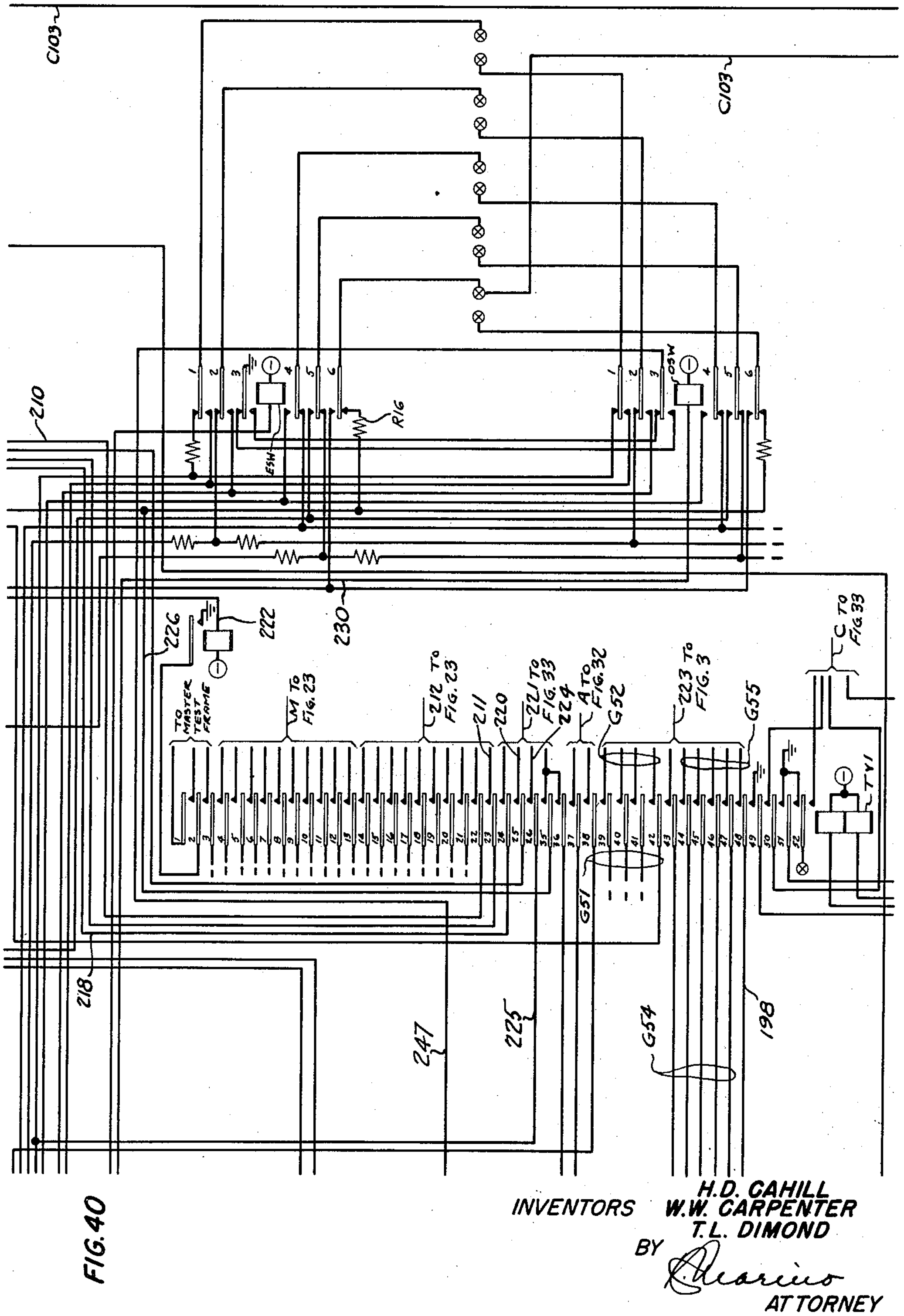
Figure 41:
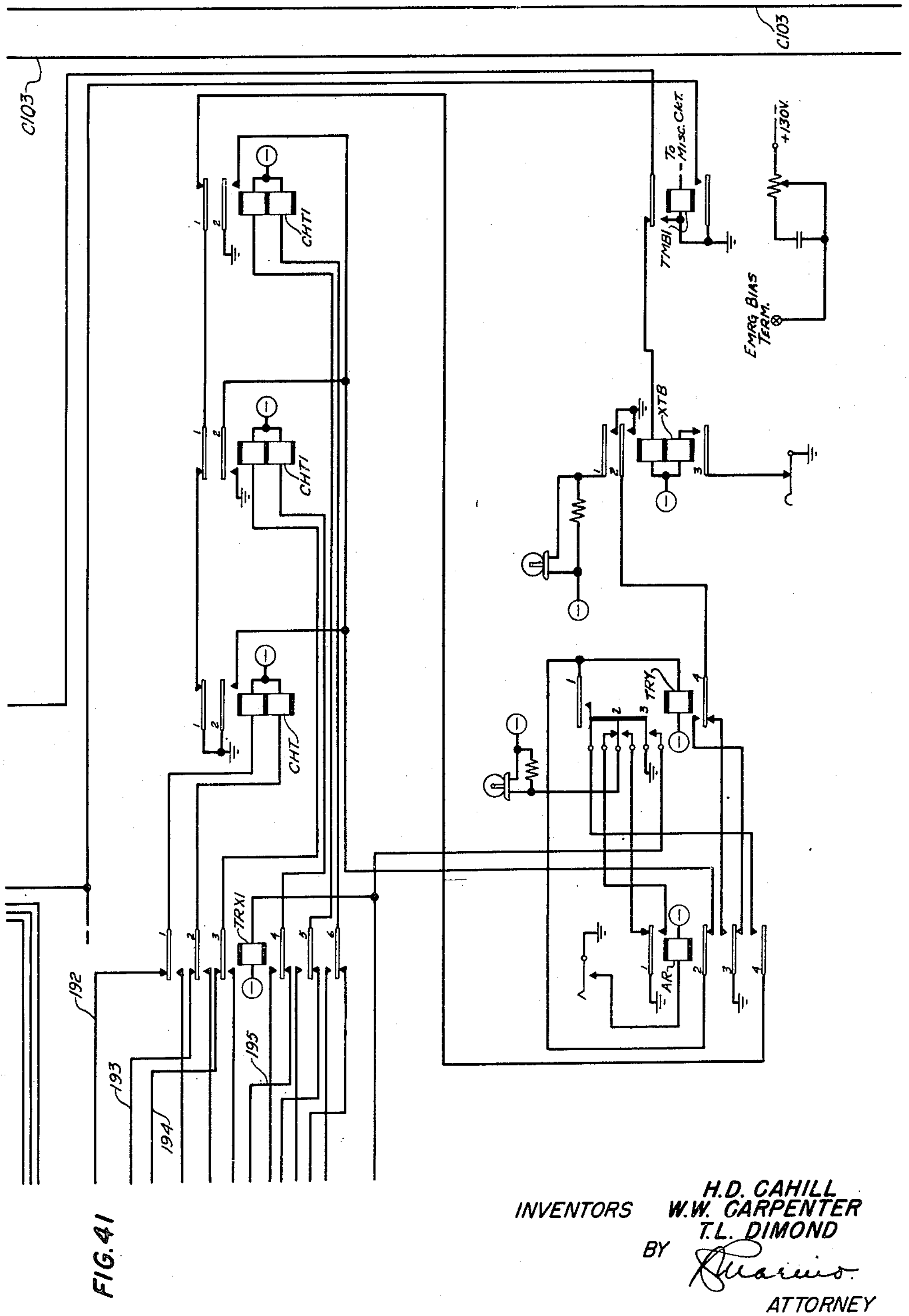
Figure 42:
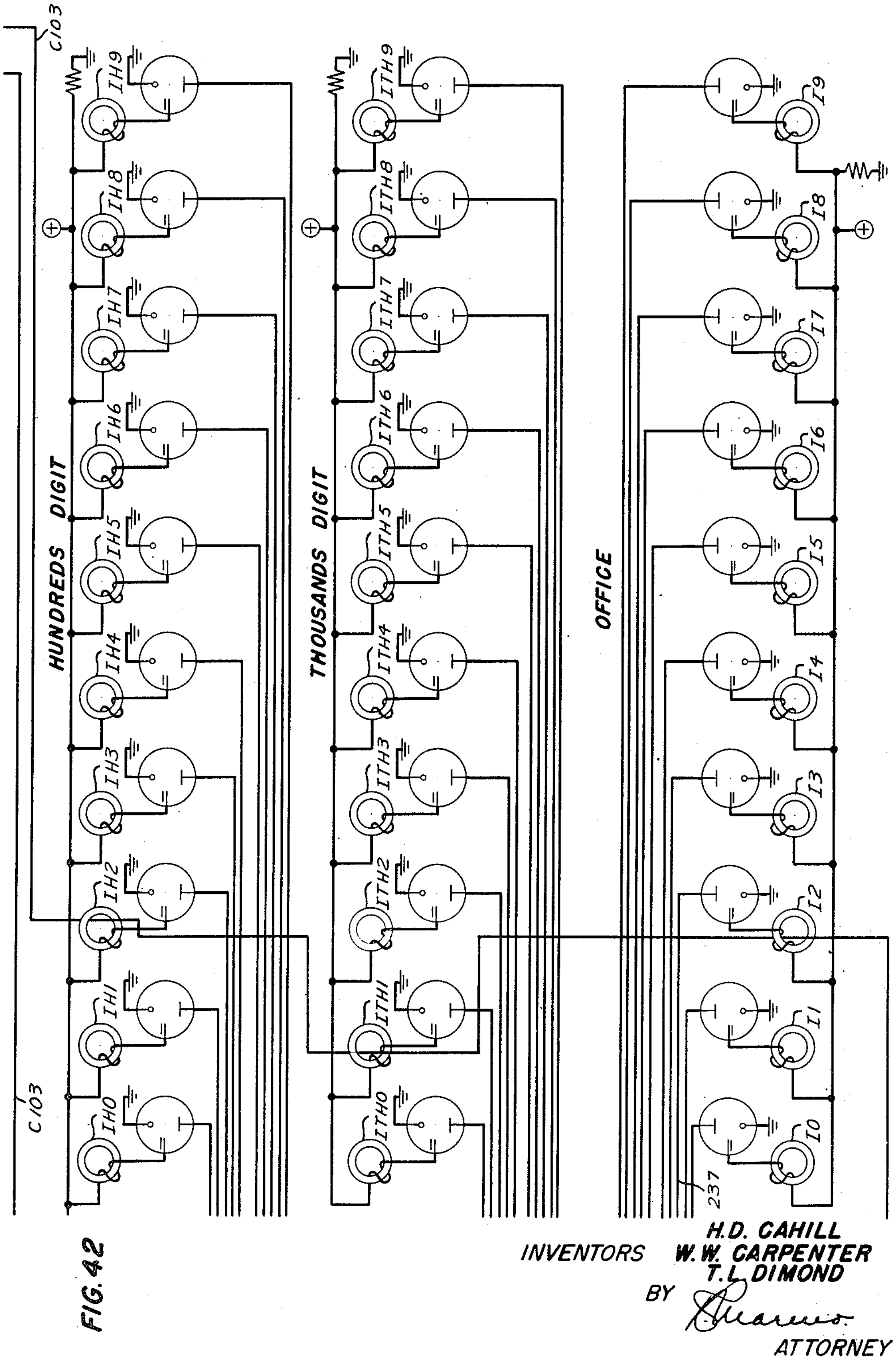
Figure 43:
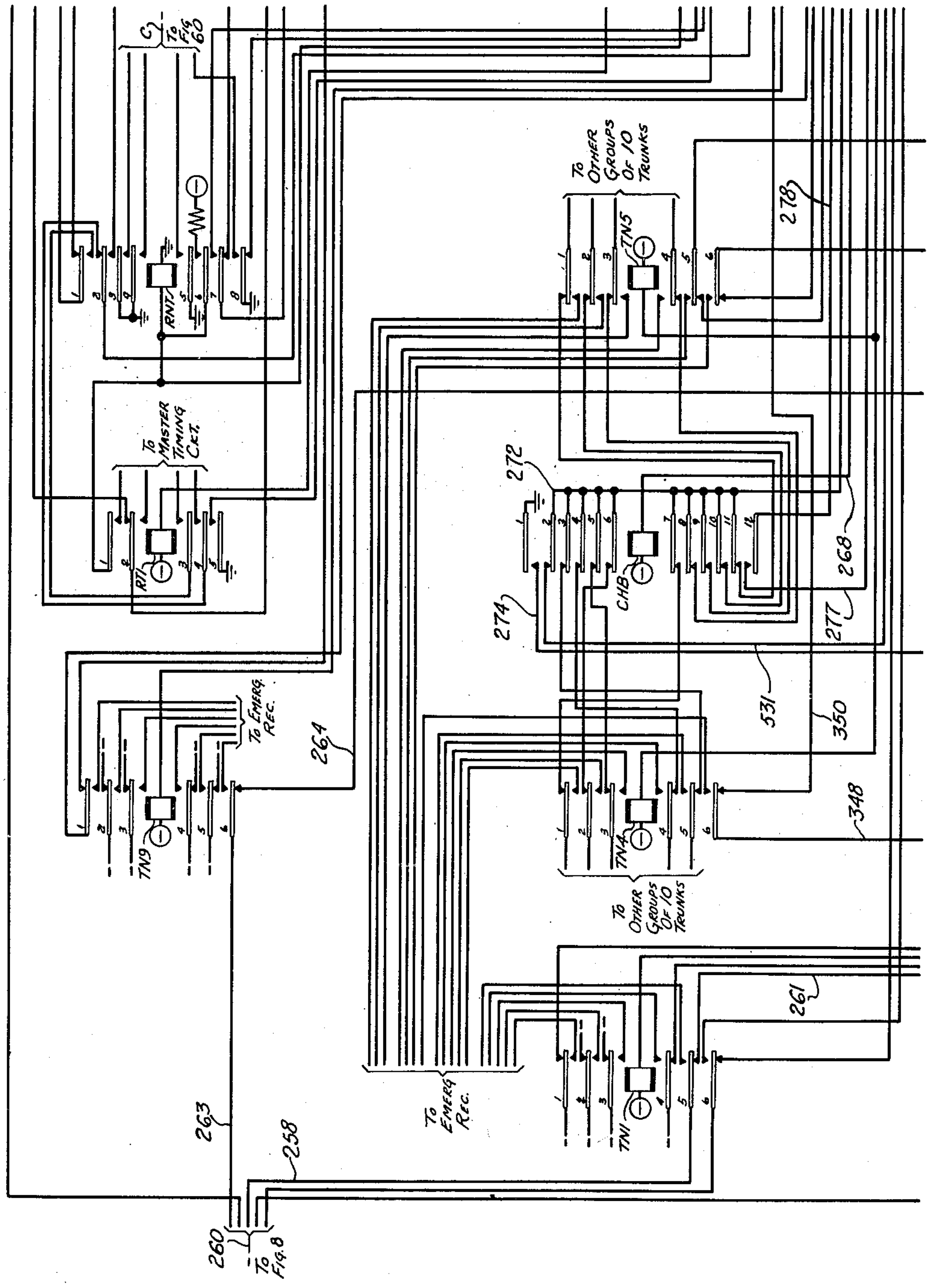
Figs. 43, 46, 47 and 49–64 show a recorder circuit.

It will be observed that contacts of the relays SW0 . . . SW7 are connected through contacts of the relays VF0 . . . VF9 and contacts of relay TV1 to fifty terminals associated with relay G0 in Fig. 39. Each operated combination of two of the relays SW0 . . . SW7 and one of the relays VF0 . . . VF9 directs an impulse, described later, to a particular one of these terminals. Each terminal, then, when thus energized, represents a particular vertical file of a particular switch. From each terminal, a wire is run and threaded through five of the coils shown in Figs. 34 and 42. Each coil represents a digit. There are ten coils I0 . . . I9 for ten office digits, ten coils ITH0 . . . ITH9 for thousands digits, ten coils IH0 . . . IH9 for hundreds digits, ten coils IT0 . . . IT9 for tens digits, and ten coils IU0 . . . IU9 for units digits. The coils through which the wire is threaded from a particular terminal are those coils which represent the digits of the directory number assigned to one of the stations of the line at the location represented by said terminal. It will be remembered that the translator shown is for ring-party stations. The coils through which the wire is run are, therefore, those which represent the directory number of the ring-party station of said line. Another similar translator (not shown) is provided for tip-party stations. If there is a tip-party station on said line, a second wire is similarly run from said terminal through the coils of this latter translator which represent the directory number of said tip-party station. When the terminal is then energized, the impulse passes through the wire of the selected translator to ground and, by induction, energizes the coils through which the wire is threaded and their associated vacuum tubes.

Assume, for example, that the ring-party of a line on vertical file No. 0 of switch No. 1 is in office No. 2 and has the directory number "1234." Then a wire is run from terminal No. 49, which represents vertical file No. 0 of switch No. 1, through coil I2 for the office digit, coil ITH1 for the thousands digit, coil IH2 for the hundreds digit, coil IT3 for the tens digit, and coil IU4 for the units digit, as shown by cross-connection C103 to terminal G101, which will be grounded, as described later.

Assume now that the calling station is the station mentioned above. The location of the line of this station is registered by the operation of relays VF0, SW0, and SW1, as described above. Relay OSW operates over a circuit extending from battery through the winding of said relay, conductor 230, No. 3 contacts of relay SW0 and No. 8 contacts of relay SW1 to ground. The capacitor C3 is charged by battery through inductor I10. Battery through back contacts of relay SST, No. 2 back contacts of relay Z1, No. 4 contacts of relay SW0, No. 7 contacts of relay SW1, conductor 231, No. 9 contacts of relay VF0, No. 49 contacts of relay G0, cross-connection C103, No. 6 back contacts of relay ESW, resistor R16, conductor 226, and No. 11 contacts of relay VF0 to ground causes tube T10, whose grid is suitably biased, to conduct over a circuit extending from battery through No. 6 contacts of relay TK, No. 1 contacts of relay XTL, No. 5 contacts of relay DNK, No. 2 contacts of relay OF1, conductor 232 within bracket 233, No. 5 contacts of relay TV0, conductor 234, No. 1 contacts of relay Z1, the winding of relay SST, and the anode-cathode space of tube T10 to ground. Relay SST is thereby operated and capacitor C3 discharges through inductor I10, No. 2 back contacts of relays TNO and TOP, front contacts of relays SST, No. 2 back contact of relay Z1, No. 4 contacts of relay SW0, No. 7 contacts of relay SW1, conductor 231, No. 9 contacts of relay VF0, No. 49 contacts of relay G0, cross-connection C103, No. 6 back contacts of relay ESW, resistor R16, conductor 226, and No. 11 contacts of relay VF0 to ground. The discharge current through cross-connection C103 induces potential in coils I2, ITH1, IH2, IT3, and IU4, raising the potentials of the grids of the vacuum tubes associated with said coils to the conduction point. Relays OFF2, TH1, HN2, T3 and U4 thereupon operate. Relay OFF2 operates over a circuit extending from battery through the lower winding and No. 3 normal contacts of said relay, conductor 235 within bracket 236, No. 44 contacts of relay TV0, conductor 237, and the anode-cathode space of the tube associated with coil I2, to ground. Relays TH1, HN2, T3 and U4 operated over similar circuits. All of said relays lock up over circuits extending from battery through No. 10 contacts of relay CK7, conductor 238 within bracket 86, their upper windings and their respective No. 4 contacts to ground. These relays register the office and the directory number of the calling station.

*Release of translator*

When the directory number of the calling station is thus registered, relay DNK operates over a circuit extending from battery through the upper winding of said relay, contacts of relay XTS, No. 3 contacts of relay OF, conductor 240, No. 2 back contacts of relays U9 . . . U5, conductor 241, No. 1 front contacts of relay U4, No. 1 back contacts of relay U3 . . . U0, conductor 87, No. 2 back contacts of relays T9 . . . T5, conductor 49, No. 2 back contacts of relay T4, No. 1 front contacts of relay T3, No. 1 back contacts of relays T2 . . . T0, conductor 242, No. 2 back contacts of relay HN9 . . . HN5, conductor 243, No. 2 back contacts of relays HN4 and HN3, No. 1 front contacts of relay HN2, No. 1 back contacts of relay HN1 and HN0, conductor 92, No. 2 back contacts of relays TH9 . . . TH5, conductor 91, No. 2 back contacts of relays TH4 . . . TH2, No. 1 front contacts of relay TH1, No. 1 back contacts of relay TH0, conductor 244, No. 2 back contacts of relays OFF5 . . . OFF3, No. 1 front contacts of relay OFF2, No. 1 back contacts of relay OFF1 and OFF0, conductor 95, No. 1 contacts of relay VG, conductor 245 within bracket 233, No. 4 contacts of relay TV0, conductor 246, No. 8 contacts of relay SW7, No. 5 contacts of relay SW4, No. 12 contacts of relay SW2, No. 11 contacts of relay SW1, No. 9 contacts of relay SW0, conductor 247, No. 3 back contacts of relay OSW and No. 2 front contacts of relay ESW to ground, and locks up through its lower winding and No. 4 contacts, conductor 248 within bracket 156, and No. 2 contacts of relay CK7 to ground. Relay DNK1 then operates over a circuit extending from battery through the winding of said relay and No. 3 contacts of relay DNK over the locking path of relay DNK to ground, and locks up through its No. 3 contacts, conductor 250 within bracket 156, and No. 1 contacts of relay CK7 to ground.

Operation of relay DNK checks that the proper number of register relays for the directory number and the line location are operated. If less than the required number are operated, relay DNK does not operate and subequent normal operations are thereby prevented. If more than the required number of register relays are operated, relay AL operates. For example, if relays U4 and U5 are operated in error, relay AL operates over a circuit extending from battery through the lower winding of said relay, conductor 132 within bracket 152, No. 2 front contacts of relay U4, No. 1 front contacts of relay U3, No. 1 back contacts of relays U2 . . . U0, conductor 87 and thence, over the operating path of relay DNK traced above, to ground. Relay AL actuates an alarm described later. Relay DNK1 is made slow to operate so that it will not become locked up before register relays which may operate slowly have had time to operate.

Operation of relay DNK1 opens the circuit of and releases relay TVP0, thereby releasing the connector relays TV0 and TV1, disconnecting the translator from the transverter. Release of relays TV0 and TV1 releases the other operated relays of the translator. However, upon the release of relay G0, relay Z1 operates over a circuit extending from battery through resistor R15, the winding of relay Z1, and front contacts of relay W1 to ground. Relay Z1 changes the connections of the impulse circuit so that, on the next call, relay SST1 and tube T11 will be actuated and the impulse provided by capacitor C4.

*Seizure of recorder*

A preference relay in the recorder connector circuit, for example, relay TP0, now operates over a circuit extending from battery through resistor R4, No. 7 contacts of relay RL, conductor 251, No. 1 contacts of relay TAL2, No. 3 contacts of relay TM3, conductor 252 within bracket 177, No. 5 contacts of relay RTR, No. 4 contacts of relay AL, conductor 253, No. 1 contacts of relay EXT, conductor 254, No. 5 contacts of relay CK4, conductor 255 within bracket 130, No. 1 contacts of relay OF, No. 4 contacts of relay OF1, No. 2 contacts of relay DNK, conductor 256 within bracket 257, No. 1 front contacts of relay RST0, conductor 258 within bracket 260, No. 5 back contacts of relay TN1, conductor 261, the winding and No. 3 normal contacts of relay TP0, No. 3 normal contacts of relay TP1 . . . TPX and HP, and No. 3 contacts of relay IP to ground. If any other preference relay is operated, indicating that the recorder is in use, operation of relay TP0 will await release of said relay. When relay TP0 operates, the connector relay TCY operates over a circuit extending from battery through No. 4 contacts of relay CK1, conductor 262, No. 7 front contacts of relay RST0, conductor 263 within bracket 260, No. 6 contacts of relay TN9, conductor 264 within bracket 265, the winding of relay TCY, conductor 266, No. 4 contacts of relay ON1, No. 1 front contacts of relay TP0, and No. 1 contacts of relay MTP to ground, and locks up around the contacts of relay ON1 over a circuit which may be traced from the winding of relay TCY through No. 2 contacts of said relay, conductor 267, No. 1 front contacts of relay TP0, and No. 1 contacts of relay MTP to ground. Relay TCY connects the recorder to the transverter.

Relays CHB and TVM now operate over a circuit extending from battery through the windings of said relays in parallel, conductor 268 within bracket 270, and No. 1 contacts of relay TCY to ground. Relay CHB opens the circuits which normally extend from ground through No. 9 normal contacts of relay MBAR, No. 6 contacts of relay MBA, and No. 6 contacts of relay R, and from ground through No. 7 normal contacts of relay MBBR, No. 5 contacts of relay MBB, and No. 1 contacts of relay RT, thence over conductor 271, No. 10 contacts of relay PTS, conductor 272, No. 3 . . . No. 7 contacts of relay CHB, and No. 1 . . . No. 5 contacts of relay TN4 to trunks having access to this recorder. Removal of said ground prevents seizure of this recorder by another trunk which may be ready for recording an answer or a disconnect entry. Relay ON operates over a circuit extending from battery through the winding of said relay and No. 9 contacts of relay TVM to ground, operating relay ON1 over a circuit extending from battery through the winding of said relay, conductor 273, and No. 2 contacts of relay ON to ground.

Relay RD operates over a circuit extending from battery through the winding of said relay, No. 4 normal contacts of relay TVM1, conductor 274 within bracket 270, and No. 1 contacts of relay CHB to ground. If any one of the relays TT0 . . . TT9 or UX0 . . . UX9, for example relay UX9, is operated, relay RD locks up through its No. 9 contacts, conductor 275, No. 2 back contacts of relay TN6, conductor 276 and No. 1 front contacts of relay UX9 to ground. Relay RD opens the circuits of and releases any of the relays TT0 . . . TT9 or UX0 . . . UX9 which may be operated. Relay TVM1 then operates over a circuit extending from battery through the winding of said relay, conductor 277 within bracket 270, No. 12 contacts of relay CHB, conductor 278 within bracket 270, No. 8 contacts of relay RD, conductor 280, No. 1 back contacts of relay TN6, conductor 281, No. 2 contacts of relays TT0 . . . TT9, conductor 282, and No. 1 normal contacts of relays UX0 . . . UX9 to ground. Operation of relay TVM1 over this circuit checks that relays TT0 . . . TT9 and UX0 . . . UX9 are normal. When relay TVM1 operates, the operating circuit of relay RD is thereby opened and relay RD released.

Relay RK of the transverter now operates over a circuit extending from battery through the winding of said relay, conductor 283 within bracket 284, and No. 6 contacts of relay TCY to ground, operating relay RKA over a circuit extending from battery through the winding of said relay, conductor 285 within bracket 177, and No. 6 front contacts of relay RK to ground. Battery is thereby connected through resistor R5, No. 3 contacts of relay IC, conductor 286, No. 9 contacts of relay RK, conductor 287, No. 2 contacts of relay CK 4, conductor 288 within bracket 290, No. 4 contacts of relay TVC, conductor 301 within bracket 99, through the outgoing sender, outgoing sender link, and the trunk, to conductor 300 within bracket 299, thence through No. 10 back contacts of relay TA0, conductor 292, upper winding of relay TT0, conductor 293, No. 6 contacts of relay TN6, conductor 294 within bracket 270, No. 7 contacts of relay TVM1, conductor 295, No. 20 contacts of relay TCY, conductor 178 within bracket 180, No. 3 contacts of relay TOK, and windings of relay ICK in series, to the potentiometer formed by battery through the winding of relay DCB, resistor R2, and No. 4 contacts of relay CK6 to ground, operating relay ICK but not operating relay TT0. Relay IC then operates over an obvious circuit, opening the above-traced circuit of relay ICK. Relay ICK should then release, but if its circuit is grounded at some point it will not, actuating an alarm instead, as described later. If relay ICK releases, relay TOK operates over a circuit extending from battery through the winding of said relay, No. 5 contacts of relay IC, and back contacts of relay ICK to ground, opening the circuit of relay ICK.

*Identification of trunk*

The group of ten trunks in which the trunk involved in the call is located, is identified by the operation of one of the relays TT0 . . . TT9 which also identified the tens digit of the trunk number, since all trunks in each group of ten have numbers with the same tens digit. The position of the trunk in the group of ten is identified by the operation of one of the relays UX0 . . . UX9 which also identifies the units digit of the trunk number, the trunks being consecutively numbered in each group of ten. The contacts of relay TA0 are connected respectively to the trunks of the first group of ten while the contacts of relays TA1 . . . TA9 are similarly connected to the trunks of succeeding groups of ten. Assuming that the trunk involved in the present call is the fifth trunk in the first group of ten, when relay T0K operates, as described above, relay TT0 operates over a circuit extending from battery through resistor R6, No. 6 normal contacts of relay RD, No. 8 front contacts of relay TVM1, conductor 294 within bracket 270, No. 6 back contacts of relay TN6, conductor 293, upper winding of relay TT0, conductor 292, No. 10 contacts of relay TA0, conductor 300 within bracket 299, through the trunk, outgoing-sender link, and outgoing sender circuits, thence over conductor 301 within bracket 99, No. 4 contacts of relay SC, No. 4 contacts of relay TVC, conductor 288 within bracket 290, No. 2 contacts of relay CK4, conductor 287, No. 2 contacts of relay RK, conductor 302, No. 1 contacts of relay T0K, conductor 303 within bracket 84, No. 3 contacts of relay TAL1, and No. 1 contacts of relay TM3 to ground, and locks up through its lower winding and No. 6 contacts, conductor 304, No. 5 back contacts of relay TN7, conductor 305, contacts of the normally-operated relay TL, conductor 306, No. 5 contacts of relay RD, conductor 307, No. 16 contacts of relay TCY, conductor 59 within bracket 308, and the winding of relay XT to ground. The current in the above locking circuit is insufficient to operate relay XT, but if more than one of the relays TT0 . . . TT9 lock up over this circuit, the increased current operates relay XT which actuates an alarm as described later.

Upon the operation of relay TT0, the associated relay TA0 operates over a circuit extending from battery through the winding of said relay, conductor 310, No. 4 front contacts of relay TT0, and No. 4 back contacts of relays TT1 . . . TT9 to ground. Relay TL0 operates over a circuit extending from battery through the winding of relay A, conductor 309, the winding of relay TL0, No. 3 contacts of relay TT0, and No. 3 back contacts of relays TT1 . . . TT9 to ground. The current in this circuit is insufficient to operate relay A, but if more than one of the relays TL0 . . . TL9 operate, the increased current through the winding of relay A operates said relay. Relay XTC then operates over a circuit extending from battery through the upper winding of said relay, conductor 311, No. 7 back contacts of relay TN8, and front contacts of relay A to ground, operating relay TKK over a circuit extending from battery through the upper winding of relay TKK, conductor 79 within bracket 284, No. 8 contacts of relay TCY, conductor 312, and front contacts of relay XTC to ground, to actuate the alarm, as previously mentioned.

If only one of relays TT0 . . . TT9 and one of relays TL0 . . . TL9 operate, relay UX4 operates over a circuit extending from battery through resistor R7, No. 5 front contacts of relay TVM, conductor 313 within bracket 270, No. 3 back contacts of relay TN7, conductor 314, No. 2 normal contacts of relays UX9 . . . UX4, lower winding of relay UX4, conductor 315, and No. 10 front contacts of relay TA0 to the above-traced ground on conductor 300 within bracket 299, and locks up over a circuit extending from battery through resistor R8, its own No. 2 front contacts and lower winding, thence over its operating path to ground, operating relay UA4 over an obvious circuit.

When relay UX4 operates, a circuit is completed from battery through resistor R22, No. 4 contacts of relay UX4, conductor 316, No. 4 back contacts of relay TN7, conductor 317 within bracket 265, No. 18 contacts of relay TCY, conductor 318 within bracket 180, No. 3 front contacts of relay LP, conductor 320 within bracket 321, and the winding of relay UMG to ground. The current in this circuit is insufficient to operate relay UMG, but if more than one of the relays UX0 . . . UX9 operates, the increased current through the winding of relay UMG operates said relay which operates relay XTU over an obvious circuit to actuate an alarm.

Upon the operation of relay UA4, relay UL operates over a circuit extending from battery through the upper winding of relay UX4, No. 5 contacts of relay UA4, conductor 322, No. 4 back contacts of relay TN8, conductor 323, the winding of relay UL, No. 7 contacts of relay ON, and No. 4 normal contacts of relay RD to ground.

By the operation of relays TT0 and UX4, the trunk is identified as the fifth trunk in the first group of ten or trunk No. 04. Relay IR of the transverter now operates over a circuit extending from battery through resistor R9, No. 6 contacts of relay UA4, conductor 325, No. 2 back contacts of relay TN7, conductor 326, No. 3 front contacts of relay TVM1, conductor 327, No. 17 contacts of relay TCY, conductor 328 within bracket 180, and the winding of relay IR to ground, as a signal that the trunk has been identified. Relay DTK of the recorder then operates over a circuit extending from battery in the trunk over conductor 330 within bracket 299, No. 15 contacts of relay TL0, conductor 331, No. 4 front contacts of relay UA4, conductor 332, No. 1 back contacts of relay TN2, conductor 333, No. 1 contacts of relay MBAR, conductor 334, No. 10 front contacts of relay TVM, conductor 335, lower winding of relay DTK, conductor 336, No. 4 contacts of relay DS, conductor 337, No. 11 contacts of relay ON, conductor 338, No. 10 contacts of relay TCY, conductor 340 within bracket 284, and No. 4 front contacts of relay IR to ground, operating relay DTKA over a circuit extending from battery through the winding of said relay, conductor 341, No. 4 back contacts of relay TPC, conductor 342, No. 6 contacts of relay TVM, conductor 343, left-hand contacts of relay DTK, conductor 344, No. 8 contacts of relay PTS, conductor 345, and back contacts of relay XTC to ground. Relay DTKA locks up through its No. 4 contacts, and No. 1 contacts of relay ON to ground. Relay RCK also operates over a circuit extending from battery in the trunk over conductor 346 within bracket 299, No. 5 contacts of relay TL0, conductor 347, No. 7 contacts of relay UA4, conductor 348, No. 6 contacts of relay TN4, conductor 350, No. 7 front contacts of relay TVM, the windings of relay RCK in series, and No. 1 contacts of relay DTKA to ground, as a check of the continuity of the conductor to the trunk.

*Recording initial entry*

When relay TP0 operates, as described above, the polarized relay PT0 is caused to close its right-hand contacts (if not already closed) by battery through the lower winding of relay PT0, conductor 360, and No. 4 contacts of relay TP0 to ground. Then, assuming that relay 4L is operated for a four-line entry, relays P4 and P4K operate in multiple over a circuit extending from battery through the lower winding of relay P4 and from battery through the winding of relay P4K over conductor 361, No. 2 back contacts of relay P4A, conductor 362 within bracket 143, contacts of relay SCK, conductor 363 within bracket 143, No. 4 contacts of relay 4L, conductor 364, No. 3 contacts of relay TE, conductor 365, No. 3 contacts of relay RTR, conductor 366 within bracket 321, No. 3 contacts of relay CT2, conductor 367 within bracket 308, No. 14 contacts of relay TCY, conductor 368, No. 8 contacts of relay TVM, conductor 370, No. 6 back contacts of relay PTC, conductor 371, No. 5 contacts of relay PR1, conductor 372, No. 1 back contacts of relay PA, conductor 373, and right-hand contacts of relay PT0 to ground. Should one of the relays P1K . . . P3K, for example relay P3K also operate in error, relay X2P operates over a circuit extending from battery through the winding of said relay, No. 4 front contacts of relay P3K and No. 3 front contacts of relay P4K to ground, grounding, through its No. 3 contacts, conductor 132 to operate relay AL which actuates an alarm. Relay P4 when operated, locks up over a circuit from battery through its upper winding and No. 2 contacts, conductor 374, and No. 5 contacts of relay CK7 to ground.

Relays C4A, C4B, and C4C then operate over a circuit extending from battery through the windings of said relays in parallel, conductor 375, No. 2 contacts of relay CR, conductor 376 within bracket 377, No. 4 contacts of relay P4K, conductor 378, No. 2 contacts of relay P4, conductor 374, and No. 5 contacts of relay CK7 to ground, and lock up around the contacts of relay P4K from conductor 376, through No. 11 contacts of relay C4B to the ground on conductor 378. Relay PTC then operates over a circuit extending from battery through the lower winding of said relay, conductor 380, No. 24 contacts of relay TCY, conductor 381 within bracket 382, No. 12 contacts of relay C4A, conductor 383, No. 8 contacts of relay C4B, conductor 384, and No. 12 contacts of relay C4C to ground. Relays C4A, C4B and C4C make the appropriate connections to the punch magnets of the recorder to record the first line of the entry. When relay C4B operates, punch magnet AM0 operates over a circuit extending from battery through the winding of said magnet, winding of relay A0, conductor 400, No. 25 contacts of relay TCY, conductor 401 within bracket 402, and No. 9 contacts of relay C4B to ground to record the digit "0" as the first digit of the line. Punch magnets FM0 . . . FM7 are connected through the windings of their associated relays F0 . . . F7, respectively, the group of conductors in the group G57, No. 48 . . . No. 52 contacts of relay TCY, conductors in the group G58 within bracket 403, No. 2 . . . No. 6 contacts of relay C4C, conductors in the group G59 within bracket 404, No. 7 . . . No. 11 contacts of relay L1A, conductors in the group G60 within bracket 123, No. 31 . . . No. 35 contacts of relay TVB, No. 31 . . . No. 35 contacts of relay SB, and conductors in the group G61 within bracket 99 to contacts of relays F0 . . . F7 in the aforementioned Busch application of the outgoing sender which register the stations digit of the called station, as described in the before-mentioned patent to A. J. Busch. Punch magnets in the group FM0 . . . FM7 are thereby operated to record the stations digit registered in the outgoing sender as the last digit of the line. Similarly, punch magnets in the groups BM0 . . . BM7, CM0 . . . CM7, DM0 . . . DM7, and EM0 . . . EM7 (not shown) are connected, through the windings of their respective relays B0 . . . B7, C0 . . . C7, D0 . . . D7 and E0 . . . E7 (not shown) over similar circuits to contacts of the corresponding relays of the outgoing sender which register (as described in the above-mentioned patent to A. J. Busch) the number of the called station, and combinations of these punch magnets are thereby operated to record the registered number of the called station. Relay A0 and relays in the groups B0 . . . B7, C0 . . . C7, D0 . . . D7, E0 . . . E7, and F0 . . . F7 operate in series with the punch magnets operated, and the operated punch magnets and relays lock up through the No. 1 contacts of said relays, and respective contacts of relays PR1 . . . PR3 to ground. The relays in series with the punch magnets are checking relays to check that the proper number of punch magnets is operated. Contacts of these relays are so arranged that, if one and only one of the relays A0, A1 and A2 and two and only two of the relays in each of the groups B0 . . . B7, C0 . . . C7, D0 . . . D7, E0 . . . E7 and F0 . . . F7 are operated, a circuit is closed for the operation of relay CK. This circuit extends from battery through the winding of said relay, No. 4 back contacts of relay TBL1, conductor 405, No. 1 contacts of relay PTS, conductor 406, No. 5 back contacts of relay Z2, No. 3 contacts of relay W2, No. 2 back contacts of relay KD (or No. 5 front contacts of relay Z2, and No. 2 front contacts of relay KD, relay W2 being operated when relays Z2 and KD are not operated and relay W2 not being operated when relays Z2 and KD are operated, as described later), conductor 407, No. 2 contacts of relays A0, A1, and A2, conductor 408, No. 1 back contacts of relay OTO, conductor 410, No. 2 contacts of relays B0 . . . B7, C0 . . . C7, D0 . . . D7, E0 . . . E7 and F0 . . . F7, conductor 411, No. 3 front contacts of relay PTC, conductor 412, and the lowest contacts of any operated checking relay to ground. Operation of relay CK over this circuit checks that the proper number of punch magnets are energized and, as will be shown later, that the paper drum of the recorder has advanced from its position when recording the previous line.

When relay CK operates, relay PTC is locked up by battery through its upper winding and No. 1 contacts, and No. 2 contacts of relay CK to ground. Upon the operation of relay PTC, the paper-advance magnet PAM of the recorder and relay PA operate over a circuit extending from battery through the winding of magnet PAM, conductor 413, the winding of relay PA, No. 5 front contacts of relay PTC, conductor 414, and No. 9 contacts of relay ON to ground. Magnet PAM does not advance the paper of the recorder upon operation but only upon release after operation. Operation of relay PTC opens the short circuit around capacitor C2 which then charges from battery through resistor R10 and the upper winding of relay PT0, and to ground through resistor R11. The charging current through the upper winding of relay PT0 holds closed, for a time, the right-hand contacts of said relay, but as capacitor C2 charges, the charging current decreases and the left-hand contacts of said relay are closed by battery through the lower winding of said relay, conductor 360, and No. 9 contacts of relay ON to ground. A circuit is thereby completed from battery through the windings of relays PR1, PR2 and PR3 in parallel, conductor 415, No. 2 contacts of relay PA, No. 4 contacts of relay CK, No. 7 contacts of relay PTC, conductor 416, and the left-hand contacts of relay PT0 to ground, over which relays PR1, PR2, and PR3 operate, opening the locking circuits of and releasing the operated punch magnets and their associated relays. The delayed operation of relay PT0 due to the charging of capacitor C2 gives time for the operation of the punch magnets and their associated relays.

When relay PTC operates, as described above, the circuit of relay P4K is thereby opened and the latter relay released. Relay P4A then operates over a circuit extending from battery through the lower winding of said relay, conductor 417 within bracket 377, No. 12 contacts of relay C4B, conductor 418 within bracket 420, No. 1 contacts of relay P4, conductor 421, No. 2 contacts of relay P4K, conductor 422, No. 1 back contacts of relay P3, conductor 423, No. 2 contacts of relay P3K, conductor 424, No. 1 back contacts of relay P2, conductor 425, No. 2 contacts of relay P2K, conductor 426, No. 1 back contacts of relay P1, conductor 427, No. 2 contacts of relay P1K, No. 1 contacts of relay X2P, conductor 428 within bracket 175, No. 1 contacts of relay X, conductor 430 within bracket 175, No. 2 back contacts of relay TE1, conductor 431 within bracket 108, contacts of relay OP1, conductor 432 within bracket 108, No. 7 contacts of relay CK7, conductor 433 within bracket 180, No. 22 contacts of relay TCY, conductor 434, No. 7 contacts of relay PR2, conductor 435, No. 9 contacts of relay TBL1, conductor 146, and left-hand contacts of relay PTO to ground and locks up over a circuit from battery through its upper winding and No. 3 contacts, conductor 436, and No. 6 contacts of relay CK7 to ground. Relay CR operates over a circuit extending from battery through the winding of said relay, No. 10 contact of relay C4B, conductor 437 within bracket 377, No. 3 contacts of relay P4A, conductor 436, and No. 6 contacts of relay CK7 to ground, opening the circuit of and releasing relays C4A, C4B and C4C. Relay C4B, in releasing, releases relay CR.

The release of the operated checking relays associated with the operated punch magnets opens the circuit of and releases relay CK, which releases relays PTC and PA and the paper-advance magnet PAM. In releasing, magnet PAM moves the paper tape of the recorder to a position for recording another line. By the release of relay PTC, capacitor C2 is again short-circuited and discharged and relay PT0 again closes its right-hand contacts. The circuits are now ready for recording the next line.

*Subsequent lines of the entry*

Subsequent lines of the entry are recorded in a manner similar to that already described for the first line.

For the second line of the entry, relays P3 and P3K operate and cause the operation of relays C3A, C3B and C3C in a manner similar to that described above for relays P4, P4K, C4A, C4B and C4C. Relay C3A connects punch magnets of the recorder for the second or "B" digit to contacts of relay L1E and punch magnets for the third or "C" digit to contacts of a relay not shown to record two arbitrary digits indicating the numbering plan of the called station. Relays C3B and C3C connect punch magnets for the "D," "E," and "F" digits to contacts of relay L1D and L1C to record the office of the called line as registered by said latter relays. Punch magnet AM0 is again operated in the manner previously described to record "0" for the first or "A" digit. Operations subsequent to recording are repeated, as described for the first line, the recorder tape being thereby advanced to a position for recording the next line.

Relays P2, P2K, C2A, C2B and C2C similarly operate for the third line. Relay C2A connects punch magnet of the recorder for the "B" digit to contacts of relays OFF0 . . . OFF4 to record the office number of the calling line registered by the latter relays. Relays C2A, C2B and C2C connect punch magnets of the recorder for the "C," "D," "E" and "F" digits to contacts of relays TH0 . . . TH9, . . . HN0 . . . HN9, TT0 . . . TT9, and U0 . . . U9 to record the thousands, hundreds, tens and units digits, respectively, of the number of the calling line registered by the latter relays. Punch magnet AM0 is again operated to record "0" for the first digit of the line.

For the last line of the entry, relays P1, P1K, C1A and C1B operate. Relay C1A connects punch magnets of the recorder for the "B" digit to contacts of relays NOB, OBS, 4L and 2L to record the digit "3" for a non-observed call or the digit "4" for an observed call. If relay OBS is operated, punch magnet BM0 (not shown) operates over conductor 440, No. 28 contacts of relay TCY, conductor 441 within bracket 442, No. 10 contacts of relay C1A, conductor 443 within bracket 444, and No. 6 contacts of relay OBS to ground and punch magnet BM4 (not shown) operates over conductor 445, No. 31 contacts of relay TCY, conductor 446 within bracket 442, No. 7 contacts of relay C1A, conductor 447 within bracket 444, and No. 5 contacts of relay OBS to ground, recording the digit "4." If relay NOB is operated, punch magnet BM1 (not shown) operates over conductor 450, No. 29 contacts of relay TCY, conductor 451 within bracket 442, No. 9 contacts of relay C1A, conductor 452 within bracket 444, No. 7 contacts of relay 4L, and No. 5 contacts of relay NOB to ground, and punch magnet BM2 (not shown) operates over conductor 453, No. 30 contacts of relay TCY, conductor 454 within bracket 442, No. 8 contacts of relay C1A, conductor 455 within bracket 444, No. 8 contacts of relay 4L, and No. 6 contacts of relay NOB to ground. Relay C1A also connects punch magnets of the recorder for the "C" digit to contacts of relays MB0 . . . MB7 to record the message-index digit registered by said latter relays. Punch magnet DM4 (not shown) operates over conductor 456, No. 41 contacts of relay TCY, conductor 457 within bracket 458, and No. 3 contacts of relay C1B to ground and punch magnet DM7 (not shown) operates over conductor 460, No. 42 contacts of relay TCY, conductor 461 within bracket 458, and No. 2 contacts of relay C1B to ground to record "0" for the "D" digit.

Relay DTN operates over a circuit extending from battery through the winding of said relay, conductor 462, No. 2 contacts of relay DTKA, No. 1 contacts of relay TVM1, conductor 463, No. 4 back contacts of relay OTO, right-hand contacts of relay OTK, conductor 464, No. 13 contacts of relay TCY, conductor 465 within bracket 308, No. 3 contacts of relay XTU, conductor 466 within bracket 467, No. 1 contacts of relay C1A, No. 4 contacts of relay CR, conductor 468 within bracket 470, No. 4 contacts of relay P1K, conductor 471, No. 2 contacts of relay IR, conductor 472, No. 2 contacts of relay P1 and thence over the locking circuit of relay P1 to ground.

Punch magnet EM4 (not shown) operates over conductor 473, No. 5 contacts of relay DTN, conductor 474 within bracket 475, No. 6 back contacts of relay TN2, conductor 476, and No. 1 contacts of relay TA0 to ground. Punch magnet EM7 (not shown) operates over conductor 477, No. 6 contacts of relay DTN, conductor 478 within bracket 475, No. 1 back contacts of relay TN3, conductor 480, and No. 4 contacts of relay TA0 to ground. These two punch magnets record the digit "0" as the tens digit of the trunk number. Punch magnet FM0 operates over a circuit extending from battery through the winding of said magnet, the winding of relay F0, conductor 481, No. 7 contacts of relay DTN, conductor 482 within bracket 475, No. 2 back contacts of relay TN3, conductor 483, and No. 2 contacts of relay UA4 to ground. Punch magnet FM4 operates over a circuit extending from battery through the winding of said magnet, the winding of relay F4, conductor 483, No. 10 contacts of relay DTN, conductor 484 within bracket 475, No. 5 back contacts of relay TN3, conductor 485, and No. 3 contacts of relay UA4 to ground. These two punch magnets record the digit "4" as the units digit of the trunk number. This completes the entry.

*Paper-advance check*

Magnet PAC, when energized, draws its armature against a portion of the drum of the recorder when there is a depression at every other line-position of the drum. If a depression is encountered, the contacts of said armature close. Each time that relays operate to connect punch magnets for recording, magnet PAC is energized. For example, when relays C3A, C3B, and C3C operate for recording the second line of a four-line entry as described above, magnet PAC is energized over a circuit extending from battery through the winding of said magnet, No. 6 contacts of relay PR1, conductor 380, No. 24 contacts of relay TCY, conductor 381 within bracket 382, No. 12 contacts of relay C3A, conductor 490, No. 8 contacts of relay C3B, conductor 491, and No. 12 contacts of relay C3C to ground. The first time magnet PAC is energized, the drum of the recorder should be in such a position that the armature of magnet PAC does not encounter a depression in said drum and, therefore, does not close its contacts. When relay PA then operates, relay W2 operates over a circuit extending from battery through the winding of said relay, No. 2 normal contacts of relay Z2, No. 2 contacts of relay ZD, conductor 492, and No. 3 front contacts of relay PA to ground and locks up through its No. 1 contacts to ground. The circuit of relay CK, which was traced above, is thereby completed through No. 5 back contacts of relay Z2, No. 3 contacts of relay W2, and No. 2 back contacts of relay KD. When relay PA releases, relay Z2 operates over a circuit extending from battery through the winding and No. 1 normal contacts of said relay, No. 2 contacts of relay W2, conductor 493, and No. 3 back contacts of relay PA to ground and locks up through its No. 1 front contacts, resistor R18, No. 2 contacts of relay ZD, and No. 1 contacts of relay W2 to ground. Relay W2 is now locked up through No. 2 front contacts of relay Z2, No. 2 contacts of relay W2, conductor 493, and No. 3 back contacts of relay PA to ground.

Upon the release of relay PA and the paper-advance magnet PAM in series therewith, the recorder drum should advance and when magnet PAC is again energized, its armature should encounter a depression in said drum and close its contacts. Relay KD then operates over a circuit extending from battery through the winding of said relay, conductor 494, and the contacts of magnet PAC to ground and locks up through its No. 1 contacts over the operating path of relay PA to ground. The operation of relay PA opens the locking path of relay W2, which is thereby released. The circuit of relay CK is now completed through No. 5 front contacts of relay Z2, and No. 2 front contacts of relay KD. When relay PA releases, relays KD and Z2 release, restoring the circuits to their original condition and the operations described above are repeated for succeeding lines recorded.

If, however, when magnet PAC is energized for the second time, as described above, the recorder drum has not turned from its original position, the armature of said magnet will not encounter a depression in said drum and will not close its contacts. Relay Z2 being operated, the circuit of relay CK will not then be completed. Failure of relay CK to operate causes the operation of relay TBL1, causing the making of a trouble record, as described later. If the recorder drum has failed to advance when relays KD, W2, and Z2 are all normal, the armature of magnet PAC when energized, encounters a depression and closes its contacts. Relay KD then operates, as described above, and relay Z2 not being operated, the circuit of relay CK is not completed, resulting in the operation of relay TBL1 and the making of a trouble record.

After such a trouble record is made, relay TEY operates, as described later. If the trouble occurs with relays W2 and Z2 operated and relay KD not operated, relay ZD operates over a circuit extending from battery through the winding of said relay, No. 3 front contacts of relay Z2, No. 3 back contacts of relay KD, conductor 495, No. 3 normal contacts of relay TPC, conductor 496, and No. 2 front contacts of relay TEY to ground, and locks up through its No. 1 contacts, conductor 497, and No. 2 contacts of relay TBL1 to ground, opening the locking circuit of and releasing relay Z2. The circuit of relay CK is then completed through No. 5 back contacts of relay Z2 and No. 3 contacts of relay W2. This permits the recorder circuits to continue normal operation after the trouble record is made.

If the trouble occurs with relays KD and W2 operated and relay Z2 not operated, relay ZU operates over a circuit extending from battery through the winding of said relay, No. 4 back contacts of relay Z2, No. 3 front contacts of relay KD and thence over the circuit traced for relay ZD to ground and locks up through its No. 1 contacts, conductor 497, and No. 2 front contacts of relay TBL1 to ground, operating relay Z2 over a circuit extending from battery through the winding and No. 1 normal contacts of said relay, No. 2 contacts of relay W2, and No. 2 contacts of relay ZY to ground. The circuit of relay CK is then completed through No. 5 front contacts of relay Z2 and No. 2 front contacts of relay KD to allow the recorder to continue normal operation.

*Release of trunk identifier, transverter and recorder*

When relay P1A operates after the recording of the last line of the entry in the manner described above for relay P4A, relay P1B operates over a circuit extending from battery through the winding of said relay, conductor 500 within bracket 377, and No. 2 contacts of relay P1A to ground. Relay DS then operates over a circuit extending from battery through the winding of said relay, conductor 501, No. 2 contacts of relay RCK, conductor 502, No. 9 contacts of relay TCY, conductor 503 within bracket 402, No. 3 contacts of relay P1B, conductor 504 within bracket 377, No. 5 contacts of relay TE1, conductor 505 within bracket 506, and No. 2 contacts of relay TEP to ground and locks up around the contacts of relay RCK through its No. 1 contacts. Relay DS, at its No. 4 contacts, opens the circuit of the lower winding of relay DTK and, at its No. 3 contacts, grounds the upper winding of the latter relay. When the talking charge relay of the trunk operates, as described in the aforementioned patent to A. J. Busch, the circuits of relays DTK and RCK are thereby opened and said relays released, closing a circuit from battery through the winding of relay RD, conductor 507, No. 1 contacts of relay RCK, conductor 508, No. 6 contacts of relay DS, conductor 510, No. 3 contacts of relay DTKA, conductor 511, right-hand contacts of relay DTK, conductor 344, No. 8 contacts of relay PTS, conductor 345, and back contacts of relay XTC to ground, over which relay RD operates locking up through its No. 9 contacts, conductor 275, No. 1 contacts of relay ON1, conductor 512, No. 1 back contacts of relay TN7, conductor 513, and No. 2 contacts of relay TA0 to ground. Relay RD opens the circuits of and releases the operated relays of the trunk identifier, releasing, in turn, relay IR of the transverter. Relay RL of the transverter then operates over a circuit extending from battery through the winding of said relay, No. 3 contacts of relay XRL, conductor 514 within brackets 515, and 506, No. 6 contacts of relay TRZ, No. 3 back contacts of relay TRV, conductor 516, No. 5 contacts of relay TVT3, No. 6 contacts of relay TVT1, conductor 437 within bracket 198, No. 3 back contacts of relay TRS1, No. 6 contacts of relay P5, No. 1 back contacts of relay IR, conductor 517 within bracket 177, No. 4 contacts of relay XTK, conductor 518 within bracket 177, and back contacts of relay TKK, to ground. Relay RL opens the circuit of and releases the preference relay TP0 which, in turn, releases the connector relay TCY. The operated relays of the recorder circuit are thereby released, relay ON1 being the last to release, which restores the recorder to normal.

A false ground on the operating path of relay RL will operate said relay, releasing the recorder prematurely. Should that occur, relay XRL operates over a circuit extending from battery through the upper winding of said relay, conductor 520, No. 3 contacts of relay TBC3, conductor 521, and No. 3 front contacts of relay RL to ground and locks up through its lower winding and No. 4 contacts, conductor 170 within bracket 171, No. 1 contacts of relay TRB, conductor 522 within bracket 523, and No. 2 normal contacts of relay TM3 to ground. Relay XRL opens the circuit of and releases relay RL and actuates an alarm.

When relay RL operates, ground is connected through No. 3 contacts of said relay, conductor 521 within bracket 177 and No. 5 contacts of relay SC to conductor 524 within bracket 99 to the outgoing sender, which causes said sender to remove ground from conductors 50 and 51 within bracket 99. Relay SS1, SA, SB and SC are thereby released, releasing in turn relays TVA, TVB and TVC. The transverter is thereby disconnected from the sender and restored to normal.

*Two-line entry*

If relay 2L of the transverter operates in the manner previously described when the transverter is connected to an outgoing sender, a two-line entry is thereby indicated. Relay TVB does not then operate, as previously mentioned. The operation of the transverter is then similar to that already described for a four-line entry but relay TVB, not being operated, the information in regard to the called station is not registered in the transverter. The translator is selected and the directory number of the calling station obtained in the same manner as described above for the four-line entry. The recorder is also selected and connected to the transverter as previously described. However, when relay TP0 operates, relays P2 and P2K operate instead of relays P4 and P4K, over a circuit extending from battery through the lower winding of relay P2 and from battery through the winding of relay P2K over conductor 524, No. 3 back contacts of relay P2A, conductor 525, No. 3 contacts of relay 2L, and thence over the circuit previously traced for the operation of relays P4 and P4K to ground. It will be remembered that relays P2 and P2K controlled the recording of the third line of the four-line entry. The first line now recorded for the two-line entry is therefore similar to the third line of the four-line entry. When this line has been recorded in the manner described for the four-line entry, relays P1 and P1K operate as previously described and cause recording of the last line of the two-line entry similar to the last line of the four-line entry. However, for the second digit of this line, punch magnet BM0 (not shown) operates over conductor 440, No. 28 contacts of relay TCY, conductor 441 within bracket 442, No. 10 contacts of relay C1A, conductor 443 within bracket 444, and No. 7 contacts of relay 2L to ground, while punch magnet BM1 (not shown) operates over conductor 450, No. 29 contacts of relay TCY, conductor 451 within bracket 442, No. 9 contacts of relay C1A, conductor 452 within bracket 444, and No. 6 contacts of relay 2L to ground. These magnets record the digit "1" as the second digit of the line.

The release of the trunk identifier, transverter, and recorder takes place as previously described for the four-line entry.

*Recording time of answer*

When a called party answers a call, the charge relay of the trunk over which the call is made operates in the usual manner and closes a circuit for the operation of one of the relays TT0 . . . TT9 of the trunk identifier. Assuming, as before, that the trunk involved in the call is trunk 04, relay TT0 operates over the circuit previously traced to conductor 300 within bracket 299; thence through the trunk and over conductor 530 within bracket 299, No. 3 back contacts of relay TN2, conductor 531, No. 2 contacts of relay CHB, conductor 272, No. 10 contacts of relay PTS, conductor 271, No. 6 contacts of relay R, No. 6 contacts of relay MBA, and No. 10 normal contacts of relay MBAR to ground. This assumes that the trunk identifier is not in use.

If the trunk identifier is in use, relay CHB is operated, as previously described, and the recording of the answer entry awaits the release of said relay. Upon the operation of relay TT0, the trunk is identified, in the manner already described, by the operation of relays TT0, TL0, TA0, UX4 and UA4.

Relay IP of the recorder then operates over a circuit extending from battery through resistor R9, No. 6 contacts of relay UA4, conductor 325, No. 2 back contacts of relay TN7, conductor 326, No. 3 back contacts of relay TVM1, conductor 532, and the winding of relay IP to ground. It should be observed that relay IP, in operating, opens the operating circuits of relays TP0 . . . TPX, which are used, as previously described, for connecting the recorder to record initial entries, of relay HP, which is used as described later, for recording hour entries, and of relay MTP, which is used for connecting the recorder to the master timing circuit. None of these relays may, therefore, operate after relay IP operates. But relay IP cannot operate if relay TVM1 is operated, which is the case when the recorder is recording an initial entry. A recorder in use is therefore protected against interference, and an order of preference is established for the various types of entry by the arrangement of relays TP0—TPX, IP, HP, and MTP, should the recorder be in demand for two types of entry at the same time.

Relay IP, in operating, closes a circuit from battery through the winding of relay IPA, conductor 533, No. 8 contacts of relay ON1, No. 1 front contacts of relay IP, and No. 1 back contacts of relays HP, TPX—TP0, and MTP to ground and locks up through its No. 1 contacts, conductor 534, No. 2 contacts of relay RD, conductor 535, No. 1 front contacts of relay IP, and No. 1 back contacts of relays HP, TPX—TP0, and MTP to ground. Relay ON operates over a circuit extending from battery through the winding of said relay, conductor 536, No. 8 contacts of relay TBL1, conductor 537, and No. 11 contacts of relay IPA to ground. The polarized relay OTK operates to close its left-hand contacts over a circuit extending from battery in the trunk over conductor 330 within bracket 299, No. 15 contacts of relay TL0, conductor 331, No. 8 contacts of relay UA4, conductor 538, No. 6 back contacts of relay TN7, conductor 540, No. 5 contacts of relay DS, conductor 541, the winding of relay OTK, conductor 542, No. 9 contacts of relay HPA, resistor R17, conductor 543, No. 8 contacts of relay ON, and No. 4 normal contacts of relay RD to ground to check the continuity of conductor 330. Relay DTK then operates from battery in the trunk on conductor 346 within bracket 299, No. 5 contacts of relay TL0, conductor 347, No. 7 contacts of relay UA4, conductor 348, No. 6 back contacts of relay TN4, conductor 350, No. 7 back contacts of relay TVM, conductor 544, No. 12 contacts of relay IPA, conductor 335, lower winding of relay DTK, conductor 336, No. 4 contacts of relay DS, conductor 337, and No. 8 contacts of relay IPA to ground, completing a circuit from battery through the winding of relay DTKA, conductor 341, No. 4 back contacts of relay TPC, conductor 342, No. 5 contacts of relay OTO, left-hand contacts of relay OTK, No. 5 contacts of relay IPA, conductor 343, left-hand contacts of relay DTK, conductor 344, No. 8 contact of relay PTS, conductor 345, and back contacts of relay XTC to ground, over which relay DTKA operates and locks up through its No. 4 contacts, and No. 1 contacts of relay ON to ground. Relay UL operates over a circuit extending from battery through the upper winding of relay UX4, No. 5 contacts of relay UA4, conductor 322, No. 4 back contacts of relay TN8, conductor 323, winding of relay UL, No. 7 contacts of relay ON, and No. 4 normal contacts of relay RD to ground.

Relays DTN and M now operate in parallel over a circuit extending from battery through the winding of relay M, conductor 546, No. 3 contacts of relay IPA and from battery through the winding of relay DTN, thence over conductor 462, No. 2 contacts of relay DTKA, contacts of relay UL, conductor 547, No. 2 contacts of relay IPA, conductor 548, No. 1 contacts of relay LC, conductor 550, and No. 2 contacts of relay C1 to ground. Punch magnet AM1 (and relay A1) operates over a circuit extending from battery through the winding of said magnet, the winding of relay A1, conductor 551, and No. 9 contacts of relay M to ground. This records "1" for the first digit of the line of the entry.

Operation of relay M grounds the switch arms of the No. 4 and No. 5 arcs of the rotary switches HS, TS, and US. The terminals of these arcs are connected to punch magnets of the groups BM0—BM7, CM0—CM7, and DM0—DM7. The switch arms are continually set to the current time by a clock mechanism in the master timing circuit, switch HS indicating the hundreds digit, switch TS the tens digit, and switch US the units digits of the number of six-second periods elapsed since the beginning of the current hour. When relay M operates, therefore, punch magnets of the groupns BM0—BM7, CM0—CM7, and DM0—DM7 are thereby operated to record the current period as indicated by said switches.

Relay DTN connects punch magnets in the groups EM0—EM7, and FM0—FM7 to the relays of the trunk identifier to record the trunk number, as already described. This completes the entry.

The paper-advance magnet PAM operates and releases to advance the recorder tape in the manner already described for the initial entries. When relays PT0 and PR2 have operated, as previously described, relay LC operates over a circuit extending from battery through the winding of said relay, conductor 552, No. 10 contacts of relay IPA, conductor 553, No. 1 contacts of relay TVM, conductor 554, No. 2 contacts of relay PTC, conductor 434, No. 7 contacts of relay PR2, conductor 435, and left-hand contacts of relay PT0 to ground, and locks up from conductor 553 through its No. 6 front contacts to ground, opening the circuit of and releasing relay DTN and M. Relay LC also connects ground through its No. 5 contacts and conductor to the upper winding of relay DTK. This winding has a low resistance, and the resistance of relay DTK is thereby so reduced that a relay in the trunk in the operating path of relay DTK is released, removing ground from conductor 300 within bracket 299, thus releasing relay DTK. Relay DS operates over the circuit previously traced for the operation of said relay, and relay RD then operates over a circuit extending from battery through the winding of said relay, No. 1 contacts of relay RCK, conductor 508, No. 6 contacts of relay DS, conductor 510, No. 3 contacts of relay DTKA, conductor 511, right-hand contacts of relay DTK, conductor 344, No. 8 contacts of relay PTS, conductor 345, and back contacts of relay XTC to ground, releasing relay TT0 and, in turn, the operated relays of the trunk identifier and the recorder, which is now free to be used in connection with other entries.

*Recording time of disconnect*

When disconnection takes place, ground is again connected by the trunk to conductor 300 within bracket 299 and the operations described for recording the time of answer are repeated, recording a similar entry, the current time recorded therein being, however, the time of disconnection. If, however, disconnection is not caused by the calling party but is due to time-out of the trunk, ground is connected by the trunk to conductor 558 within bracket 299. Relay OTO then operates over a circuit extending from battery through the winding of said relay, conductor 556, No. 9 contacts of relay HPA, conductor 542, the winding of relay OTK, conductor 541, No. 5 contacts of relay DS, conductor 540, No. 6 back contacts of relay TN7, conductor 538, No. 8 contacts of relay UA4, conductor 557, and No. 25 contacts of relay TL0 to said ground on conductor 558. Punch magnet AM0 then operates over a circuit extending from battery through the winding of said magnet, the winding of relay A0, conductor 400, No. 4 contacts of relay M, conductor 560, and No. 2 contacts of relay OTO to ground. Punch magnet AM2 operates over a similar parallel circuit. The three operated punch magnets AM0, AM1 and AM2 make three depressions in the recorder tape which do not represent a digit but indicate that disconnection took place as a result of time-out, so that, in computing the charge for the call, the time-out period may be deducted from the elapsed conversation time. It will be remembered that relay CK operates in a checking circuit which extends through contacts of all the relays associated with the punch magnets and that said circuit is normally closed only if one and only one of the relays A0, A1 and A2 is operated. The checking circuit normally extends through No. 1 back contacts of relay OTO, No. 2 contacts of relays A1 and A2, and No. 1 contacts of relay A0. Now, however, it extends through No. 1 front contacts of relay OTO, No. 3 contacts of relays A1 and A2, and No. 1 contacts of relay A0 and is closed when all of relays A0, A1, and A2 are operated.

*Recording hour entry*

Every hour on the hour, the master timing circuit grounds conductor 561 to the recorder, operating relay C which locks up through its No. 5 and No. 4 contacts and No. 2 contacts of relay C1 to ground. Relay C causes the time-indicating switches HS, TS, and US to advance. When the switches are set to the hour, relay HSA operates over a circuit extending from battery through the winding of said relay, conductor 562, No. 5 back contacts of relay HPA, conductor 563, the No. 3 arc of switch US, the No. 1 arc of switch TS, the No. 3 arc of switch HS, No. 1 contacts of relay C, conductor 564, No. 1 contacts of relay RNT1, conductor 565 within bracket 566, and No. 4 normal contacts of relay NS to ground, and locks up through its No. 3 contacts, conductor 567, No. 5 back contacts of relay PTS, conductor 568, No. 2 back contacts of relay DS, and No. 9 normal contacts of relay TEX to ground. If the recorder is idle or when it becomes idle, relay HP operates over a circuit extending from battery through resistor R19, No. 5 contacts of relay HSA, conductor 570, winding of relay HP, and No. 3 contacts of relay IP to ground and locks up through its No. 3 front contacts to ground. Relays HPA then operates over a circuit extending from battery through the winding of said relay, conductor 571, No. 9 contacts of relay ON1, No. 1 front contacts of relay HP, and No. 1 back contacts of relays TPX—TP0, and MTP to ground and locks up through its No. 6 contacts, conductor 572, No. 3 contacts of relay RD, conductor 573, No. 1 front contacts of relay HP, and No. 1 back contacts of relays TPX—TP0, and MTP to ground, closing a circuit from battery through the winding of relay ON, conductor 536, and No. 3 contacts of relay HPA to ground over which relay ON operates, in turn operating relay ON1 as previously described.

Relays HR1 and HR2 operate over a circuit extending from battery through the windings of said relays in parallel, conductor 574, No. 10 back contacts of relay TPC, No. 1 contacts of relay HPA, conductor 575, No. 3 contacts of relay LC, and No. 1 contacts of relay ON to ground. Relay HR1 actuates punch magnets of the recorder for the A, B, C, and D digits to record the digits "2810." Punch magnet AM2 operates over a circuit extending from battery through the winding of said magnet, the winding of relay A2, conductor 576, and No. 9 contacts of relay HR1 to ground, and punch magnets BM1, BM7, CM0, CM1, DM4, and DM7 operate over similar circuits to record said digits. Relay HR2 connects punch magnets for the E and F digits to the master timing circuit to record in a similar manner the number of the current hour.

When relay CK operates in the manner previously described, relay HR3 operates over a circuit extending from battery through resistor R20, the winding of said relay, conductor 577, No. 3 front contacts of relay CK, conductor 578, and No. 8 contacts of relay HR1 (or No. 7 contacts of relay HR2) to ground, and locks up through its No. 2 front contacts to ground. This relay remains locked up during the hour until relay C again operates when relay HR3 is shunted down by a circuit extending from battery through resistor R20, No. 3 arc of switch HS, No. 1 arc of switch TS, No. 3 arc of switch HS, No. 1 contacts of relay C, conductor 564, No. 1 contacts of relay RNT1, conductor 565 within bracket 566, and No. 3 normal contacts of relay NS to ground.

The paper-advance magnet PAM, and relays PA, PT0, PR1, PR2, LC, DS, and RD operate, releasing the operated punch magnets and relays of the recorder (excepting relay HR3), as previously described. When the paper-advance magnet PAM releases, it advances the recorder tape to a position for recording another line.

*Trouble entries*

Provision is made, as previously mentioned, for recording special entries on the recorder tape if trouble is encountered in the operation of the recording circuits. On an initial entry, if relay CK fails to operate in the manner previously described when the timing relay PT0 closes its left-hand contacts, relay TBL1 operates over a circuit extending from battery through the winding of said relay, conductor 600, No. 5 contacts of relay ATS, conductor 601, No. 6 contacts of relay CK, conductor 602, No. 4 contacts of relay PR1, conductor 603, No. 7 contacts of relay PTC, conductor 416, and left-hand contacts of relay PT0 to ground, and locks up through its No. 1 contacts to the same ground on conductor 601. Relay TBL then operates over a circuit extending from battery through the winding of said relay, conductor 604 within bracket 180, No. 21 contacts of relay TCY, conductor 605, No. 9 front contacts of relay TBL1, conductor 416, and left-hand contacts of relay PT0 to ground. Relay TBL opens the circuit of and prevents the operation of relay LC, preventing the release of the recorder. Relay PTC is locked up over a circuit extending from battery through lower winding and No. 1 contacts of said relay, and No. 7 contacts of relay BL1 to ground. Relay TBL also closes a circuit extending from battery through the winding of relay TRZ, No. 2 contacts of relay TRV, conductor 606 within bracket 506, No. 1 back contacts of relay TE, and No. 2 contacts of relay TBL to ground over which relay TRZ operates, and locks up through its No. 5 contacts, No. 4 contacts of relay TEC, conductor 607 within bracket 108, and No. 4 contacts of relay CK7 to ground. Relay TRST then operates over an obvious circuit. As previously mentioned, relay TRZ actuates the master test frame to make a record of the trouble encountered. When this has been done, the master test frame grounds conductor 608, operating relay TRB which locks up through its No. 2 contacts and No. 2 contacts of relay TRST to ground. Relay TRBA operates over and obvious circuit extending from battery through the winding of said relay, No. 5 back contacts of relay TEP, conductor 610 within bracket 217, No. 5 front contacts of relay RKA, conductor 611 within bracket 217, No. 3 front contacts of relay TRZ, No. 1 contacts of relay TRBA, conductor 612 within bracket 506, No. 4 contacts of relay P5 or No. 2 contacts of relay TRS1, conductor 613 within bracket 506, and No. 4 front contacts of relay TRBA to ground. Relay TE operates over a circuit extending from battery through the winding of said relay, conductor 614, No. 5 back contacts of relay P1A, conductor 615, No. 1 front contact of LP, conductor 616 within bracket 175, No. 6 back contacts of relay XTK, conductor 619 within bracket 217, and No. 2 contacts of relay TEC to ground, and locks up through its No. 5 contacts and No. 1 front contacts of relay LP to the same ground. The No. 4 contacts of relay TE open the locking circuit of and release relay TRZ which releases relay TRST. By the operation of relay TE, a circuit is completed from battery through the winding of the paper-advance magnet PAM, conductor 413, the winding of relay PA, conductor 414, No. 15 contacts of relay TCY, conductor 617 within bracket 308, No. 5 contacts of relay CT2, conductor 618 within bracket 175, and No. 6 contacts of relay TE to ground over which said magnet and relay operate. The No. 4 contacts of relay TE complete a circuit for relay CK from conductor 184 through said contacts, conductor 620 within bracket 506, and No. 1 back contacts of relay TEP to ground. Relay CK, therefore, operates and causes the advance of the recorder tape, as previously described. Operation of relay CK opens the locking circuit of and releases relay TBL1 which, in turn, releases relay TBL. When relay CT2 operates in the manner previously described, the paper-advance magnet PAM is thereby released, advancing the tape of the recorder.

Relay TE1 then operates over a circuit extending from battery through the lower winding of said relay, No. 1 back contacts of relay TE1A, conductor 621, No. 2 contacts of relay TE, conductor 365, No. 3 contacts of relay RTR, conductor 366 within bracket 321, No. 3 contacts of relay CT2, conductor 367 within bracket 308, No. 14 contacts of relay TCY, conductor 368, No. 8 contacts of relay TVM, conductor 370, No. 6 back contacts of relay PTC, conductor 371, No. 5 contacts of relay PR1, conductor 372, No. 1 back contacts of relay PA, conductor 373, and right-hand contacts of relay PT0 to ground, and locks up through its upper winding and No. 3 contacts, conductor 374, and No. 5 contacts of relay CK7 to ground, operating relays TEA and TEB over a circuit extending from battery through the windings of said relays in parallel, conductor 622 within bracket 467, No. 1 back contacts of relay XTK, conductor 623 within bracket 175, No. 3 contacts of relay TE1A, No. 1 contacts of relay TE1, conductor 6, No. 8 contacts of relay CK7, conductor 250 within bracket 156, No. 2 contacts of relay DNK1, conductor 624 within bracket 625, and No. 5 contacts of relay TCY to ground.

Relays TEA and TEB ground the windings of punch magnets AM2, BM1, BM7, CM0, and CM7 to record the digits "287" as the first three digits of the line and of punch magnets FM4 and FM7 to record the digit "0" as the last digit of the line. These digits indicate that trouble occurred in recording the previous line of the record.

For the fourth digit of the line, the winding of punch magnet DM4 (not shown) is connected over conductor 456, No. 41 contacts of relay TCY, conductor 457 within bracket 458, No. 7 back contacts of relay P1B, No. 7 contacts of relay TEB to ground, and the winding of punch magnet DM7 is connected over conductor 460, No. 42 contacts of relay TCY, conductor 461 within bracket 458, No. 1 back contacts of relay P1B and No. 8 contacts of relay TEB to ground, if relay P1B is not operated, to record the digit "0." This will be the case when the trouble occurs on any line of the entry except the last. However, if the trouble occurs on the last line of the record, relay P1B is operated, as previously described. The windings of punch magnets DM0 and DM2 are then connected to ground through No. 1 and No. 7 front contacts of relay P1B and No. 7 and No. 8 contacts of relay TEB to record the digit "2."

The fifth digit recorded in the line will be the number of the line of the entry. For example, if the trouble occurs on the first line of a four-line entry, relays P2A and 2L are not operated. The winding of punch magnet EM0 is then grounded over conductor 626, No. 33 contacts of relay TCY, conductor 627 within brackets 403 and 628, No. 5 contacts of relay P2A, conductor 630 within bracket 377, No. 2 back contacts of relay P1B and No. 6 contacts of relay TEB to ground, and the winding of punch magnet EM1 is grounded over a similar circuit. These two punch magnets record the digit "1" as the fifth digit of the line.

However, if the trouble occurs on the first line of a two-line entry, relays 2L and P2A are operated. The winding of punch magnet EM0 is then grounded over conductor 626, No. 33 contacts of relay TCY, conductor 627 within brackets 403 and 628, No. 2 contacts of relay 2L, conductor 631, No. 2 contacts of relay P2A, conductor 630 within bracket 377, No. 2 back contacts of relay P1B, and No. 6 contacts of relay TEB to ground and the winding of punch magnet EM1 is similarly grounded, recording the digit "1."

When relays TEA and TEB operate, relay PTC operates over a circuit extending from battery through the lower winding of said relay, conductor 380, No. 24 contacts of relay TCY, conductor 381 within bracket 382, No. 5 contacts of relay TEA, conductor 632, and No. 5 contacts of relay TEB to ground. A normal number of punch magnets being operated, relay CK and relays PR1, PR2, and PR3 operate normally as previously described, opening the locking circuit of and releasing relay TBL1. Relay TE1A then operates over a circuit extending from battery through the lower winding of said relay, No. 2 front contacts of relay TE1, conductor 431 within bracket 108, contacts of relay PO1, conductor 432 within bracket 108, No. 7 contacts of relay CK7, conductor 433 within bracket 189, No. 22 contacts of relay TCY, conductor 434, No. 7 contacts of relay PR2, conductor 435, No. 9 back contacts of relay TBL1, conductor 416, and left-hand contacts of relay PT0 to ground, and locks up through its upper winding and No. 2 contacts, conductor 374, and No. 6 contacts of relay CK7 to ground. Relay TE1A opens the circuit of and releases relays TEA and TEB which release the operated punch magnets.

When relay PA thereupon releases, relay TRC operates over a circuit extending from battery through the winding and No. 3 normal contacts of said relay, No. 4 contacts of relay GT, conductor 73, No. 3 contacts of relay TVC, conductor 633 within bracket 290, No. 4 front contacts of relay 1TR, conductor 634, No. 1 back contacts of relay RTR, conductor 635 within bracket 177, No. 1 back contacts of relay TAL1, No. 4 back contacts of relay TM3, conductor 636 within bracket 321, No. 1 contacts of relay TBL, conductor 637, No. 1 front contacts of relay TE1A, conductor 621, No. 2 contacts of relay TE, conductor 365, No. 3 contacts of relay RTR, conductor 366 within bracket 321, No. 3 contacts of relay CT2, conductor 367 within bracket 308, No. 14 contacts of relay TC4, conductor 368, No. 8 contacts of relay TVM, conductor 370, No. 6 back contacts of relay PTC, conductor 371, No. 5 contacts of relay PR1, conductor 372, No. 1 back contacts of relay PA, conductor 373, and right-hand contacts of relay PT0 to ground. Relay TRC opens the circuit of and releases relay TS1 which, in turn, releases the connector relays TVA, TVB, and TVC, disconnecting the transverter from the outgoing sender.

*Second trial with new transverter*

When relay TR operates, as described above, its No. 2 contacts ground the winding of relay TRA. This relay does not operate, however, as its winding is short-circuited through its No. 3 back contacts and No. 4 contacts of relay GT by the ground on conductor 73. When relay TVC releases this short-circuit is opened and relay TRA operates over an obvious circuit. Relay TR, in operating, also opens the short-circuit around the winding of relay CB1, permitting said relay to operate. Operation of relay CB1 opens the locking circuit of relays CB2 . . . CBX and releases said relays. Conductor 50 within bracket 99 from the outgoing sender is now connected through No. 44 contacts of relay SA, conductor 56, No. 5 contacts of relay TC, No. 1 back contacts of relay Z, No. 2 back contacts of relay TRS, No. 1 contacts of relay TRA, conductor 57, No. 1 front contacts of relay CB1, and No. 1 back contacts of relay CB2 to the winding of relay TS2, associated with another transverter connector, which is thereby operated to connect the outgoing sender to another transverter for a second trial. Relay 2TR of said other transverter operates over the conductor of said other transverter corresponding to conductor 113 and the No. 34 contacts of the relay corresponding to relay TVA, conductor 114 (which is multiplied to said relay) and No. 2 front contacts of relay TRA to ground, indicating to said other transverter that the operation in which it is now involved is a second trial.

*Trouble on one-line entries*

On answer, disconnect, and hour entries, the transverter is not involved. However, failure of relay CK to operate causes the operation of relay TBL1, as previously described, which signals the master test frame to make a trouble record. The operations of the recorder on entries of this kind are also timed, as described below, and, if not completed within a normal time, the master test frame is called in to make a trouble record. In either case after a trouble record is made by the master test frame, a trouble record is also made on the tape of the recorder.

When relay ON operates, as previously described in connection with an entry of this type, relay TA operates over a circuit extending from battery through the winding of said relay, No. 6 back contacts of relay TB, conductor 640, No. 2 contacts of relay TVM, No. 5 contacts of relay ON, and No. 8 contacts of relay ATS to ground, and locks up through its No. 1 contacts and No. 5 contacts of relay TEX to the same ground. At its No. 2 contacts, relay TA opens the short circuit around capacitor C5 which then charges from battery through No. 4 contacts of relay TEX, No. 4 contacts of relay TA, resistor R27, upper winding of relay TNC and resistor R29, and to ground through resistor R26. The charging current through the upper winding of relay TMC holds the armature of said relay for a time on its right-hand contacts but as capacitor C5 charges, the charging current decreases and the armature of relay TMC is moved to its left-hand contacts by battery through the lower winding of said relay, resistor R27, and resistor R28 to ground. If relay ON has not by now released, relay TB operates over a circuit extending from battery through the winding of said relay, conductor 641, No. 1 contacts of relay TCX, conductor 642, No. 3 contacts of relay TA, and left-hand contacts of relay TMC, to the above-traced ground on conductor 640 and locks up through its No. 6 contacts to the same ground. Relay TB signals the master test frame to make a trouble record.

Capacitor C5 now discharges through resistor R29, the upper winding of relay TMC, resistor R27, No. 5 contacts of relay TB, conductor 643, and No. 3 contacts of relay TCX to ground. The discharge current holds the armature of relay TMC for a time on its left-hand contacts but as capacitor C5 discharges, the discharge current decreases and the armature of relay TMC is moved to the right-hand contacts by the current in the lower winding of said relay. Relay TCX then operates over a circuit extending from battery through the winding of said relay, No. 1 back contacts of relay TD, conductor 644, No. 9 contacts of relay TB, conductor 645, No. 1 contacts of relay XPA1, conductor 646, and right-hand contacts of relay TMC to the ground traced above on conductor 640, and locks up through its No. 2 contacts to the same ground. Capacitor C5 now recharges through the upper winding of relay TMC as described above, holding the armature of said relay for a time on its right-hand contacts. When the left-hand contacts of relay TMC close, as before, relay TD operates over a circuit extending from battery through the winding of said relay, No. 1 front contacts of relay TCX, conductor 642, No. 3 contacts of relay TA, and left-hand contacts of relay TMC to the ground on conductor 640 and locks up through its No. 2 contacts to the same ground. Capacitor C5 now discharges through the upper winding of relay TMC, conductor 647, and No. 3 contacts of relay TD to ground, holding the armature of relay TMC for a time on its left-hand contacts. As the discharge current decreases, however, the right-hand contacts of relay TMC close and relay TEX operates over a circuit extending from battery through the winding of said relay, conductor 648, No. 1 front contacts of relay TD, the locking circuit of relay TCX to ground, and locks up through its No. 5 front contacts to the ground on conductor 640. The successive operations of relay TMC allow time for the taking of the trouble record before the operation of relay TEX.

Relay TEX opens the locking circuit of and releases relay TA. When relay ON operates, as previously described, relay TF operates over a circuit extending from battery through the winding of said relay, No. 3 back contacts of relay TEX, conductor 650, and No. 10 contacts of relay ON to ground. Operation of relay TEX opens this circuit and releases relay TF which is slow to release. When this relay releases, relay RD operates over a circuit extending from battery through the winding of said relay, conductor 587, contacts of relay TF, No. 3 front contacts of relay TEX, conductor 650, and No. 10 contacts of relay ON to ground, and locks up through its No. 9 contacts, conductor 275, and No. 9 front contacts of relay TEX to ground. Relay RD opens the locking circuit of and releases relay IPA (when the trouble occurs in an answer or a disconnect entry). Relay TEY then operates over a circuit extending from battery through the winding of said relay, conductor 651, No. 5 back contacts of relay TPC, conductor 652, No. 6 contacts of relay IPA, conductor 653, No. 2 contacts of relay HPA, conductor 654, No. 5 contacts of relay TBL1, conductor 655, and No. 7 contacts of relay TEX to ground, and locks up through its No. 4 contacts, conductor 656, and No. 6 contacts of relay PTS to ground. Relay TEY completes a circuit for relay CK from conductor 496 through No. 2 front contacts of relay TEY to ground. Relay CK operates and causes the release of the punch magnet and the advance of the recorder tape in the manner previously described. Relay ON is thereby released, releasing relays TBL1, PTC, TEX, TB, TEC, TD, RD, and ON1. Relay PTS is, however, locked up over a circuit extending from battery through the winding and No. 5 front contacts of said relay, conductor 568, No. 2 back contacts of relay DS and No. 9 normal contacts of relay TEX, holding relay TEY operated and also holding operated relay IP to maintain the recorder in busy condition.

Relay TPC now operates over a circuit extending from battery through the winding of said relay, conductor 657, No. 1 contacts of relay TEX, No. 5 contacts of relay TEY, conductor 658, No. 2 contacts of relay LC, conductor 370, No. 6 back contacts of relay PTC, conductor 371, No. 5 contacts of relay PR1, conductor 372, No. 1 back contacts of relay PA, conductor 373, and right-hand contacts of relay PT0 to ground. Relays IPA, ON, and ON1 reoperate and relay ADT operates over a circuit extending from battery through the winding of said relay, conductor 660, No. 2 contacts of relay PTS, No. 5 back contacts of relay TCZ, No. 7 contacts of relay TPC, conductor 661, No. 9 contacts of relay IPA, conductor 575, No. 3 contacts of relay LC, and No. 1 contacts of relay ON to ground. Relay ADT grounds the windings of punch magnets of the recorder to record the digits "287110" on a line of the recorder tape to indicate that trouble was encountered in the recording of the previous line. The operation and release of the recorder is as previously described.

In the case of trouble in recording an hour entry, the operations are similar to those described above. However, relay HRT operates in place of relay ADT and operates punch magnets to record the digits "281899."

The invention has been described above in a particular embodiment thereof and as applied to a particular telephone system. It will be evident, however, to one skilled in the art that it is not limited to the particular embodiment disclosed nor to the particular telephone system shown in connection therewith, but that various applications, modifications, and arrangements other than those disclosed herein, are within the scope of the invention.

The terms and expressions employed herein in reference to the invention are used as terms of description and not of limitation. We have no intention, by the use of such terms and expressions, of excluding thereby equivalents of the features disclosed but, on the contrary, intend to include therein any and all equivalents and modifications which may be employed without departing from the spirit of the invention.

What is claimed is:

1. A device for translating the equipment terminal designations of the lines of a telephone system into given designations of such lines, which comprises a plurality of coils, a conductor for each line selectively threaded through the cores of such coils in accordance with the given designation of said line, means including registering means responsive to a line condition established upon said line when operated for making a call for registering the terminal designation of said line, means controlled by said registering means for selectively energizing the conductor individual to said calling line, thereby to induce a potential in each of the coils through the core of which said conductor is threaded, and means responsive to said induced potentials for indicating the given designation of said calling line.

2. A device according to claim 1 in which the means responsive to said induced potentials include electronic devices.

3. A device for translating the equipment terminal designations of the lines of a telephone system into given designations of telephone stations connected to such lines, which comprises a plurality of groups of coils, a conductor for each station selectively threaded through the cores of the coils in one of said groups in accordance with the given designation of said station, means responsive to a condition established upon a line of a station when calling for registering the terminal designation of the line to which said calling station is connected, means responsive to a condition upon said line individual to said station when calling for determining which of said groups of coils includes the conductor individual to said station, means responsive operation of said registering means and to said last-mentioned means for selectively energizing said last-mentioned conductor, thereby to induce a potential in each of the coils through the core of which said conductor is threaded, and means responsive to said induced potentials for indicating the given designations of said calling station.

4. A device according to claim 3 in which the means responsive to said induced potentials include electronic devices.

5. In a call data recording telephone system, a frame, a line having a plurality of stations thereon connected to said frame and having a terminal designation, said stations further having an identifying designation individual to each of the stations, means responsive to any one of said stations when calling for registering the terminal designation of said line, means responsive to a condition upon said line individual to said station when calling, an inductive translator, and means responsive to said registering means and to said means on said line individual to said station when calling for actuating said translator to determine the designation of said calling station.

6. In a call data recording telephone system, a frame, a line having a plurality of stations thereon connected to said frame and having a terminal designation, said stations further having an identifying designation individual to each of the stations, means operable under control of any one of said stations when calling for registering the terminal designation of said line, means responsive to a condition upon said line individual to said station when calling, an inductive translator, means responsive to said registering means and to said means on said line individual to said station when calling for actuating said translator to determine the designation of said calling station, and means operative incident to and under control of the actuation of said translator for causing the recording of said designation.

7. In a call data recording telephone system, a frame having designated terminals thereon, a plurality of telephone lines connected to some of said terminals and each provided with an identifying designation, means responsive to one of said lines when calling for registering the designation of the terminals to which said line is connected, and a translator for indicating the designation of said calling line, comprising a plurality of coils, a conductor for each line selectively threaded through the cores of said coils in accordance with the designation of the line, means responsive to said terminal registering means for selectively energizing the conductor of said calling line thereby to induce a potential in each of the coils through the core of which said conductor is threaded, and means responsive to said potentials for indicating the designation of said line.

8. In a call data recording telephone system, a frame having designated terminals thereon, a plurality of telephone lines connected to some of said terminals and each provided with an identifying designation, means responsive to one of said lines when calling for registering the designation of the terminals to which said line is connected, and a translator for indicating the designation of said calling line, comprising a plurality of coils, a conductor for each line selectively threaded through the cores of said coils in accordance with the designation of the line, means responsive to said terminal registering means for selectively energizing the conductor of said calling line thereby to induce a potential in each of the coils through the core of which said conductor is threaded, means responsive to said potentials for indicating the designation of said line, and means responsive to the operation of said last-mentioned means for recording said designation.

9. A call data recording telephone system according to claim 7 in which the means responsive to the potentials induced in said coils include electronic devices.

10. A call data recording telephone system according to claim 8 in which the means responsive to the potentials induced in said coils include electronic devices.

11. In a call data recording telephone system, a frame having identifiable terminals thereon, a plurality of telephone lines each having a designation composed of a plurality of digits and each of said lines being connected to a set of said terminals, means settable in response to one of said lines when calling for registering the terminal identification of said line, and a translator for indicating the designations of said lines from their respective terminal identifications on said frame, said translator comprising a plurality of coils for each digital order in said designations, a conductor for each line selectively threaded through cores of said coils according to each digital value of the designation of said line, said conductor being connected at its other end to a source of potential, means operative in response to the operation of said settable means for selectively energizing the conductor individual to said line thereby to induce a potential in each of the coils through the core of which said conductor is threaded, and means responsive to said induced potentials for indicating the digital values of the designation of said calling line.

12. A call data recording telephone system according to claim 11 in which the means settable in response to the induced potentials include electronic devices.

13. In a call data recording telephone system, a frame having indentifiable terminals thereon, a plurality of telephone lines each having an arbitrary designation composed of a plurality of digits and each connected to a set of said terminals, means settable in response to one of said lines when calling for registering the designation of the terminals said line is connected on said frame, and a translator for indicating the arbitrary designation of each of said lines comprising a plurality of coils for each digital order of said arbitrary designations, a conductor for each line selectively threaded through the cores of said coils in accordance with each digital value of each digital order of the arbitrary designation of said line, means responsive to the setting of said registering means for energizing the conductor threaded through the cores of said coils which is individual to said calling line, thereby to induce a potential in each of the coils through the core of which said conductor is threaded, means settable in response to said potentials for registering the designation of said line, and means operative incident to and under control of the setting of said last-mentioned settable means for recording said designation.

14. A call data recording telephone system according to claim 13 in which the means responsive to the potentials induced in said coils include electronic devices.

15. In a call recording telephone system, a frame having indentifiable terminals thereon, a plurality of telephone lines having terminations in said terminals, one or more of said lines having a plurality of telephone stations thereon, each of said stations having an arbitrary designation composed of a plurality of digits, means settable in response to one of said stations when calling for registering the designation of the terminals to which the line of a plurality of said stations is connected on said frame, and means including a translator for indicating the arbitrary indication of each of said stations comprising a plurality of groups of coils, each group containing as many coils as the maximum number of digits in the arbitrary designation of any of said stations, a conductor individual to station selectively threaded through the cores of the coils of one of said groups in accordance with each digit of the designation of said station, means responsive to a condition upon the line to which the calling station is connected and individual to said station when calling for determining which ones of said groups of coils includes the conductor individual to said station, means responsive to said registering means and to said last-mentioned means for selectively energizing said last-mentioned conductor, thereby to induce a potential in each of the coils through the core of which said conductor is threaded, and means responsive to said induced potentials for establishing conditions indicative of the arbitrary designation of said calling station.

16. A call data recording telephone system according to claim 15 in which the means responsive to said induced potentials includes electronic devices.

17. In a call recording telephone system a frame having identifiable terminals thereon, a plurality of telephone lines having terminations in said terminals, one or more of said lines having a plurality of telephone stations thereon, each of said stations having an arbitrary designation composed of a plurality of digits, means settable in response to one of said stations when calling for registering the designation of the terminals to which the line of a plurality of said stations is connected on said frame, and means including a translator for indicating the arbitrary indication of each of said stations comprising a plurality of groups of coils, each group containing as many coils as the maximum number of digits in the arbitrary designation of any of said stations, a conductor individual to station selectively threaded through the cores of the coils of one of said groups in accordance with each digit of the designation of said station, means responsive to a condition upon the line to which the calling station is connected and individual to said station when calling for determining which one of group of coils includes the conductor individual to said station, means responsive to said registering means and to said last-mentioned means for selectively energizing said last-mentioned conductor, thereby to induce a potential in each of the coils through the core of which said conductor is threaded, means responsive to said induced potentials for establishing conditions indicative of the arbitrary designation of said calling station, and means responsive to the operation of last-mentioned means incident to the establishment of said conditions for recording the designation of said calling station.

18. In a call data recording telephone system, a plurality of lines each having an arbitrary designation, a frame, terminals upon said frame having identifiable designations on which said lines terminate, apparatus including settable registers for controlling the setting up of connections from said lines when calling, means for recording items of record information pertaining to a connection, means responsive to one of said lines when calling for registering the terminal designation of said line, means responsive to said calling line for connecting said apparatus thereto and to receive on its settable registers from said terminal registering means the terminal designation of said calling line, a recorder-controller for controlling said recording means including settable registers therein and responsive to the settable registers of said apparatus for registering on its own settable registers the terminal designation of said calling line, a translator for translating the terminal designation of said calling line into the arbitrary designation thereof comprising a plurality of coils, a conductor for each line selectively threaded through the cores of said coils in accordance with the arbitrary designation of said line, means responsive to said settable registers of said recorder-controller for selectively energizing the conductor of said calling line, thereby to induce a potential in each of the coils through the core of which said conductor is threaded, means responsive to said calling line, means responsive to said last-mentioned means for resetting said settable registers of said recorder-controller to register said arbitrary designation, and means in said recorder-controller responsive to said settable registers as reset to said arbitrary designation for controlling said recording means whereby the latter is caused to record said arbitrary designation.

19. A call data recording telephone system according to claim 18 in which the means responsive to said induced potentials include electronic devices.

HAROLD D. CAHILL.
WARREN W. CARPENTER.
THOMAS L. DIMOND.

REFERENCES CITED

The following references are of record in the file of this patent:

UNITED STATES PATENTS

| Number | Name | Date |
|---|---|---|
| T. M. 111,638 | Herner et al. | July 25, 1916 |
| 2,252,766 | Holden | Aug. 19, 1941 |
| 2,270,246 | Bascom et al. | June 20, 1942 |
| 2,351,551 | Sribel | June 13, 1944 |
| 2,428,376 | Matthies | Oct. 7, 1947 |
| 2,490,441 | Joel | Dec. 6, 1949 |

OTHER REFERENCES

Proceedings of the Institution of Electrical Engineers (British), page 171, July 1950.